(12) United States Patent
Kutsumi et al.

(10) Patent No.: US 8,595,614 B2
(45) Date of Patent: Nov. 26, 2013

(54) DOCUMENT GENERATING APPARATUS, DOCUMENT GENERATING METHOD, COMPUTER PROGRAM AND RECORDING MEDIUM

(75) Inventors: Takeshi Kutsumi, Osaka (JP); Ichiko Sata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 84 days.

(21) Appl. No.: 13/277,457

(22) Filed: Oct. 20, 2011

(65) Prior Publication Data

US 2012/0102393 A1    Apr. 26, 2012

(30) Foreign Application Priority Data

Oct. 21, 2010 (JP) ................. 2010-236862

(51) Int. Cl.
*G06F 17/00* (2006.01)
(52) U.S. Cl.
USPC ......................................................... 715/243
(58) Field of Classification Search
USPC ......................................................... 715/243
See application file for complete search history.

(56) References Cited

U.S. PATENT DOCUMENTS

| | | | | |
|---|---|---|---|---|
| 5,475,805 A | * | 12/1995 | Murata | 715/201 |
| 5,583,949 A | * | 12/1996 | Smith et al. | 382/199 |
| 5,867,159 A | * | 2/1999 | Hamada et al. | 345/443 |
| 6,751,779 B1 | * | 6/2004 | Kurosawa et al. | 715/209 |
| 2003/0093473 A1 | * | 5/2003 | Hara | 709/203 |
| 2008/0138034 A1 | * | 6/2008 | Hiroi et al. | 386/95 |
| 2009/0055159 A1 | | 2/2009 | Kato | |
| 2009/0210215 A1 | | 8/2009 | Konno | |
| 2011/0113318 A1 | * | 5/2011 | Hirosawa et al. | 715/207 |

FOREIGN PATENT DOCUMENTS

| | | |
|---|---|---|
| JP | 4-256065 A | 9/1992 |
| JP | 2007-72594 A | 3/2007 |
| JP | 2009-53838 A | 3/2009 |
| JP | 2009-193283 A | 8/2009 |
| JP | 2010-128599 A | 6/2010 |

* cited by examiner

*Primary Examiner* — Laurie Ries

(74) *Attorney, Agent, or Firm* — Birch, Stewart, Kolasch & Birch, LLP

(57) ABSTRACT

A ruby character is displayed in an appropriate display form corresponding to characteristics of a layout of a document intended for giving of ruby characters. In a document generating apparatus, a storage portion stores information on a layout of a document as document layout data, a unification judging portion reads the document layout data stored in the storage portion, and a ruby character setting portion judges unification of a layout of the whole document based on the read document layout data to set a display form of a ruby character based on a judgment result by the unification judging portion.

12 Claims, 30 Drawing Sheets

| CHARACTER NUMBER | RECOGNITION RESULT | X COORDINATE ON THE LEFT | Y COORDINATE ON THE UPPER SIDE | X COORDINATE ON THE RIGHT | Y COORDINATE ON THE LOWER SIDE | AREA NUMBER | POSITION INFORMATION IN LINE | SIZE |
|---|---|---|---|---|---|---|---|---|
| 617 | c | 37 | 288 | 40 | 283 | 5 | 1 | 7 |
| 618 | o | 41 | 288 | 44 | 283 | 5 | 0 | 7 |
| 619 | l | 45 | 289 | 47 | 283 | 5 | 0 | 7 |
| 620 | o | 48 | 288 | 51 | 283 | 5 | 0 | 7 |
| 621 | r | 52 | 288 | 55 | 283 | 5 | 0 | 7 |
| 622 | | 56 | 288 | 59 | 283 | 5 | 0 | 7 |
| 623 | i | 60 | 289 | 62 | 283 | 5 | 0 | 7 |
| 624 | d | 63 | 289 | 66 | 283 | 5 | 0 | 7 |
| 625 | e | 67 | 288 | 70 | 283 | 5 | 0 | 7 |
| 626 | n | 71 | 288 | 74 | 283 | 5 | 0 | 7 |
| 627 | t | 75 | 289 | 78 | 283 | 5 | 0 | 7 |
| 628 | i | 79 | 289 | 81 | 283 | 5 | 0 | 7 |
| 629 | f | 82 | 289 | 85 | 283 | 5 | 0 | 7 |
| 630 | i | 86 | 289 | 88 | 283 | 5 | 0 | 7 |
| 631 | e | 89 | 288 | 92 | 283 | 5 | 0 | 7 |
| 632 | d | 93 | 289 | 96 | 283 | 5 | 0 | 7 |
| ⋮ | ⋮ | ⋮ | ⋮ | ⋮ | ⋮ | ⋮ | ⋮ | ⋮ |

| CHARACTER NUMBER | RECOGNITION RESULT | X COORDINATE ON THE LEFT | Y COORDINATE ON THE UPPER SIDE | X COORDINATE ON THE RIGHT | Y COORDINATE ON THE LOWER SIDE | AREA NUMBER | POSITION INFORMATION IN LINE | SIZE |
|---|---|---|---|---|---|---|---|---|
| 617 | c | 37 | 288 | 40 | 283 | 5 | 1 | 7 |
| 618 | o | 41 | 288 | 44 | 283 | 5 | 0 | 7 |
| 619 | l | 45 | 289 | 47 | 283 | 5 | 0 | 7 |
| 620 | o | 48 | 288 | 51 | 283 | 5 | 0 | 7 |
| 621 | r | 52 | 288 | 55 | 283 | 5 | 0 | 7 |
| 622 |   | 56 | 288 | 59 | 283 | 5 | 0 | 7 |
| 623 | i | 60 | 289 | 62 | 283 | 5 | 0 | 7 |
| 624 | d | 63 | 289 | 66 | 283 | 5 | 0 | 7 |
| 625 | e | 67 | 288 | 70 | 283 | 5 | 0 | 7 |
| 626 | n | 71 | 288 | 74 | 283 | 5 | 0 | 7 |
| 627 | t | 75 | 289 | 78 | 283 | 5 | 0 | 7 |
| 628 | i | 79 | 289 | 81 | 283 | 5 | 0 | 7 |
| 629 | f | 82 | 289 | 85 | 283 | 5 | 0 | 7 |
| 630 | i | 86 | 289 | 88 | 283 | 5 | 0 | 7 |
| 631 | e | 89 | 288 | 92 | 283 | 5 | 0 | 7 |
| 632 | d | 93 | 289 | 96 | 283 | 5 | 0 | 7 |
| ... | ... | ... | ... | ... | ... | ... | ... | ... |

| AREA NUMBER | X COORDINATE ON THE LEFT | Y COORDINATE ON THE UPPER SIDE | X COORDINATE ON THE RIGHT | Y COORDINATE ON THE LOWER SIDE | STARTING CHARACTER NUMBER | NUMBER OF CHARACTERS | NUMBER OF LINES | AVERAGE ORIGINAL CHARACTER SIZE | AVERAGE LINE SPACE |
|---|---|---|---|---|---|---|---|---|---|
| 1 | 21 | 505 | 383 | 485 | 1 | 25 | 1 | 20.4 | — |
| 2 | 28 | 460 | 195 | 40 | 26 | 282 | 27 | 10.6 | 9.2 |
| 3 | 208 | 458 | 378 | 58 | 308 | 250 | 25 | 10.4 | 9.3 |
| ... | ... | ... | ... | ... | ... | ... | ... | ... | ... |

6e

DOCUMENT GENERATING APPARATUS, DOCUMENT GENERATING METHOD, COMPUTER PROGRAM AND RECORDING MEDIUM

CROSS-NOTING PARAGRAPH

This non-provisional application claims priority under 35 U.S.C. §119(a) on Patent Application No. 2010-236862 filed in JAPAN on Oct. 21, 2010, the entire contents of which are hereby incorporated herein by reference.

FIELD OF THE INVENTION

The present invention relates to a document generating apparatus and a document generating method for generating a document with ruby characters by giving ruby characters alongside characters included in the document, a computer program characterized by causing a computer to execute the document generating method, and a computer-readable recording medium characterized by recording of the computer program.

BACKGROUND OF THE INVENTION

Conventionally, giving ruby characters alongside a character string included in a document is generally performed. The ruby characters are annotation showing reading and meaning of the character string, and to be arranged near the character string so that a correspondence relation with the character string is understood (for example, see Japanese Laid-Open Patent Publication No. 2007-72594 and Japanese Laid-Open Patent Publication No. 2009-53838).

Generally, the size of a ruby character is decided depending on the size of a character and the size of a line space of an original document. In this case, even though the sizes of characters and the sizes of line spaces are similar to each other in the original document, the size of the ruby character is changed unless they are the same so that the document comes to lack unity.

Therefore, the technique has been proposed that a document is divided into a plurality of areas to classify areas in which the sizes of characters and the sizes of line spaces are similar to each other as a same group, and character sizes of a translated sentence that is given alongside a character string are unified among areas included in the same group (for example, see Japanese Laid-Open Patent Publication No. 2009-193283 and Japanese Laid-Open Patent Publication No. 2010-128599).

However, in the case of a document having a less difference among character sizes and line spaces in an original document in which it is better to unify character sizes of a translated sentence in the whole document, and a document in which various sizes of characters are used on purpose so as to appear to give a translated sentence in each size corresponding to each character size, the related art in Japanese Laid-Open Patent Publication No. 2009-193283 and Japanese Laid-Open Patent Publication No. 2010-128599 has a possibility that the character sizes of the translated sentence are not only unified in the former, but also in the latter, the character sizes of the translated sentence are unified among areas where the character sizes are similar to each other, so that it is impossible to respond to a request such that the character sizes of the translated sentence are not unified in the latter.

SUMMARY OF THE INVENTION

An object of the present invention is to provide a document generating apparatus and a document generating method capable of displaying a ruby character in an appropriate display form corresponding to characteristics of a layout of a document to which ruby characters are given, a computer program characterized by causing a computer to execute the document generating method, and a computer-readable recording medium characterized by recording of the computer program.

An object of the present invention is to provide a document generating apparatus for generating a document with ruby characters by giving ruby characters alongside characters included in a document, comprising: a storage portion for storing information on a layout of the document; a unification judging portion for reading the information on the layout that is stored in the storage portion to judge unification of the layout of the whole document based on the read information; and a ruby character setting portion for setting a display form of the ruby character based on a judgment result by the unification judging portion.

Another object of the present invention is to provide the document generating apparatus wherein the ruby character setting portion unifies the display form of the ruby character when the unification of the layout is higher than a predetermined value, and sets the display form of the ruby characters individually corresponding to characteristics of each part of the document when the unification of the layout is not higher than the predetermined value.

Another object of the present invention is to provide the document generating apparatus, wherein the display form of the ruby character is a character size of the ruby character.

Another object of the present invention is to provide the document generating apparatus, wherein the unification judging portion reads a characteristic amount showing characteristics of the layout from the storage portion as the information of the layout, calculates a variance value of the read characteristic amount, and judges the unification based on the calculated variance value.

Another object of the present invention is to provide the document generating apparatus, wherein the unification judging portion calculates an average value of the characteristic amount per line, and calculates a variance value of the calculated average value as a variance value of the characteristic amount.

Another object of the present invention is to provide the document generating apparatus, wherein the unification judging portion calculates, when the document is divided into a plurality of areas, the average value of the characteristic amount per area, and calculates a variance value of the calculated average value as a variance value of the characteristic amount.

Another object of the present invention is to provide the document generating apparatus, wherein the unification judging portion calculates an average value of the characteristic amount corresponding to each character included in the whole document, and calculates a variance value of the calculated average value as a variance value of the characteristic amount.

Another object of the present invention is to provide the document generating apparatus, wherein the characteristic amount is a character size of each character included in the document.

Another object of the present invention is to provide the document generating apparatus, wherein the characteristic amount is an interval of each line in the document.

Another object of the present invention is to provide the document generating apparatus, wherein the characteristic amount is the number of characters in each line in the document.

Another object of the present invention is to provide the document generating apparatus, further comprising an input portion for accepting input of the information on the layout from a user, wherein the unification judging portion judges the unification based on the information of which the input portion accepts input.

Another object of the present invention is to provide the document generating apparatus, wherein when a rate of the size of the ruby character relative to the size of an area in which the ruby character near a word or a collocation comprised of the characters should be arranged is larger than a predetermined threshold, and when there is no need to give the ruby character alongside a word or a collocation before or after the word or the collocation, and the size in which the size of a blank to be provided between ruby characters is added to the size of the ruby character which is given alongside a word or a collocation before or after the word or the collocation is smaller than the size of the word or the collocation before or after the word or the collocation, the ruby character setting portion sets an area near the word or the collocation before or after the word or the collocation as an area for arranging the ruby character.

Another object of the present invention is to provide the document generating apparatus, further comprising: an image reading portion for reading an image of the document; and a document with ruby characters generation portion for generating a document with ruby characters in which an image of the ruby character that is displayed in the display form which is set by the ruby character setting portion is combined with the image read by the image reading portion.

Another object of the present invention is to provide a document generating method for generating a document with ruby characters by giving ruby characters alongside characters included in a document, comprising: a unification judging step of reading information on a layout of the document from a storage portion to judge unification of the layout of the whole document based on the read information; and a ruby character setting step of setting a display form of the ruby character based on a judgment result at the unification judging step.

Another object of the present invention is to provide a computer program that causes a computer to execute the document generating method.

Another object of the present invention is to provide a computer-readable recording medium, wherein the computer program.

BRIEF DESCRIPTION OF THE DRAWINGS

FIG. 2 is a diagram showing an example of character recognition result data;

FIG. 3 is a diagram showing an example of document layout data;

PREFERRED EMBODIMENTS OF THE INVENTION

Figure 1:
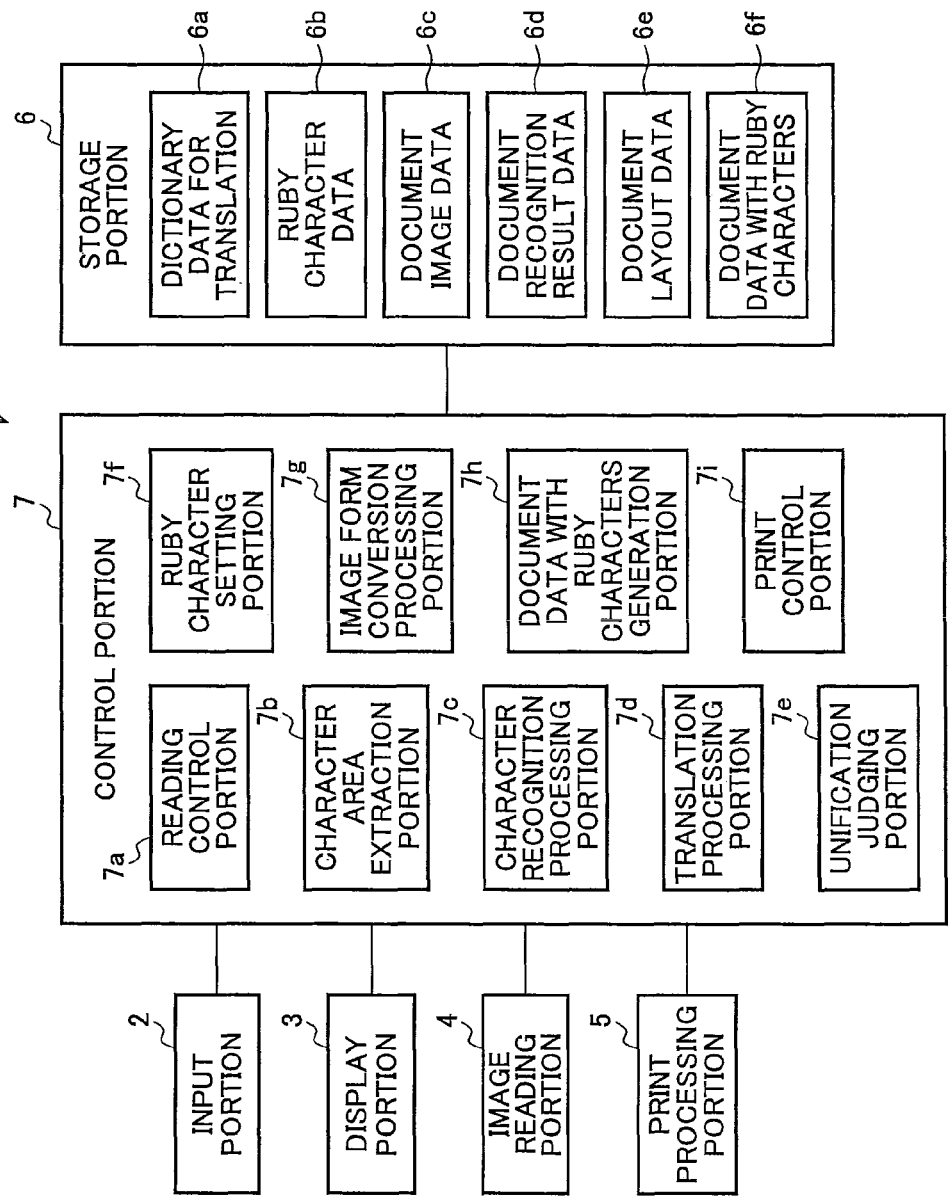
FIG. 1 is a functional block diagram of a document generating apparatus according to an embodiment of the present invention.

Hereinafter, description will be given in detail for embodiments of the present invention with reference to the accompanying drawings. FIG. 1 is a functional block diagram of a document generating apparatus 1 according to an embodiment of the present invention. The document generating apparatus 1 is an apparatus for generating a document with ruby characters by giving ruby characters alongside a word or a collocation included in a document. The ruby characters are annotation showing reading and meaning of a word or a collocation (for example, a syllabic character, a phonetic symbol, a pinyin symbol, a translation and description of a technical term or hard words), and to be arranged near the word or the collocation so that a correspondence relation to the word and the collocation is understood.

Note that, hereinafter, description will be given for the document generating apparatus 1 with an example in the case of giving a translation of a word or a collocation as ruby characters alongside the word and the collocation. Additionally, hereinafter, description will be given for the case of giving ruby characters in a lower part of a word or a collocation intended for giving of ruby characters, however, without limiting thereto, ruby characters may be placed in an upper part of a word or a collocation, or may be arranged on the left or the right of a word or a collocation in the case of vertical text.

As shown in FIG. 1, the document generating apparatus 1 is provided with an input portion 2, a display portion 3, an image reading portion 4, a print processing portion 5, a storage portion 6 and a control portion 7. The input portion 2 is an input device such as a keyboard or a mouse for receiving input of information from a user. The display portion 3 is a display device such as a display for displaying various types of information. The image reading portion 4 is a scanner device for reading an image of a document by scanning of a paper document. The print processing portion 5 is a print device for printing a document or the like on paper. The storage portion 6 is a storage device such as a memory or a hard disk device. The storage portion 6 stores dictionary data for translation 6a, ruby character data 6b, document image data 6c, character recognition result data 6d, document layout data 6e and document data with ruby characters 6f.

The dictionary data for translation 6a is data in which grammar of a language intended for translation, translations of words and collocations and the like are registered. Here, the collocation is a phrase in which more than one words are coupled to each other to show one organized meaning (for example, a noun phrase, a verbal phrase, an idiom, an idiomatic phrase and the like). The ruby character data 6b is data in which information of a character and a character gap used as a ruby character is registered. The character recognition result data 6d is data of characters obtained as a result from character recognition processing performed for the document image data 6c.

FIG. 2 is a diagram showing an example of the character recognition result data 6d. As shown in FIG. 2, the character recognition result data 6d registers a character number, a recognition result, an X coordinate on the left, a Y coordinate on the upper side, an X coordinate on the right, a Y coordinate on the lower side, an area number, position information in a line and size information.

The character number is a number allocated to each recognized character. The recognition result indicates a character obtained as a result of character recognition. Here, a blank is also recognized as a character (see a character number 622). The X coordinate on the left, the Y coordinate on the upper side, the X coordinate on the right, and the Y coordinate on the lower side are an X coordinate of a left side, a Y coordinate of an upper side, an X coordinate of a right side, and a Y coordinate of a lower side of a rectangle in external contact with a character, respectively. The area number is an identification number that is used for identifying an area to which each character belongs in a case where character recognition is performed for a document per area. The position information in a line is information indicating a position of each character in a line. A number "1" is allocated to a head-of-line character, a number "2" is allocated to an end-of-line character, and a number "0" is allocated to an in-line character. The size is information of a font size of each character represented by a point.

In description of FIG. 1 again, the document layout data 6e is data including information of a layout in a character area in a document obtained by layout analysis. FIG. 3 is a diagram showing an example of the document layout data 6e. As shown in FIG. 3, the document layout data 6e registers an area number, an X coordinate on the left, a Y coordinate on the upper side, an X coordinate on the right, a Y coordinate on the lower side, a starting character number, the number of characters, the number of lines, an average original character size and information on average line space.

The area number is a number allocated to each recognized character. The X coordinate on the left, the Y coordinate on the upper side, the X coordinate on the right, and the Y coordinate on the lower side are an X coordinate of a left side, a Y coordinate of an upper side, an X coordinate of a right side, and a Y coordinate of a lower side of each rectangular character area. The starting character number is information showing a range of characters included in each character area. The number corresponds to the character number of character recognition result data 6d shown in FIG. 2. For example, in a case where the starting character number of an area number "1" is "1" and the starting character number of an area number "2" is "26", characters corresponding to character numbers from "1" to "25" in the character recognition result data 6d are included in the character area of the area number "1". The number of characters is the number of characters included in each character area. The number of lines is the number of lines included in each character area. The average original character size is an average value of a character size of a character included in each character area. The average line space is an average value of a line space of a line included in each character area. Note that, in an example of FIG. 3, the average original character size is employed as a representative value of an original character size in each area and the average line space is employed as a representative value of a line space in each area, however, by a method except a method of obtaining the average value of the original character size and the line space, the representative value of the original character size and the line space in each area may be set.

The document data with ruby characters 6*f* is data of a document in a PDF (Portable Document Format) form in which a translation of a word or a collocation is given as ruby characters near the word or the collocation included in document data.

The control portion 7 is a control portion for controlling document generating processing. The control portion 7 includes a reading control portion 7*a*, a character area extraction portion 7*b*, a character recognition processing portion 7*c*, a translation processing portion 7*d*, an unification judging portion 7*e*, a ruby character setting portion 7*f*, an image form conversion processing portion 7*g*, a document data with ruby characters generation portion 7*h* and a print control portion 7*i*.

The reading control portion 7*a* is a control portion for controlling the image reading portion 4 to read an image of a paper document and generate image data of the read image. The reading control portion 7*a* stores the generated image data in the storage portion 6 as the document image data 6*c*.

The character area extraction portion 7*b* is a processing portion for reading the document image data 6*c* from the storage portion 6 to perform layout analysis of the read document image data 6*c* and extracting an area with characters. The character recognition processing portion 7*c* is a processing portion for recognizing characters included in the area extracted by the character area extraction portion 7*b*. The character recognition processing portion 7*c* stores a result of character recognition in the storage portion 6 as the character recognition result data 6*d*. Additionally, the character recognition processing portion 7*c* calculates an average value of a character size and an average value of a line space for each character area extracted by the character area extraction portion 7*b* to store the calculated result in the storage portion 6 as the document layout data 6*e* together with information on coordinates, a starting character number, the number of characters and the number of lines of each character area. Note that, for each character area extracted by the character area extraction portion 7*b*, the character recognition processing portion 7*c* may set representative values of a character size and a line space by a method except a method of obtaining an average value of the character size and the line space to store the result in the storage portion 6 as the document layout data 6*e* together with information on coordinates, a starting character number, the number of characters and the number of lines of each character area.

The translation processing portion 7*d* is a processing portion for reading information on the character recognition result stored as the character recognition result data 6*d* from the storage portion 6 to execute translation of words and collocations included in image data using the read information. The translation processing portion 7*d* reads the dictionary data for translation 6*a* stored in the storage portion 6 and refers to information on grammar of a language that is registered in the read dictionary data for translation 6*a*, translations of words and collocations and the like to execute translation.

The unification judging portion 7*e* is a processing portion for reading the character recognition result data 6*d* stored in the storage portion 6 and judging unification of a layout of a document to which ruby characters are given using the read character recognition result data 6*d*. Specifically, the unification judging portion 7*e* uses information on a character size included in the character recognition result data 6*d* to judge whether or not the document to which ruby characters are given is a document with approximately equal character sizes.

Figure 4:
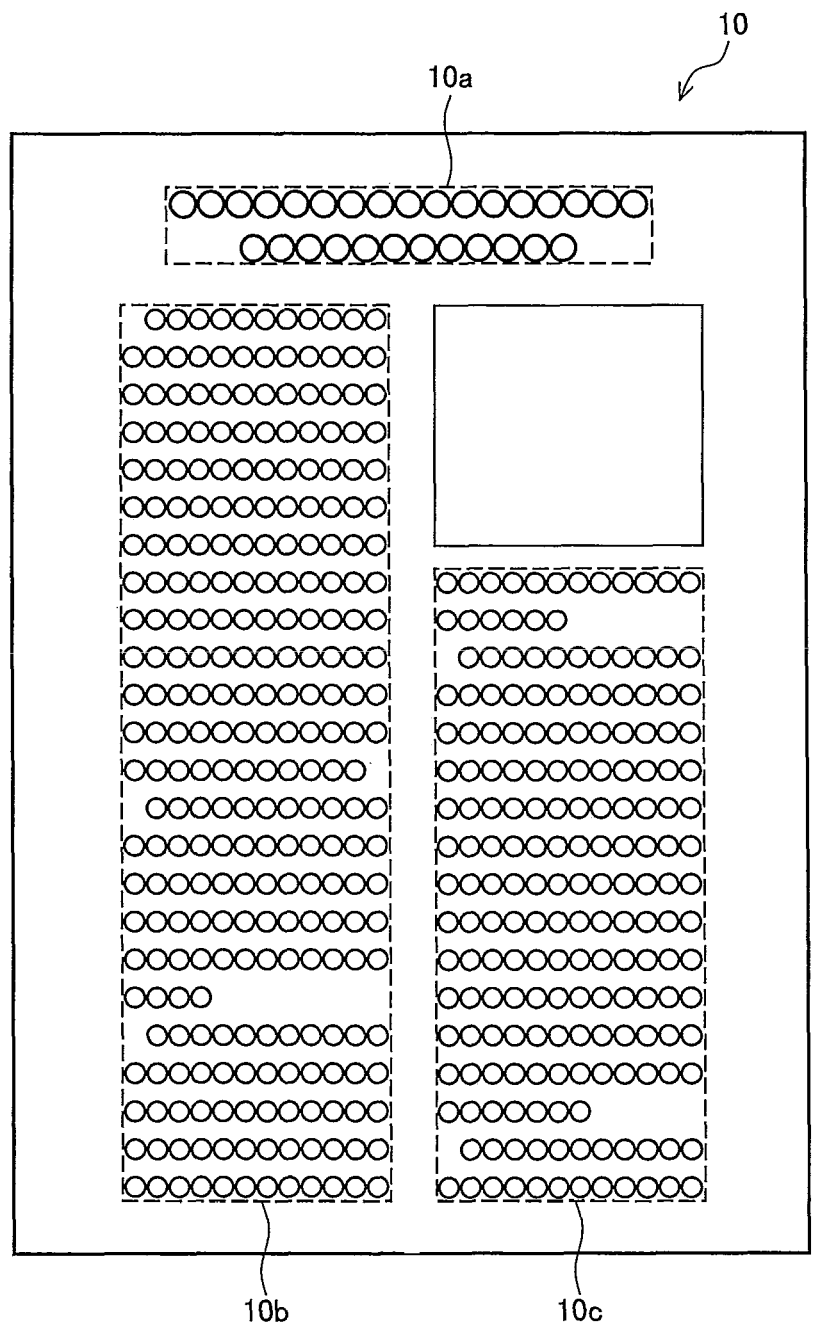
FIG. 4 is a diagram showing an example of a document in which the sizes of characters are almost unified.
Figure 5:
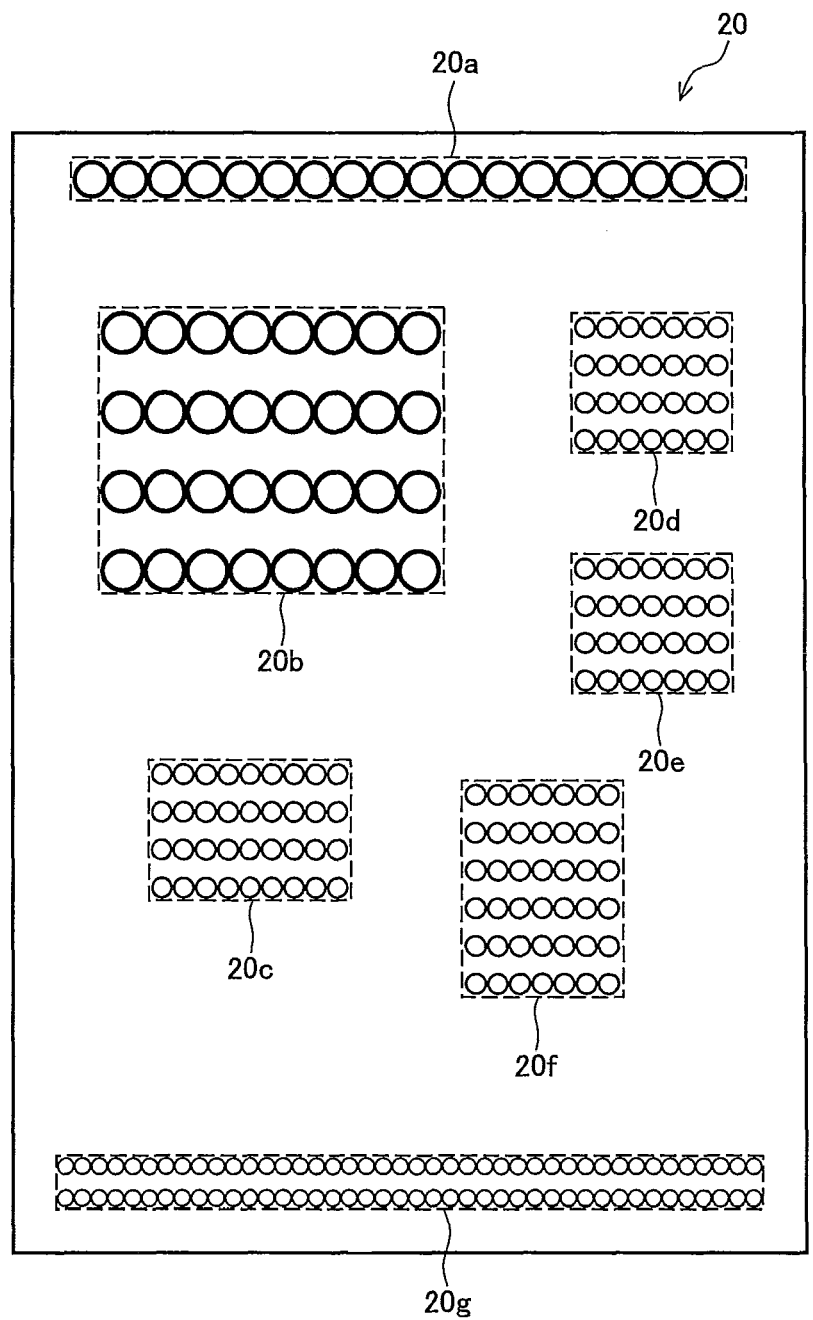
FIG. 5 is a diagram showing an example of a document in which the sizes of characters are not unified.

FIG. 4 is a diagram showing an example of a document 10 with approximately equal character sizes. FIG. 5 is a diagram showing an example of a document 20 with unequal character sizes. The document 10 shown in FIG. 4 has three character areas 10*a* to 10*c*, and the document 20 shown in FIG. 5 has seven character areas 20*a* to 20*g*. In this case, in the document layout data 6*e* shown in FIG. 3, information on each character area of 10*a* to 10*c* and 20*a* to 20*g* is stored. Further, in FIGS. 4 and 5, "o" shows a character included in the documents 10 and 20, and the size of the "o" shows the size of each character. In the document 10 shown in FIG. 4, the sizes of characters in each character area of 10*a* to 10*c* are approximately equal. On the other hand, in the document 20 shown in FIG. 5, the sizes of characters in each character area of 20*a* to 20*g* are unequal.

The unification judging portion 7*e* judges whether or not to be a document with approximately equal character sizes by calculating a variance value of a character size. The variance value corresponds to unification of a layout of a document, then a smaller variance value than a predetermined value corresponds to higher unification than a predetermined value, and a not smaller variance value than the predetermined value corresponds to not higher unification than the predetermined value.

In description of FIG. 1 again, the ruby character setting portion 7*f* is a processing portion for referring to the character recognition result data 6*d* and the document layout data 6*e* to set the size and arrangement of a character in a translation displayed as a ruby character near a word or a collocation. Since the document 10 shown in FIG. 4 has approximately equal character sizes, the ruby character setting portion 7*f* unifies the sizes of characters given to the document to set the character size to a fixed size. On the other hand, since the document 20 shown in FIG. 5 has unequal character sizes, the ruby character setting portion 7*f* changes the size of the ruby character depending on a character size included in a word or a collocation and a line space.

In description of FIG. 1 again, the image form conversion processing portion 7*g* is a processing portion for converting a file form of image data to a predetermined form. For example, the image form conversion processing portion 7*g* converts a file form of image data into a JPEG (Joint Photographic Experts Group) form.

The document data with ruby characters generation portion 7*h* is a processing portion for generating in a PDF form a document data in which a translation is given as ruby characters alongside a word or a collocation included in image data of a document read by the image reading portion 4. Specifically, the document data with ruby characters generation portion 7*h* generates an image with a ruby character based on information on the size and arrangement of the ruby character set by the ruby character setting portion 7*f* and combines the generated image with a ruby character with image data in a file form that is converted by the image form conversion processing portion 7*g* so as to generate document data. The document data with ruby characters generation portion 7*h* stores the generated document data in the storage portion 6 as the document data with ruby characters 6*f*.

In this manner, the document data with ruby characters generation portion 7*h* combines image data of the read document with an image with a ruby character, and a layout of the read document is thus not impaired so that it is possible to appropriately give ruby characters alongside a word or a collocation included in the document. Moreover, a document with ruby characters is generated in a widely prevalent PDF form, thereby making it possible to print in a paper medium and view by a computer operating under various OSs (Operating System), so that it is possible to easily use a document in which ruby characters are given by appropriate size and arrangement.

The print control portion 7i is a processing portion for reading the document data with ruby characters 6f from the storage portion 6, and controlling the print processing portion to perform print of the read document data with ruby characters 6f.

Figure 6:
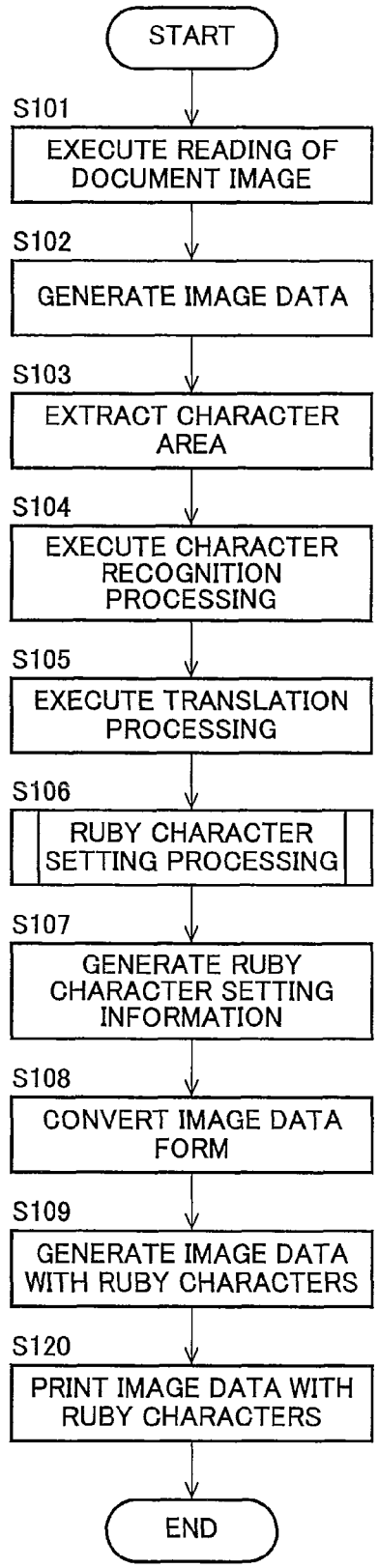
FIG. 6 is a flowchart showing an example of a processing procedure of document generating processing according to an embodiment of the present invention.

Next, description will be given for a processing procedure of document generating processing according to an embodiment of the present invention. FIG. 6 is a flowchart showing an example of a processing procedure of document generating processing according to an embodiment of the present invention.

As shown in FIG. 6, first, the image reading portion 4 of the document generating apparatus 1 executes reading of a document image (step S101). Then, the reading control portion 7a generates image data of an image read by the image reading portion 4 (step S102).

Thereafter, the character area extraction portion 7b extracts a character area including characters from image data generated by the reading control portion 7a (step S103). Then, the character recognition processing portion 7c executes character recognition processing for recognizing characters included in the character area extracted by the character area extraction portion 7b (step S104). Subsequently, the translation processing portion 7d executes translation processing for generating a translation of a word or a collocation composed of characters recognized by the character recognition processing portion 7c (step S105).

The ruby character setting portion 7f then performs processing for setting the size and arrangement of a character when a translation obtained by the translation processing is displayed as ruby characters (step S106). The setting processing will be described in detail below.

Thereafter, the ruby character setting portion 7f generates in a predetermined data form setting information of ruby characters such as a character code, a character size, arrangement, inclination of a character and types of a character font of characters that are given as ruby characters (step S107). Here, the predetermined data form is a data form appropriate for generating image data with ruby characters. For example, when image date with ruby characters is generated in a PDF form, the setting information of ruby characters is also generated in a data form suitable for the PDF form. Further, the inclination of a character and the types of a character font are set by accepting input of such information from a user.

Subsequently, the image form conversion processing portion 7g converts a file form of image data to which ruby characters are given into a predetermined form (step S108). Here, the predetermined form is, for example, a JPEG form.

Thereafter, the document data with ruby characters generation portion 7h uses the setting information of ruby characters generated by the ruby character setting portion 7f to give ruby characters alongside image data in a file form that is converted by the image form conversion processing portion 7g, and generates image data with ruby characters in a PDF form (step S109). The print control portion 5 then prints the image data with ruby characters generated by the document data with ruby characters generation portion 7h (step S110), and the document generating processing is finished.

Figure 7:
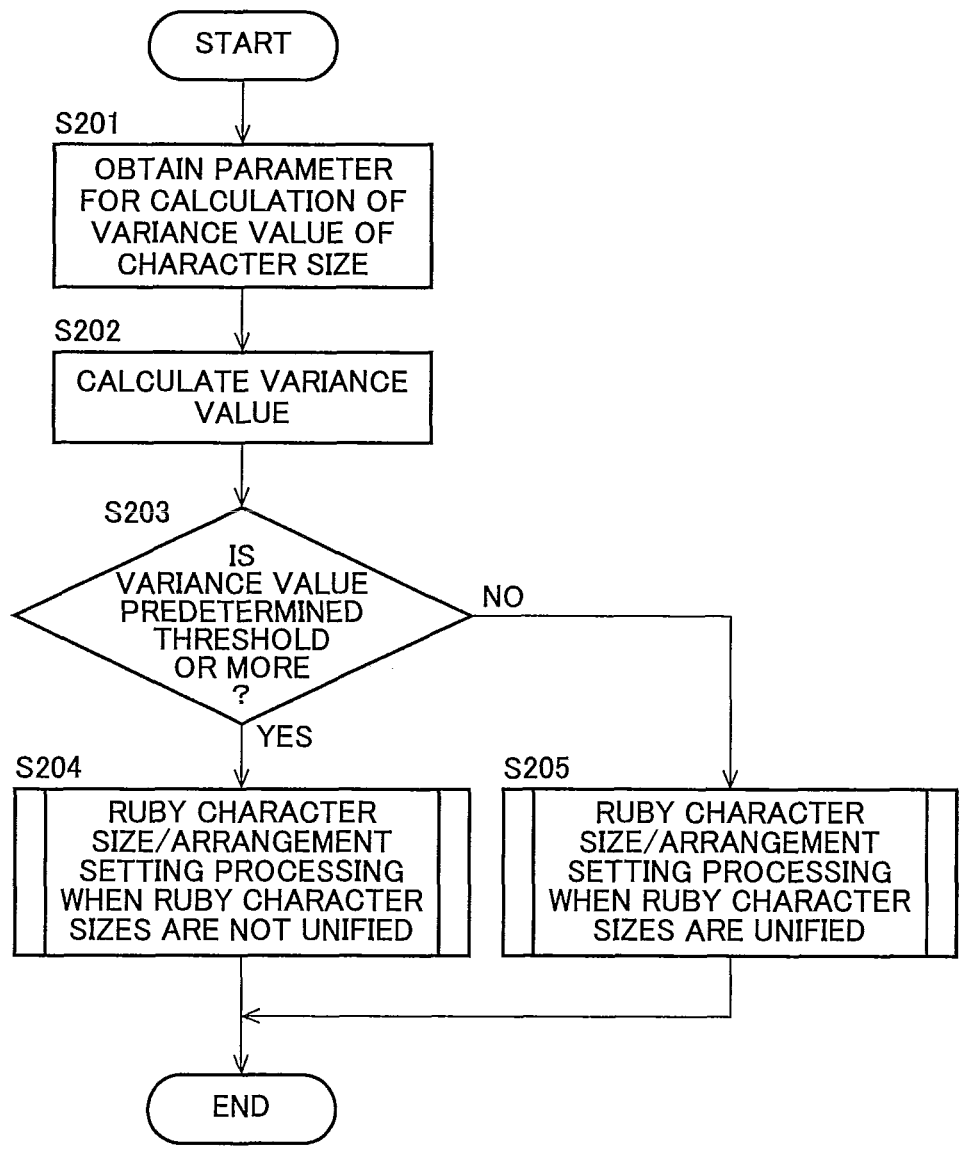
FIG. 7 is a flowchart showing an example of a processing procedure of ruby character setting processing shown in FIG. 6.

Next, description will be given for a processing procedure of ruby character setting processing shown in FIG. 6. FIG. 7 is a flowchart showing an example of a processing procedure of the ruby character setting processing shown in FIG. 6.

As shown in FIG. 7, first, the unification judging portion 7e of the document generating apparatus 1 obtains a parameter for calculating a variance value of a character size (step S201). Specifically, the unification judging portion 7e obtains information on each character size, information on the number of characters and information on the number of lines from the character recognition result data 6d stored in the storage portion 6. Here, the information on the number of lines is able to be obtained by calculating the number of a number "1" representing a head-of-line character in the position information in a line of the character recognition result data 6d shown in FIG. 2. The unification judging portion 7e may obtain the information on the number of lines by accumulating the number of lines in each character area stored in the document layout data 6e.

The unification judging portion 7e then calculates a variance value of a character size averaged per line (step S202). Specifically, the unification judging portion 7e calculates by $$Si = \mathrm{sum}(Sji)/mi$$

an average character size $Si$ of a line i ($1 \le i \le n$, n is the number of lines). Here, $Sji$ is a size of a character j ($1 \le j \le mi$) included in a line i, $mi$ is the number of characters included in the line i and sum ($Sji$) is the total sum of the size $Sji$ ($1 \le j \le mi$) of each character included in the line i.

Additionally, the unification judging portion 7e calculates by $$Sav = \mathrm{sum}(Si)/n$$

an average value $Sav$ of the average character size $Si$ in each line i. Here, sum ($Si$) is the total sum of the average character size $Si$ in each line i ($1 \le i \le n$).

The unification judging portion 7e then calculates by $$Vs = \mathrm{sum}((Sav-Si)^2)/n$$

a variance value $Vs$ of the average character size $Si$ in each line i. Here, $(Sav-Si)^2$ indicates the square of $Sav-Si$, and sum $((Sav-Si)^2)$ is the total sum of a value $(Sav-Si)^2$ ($1 \le i \le n$).

Figure 8:
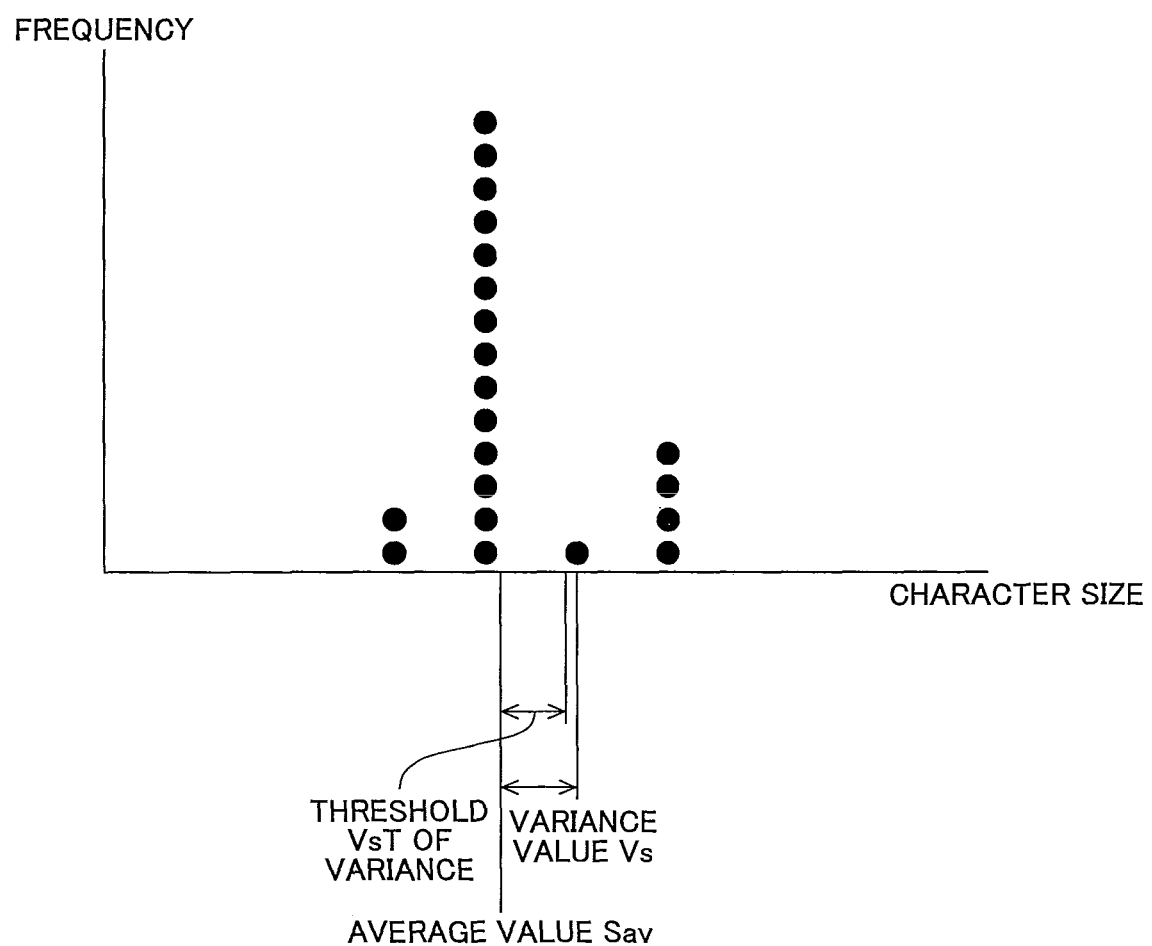
FIG. 8 is a diagram showing an example of character size distribution in a case where a variance value Vs is a predetermined threshold VsT or more.

Thereafter, the unification judging portion 7e checks whether or not the variance value $Vs$ is a predetermined threshold $VsT$ or more (step S203). FIG. 8 is a diagram showing an example of character size distribution in a case where the variance value $Vs$ is the predetermined threshold $VsT$ or more, and FIG. 9 is a diagram showing an example of character size distribution in a case where the variance value $Vs$ is less than the predetermined threshold $VsT$.

As shown in FIG. 8, in a case where the variance value $Vs$ is the predetermined threshold $VsT$ or more (in the case of YES at step S203), the ruby character setting portion 7f executes ruby character size/arrangement setting processing in a case where the sizes of ruby characters are not unified (step S204), and the ruby character setting processing is finished. Description will be given in detail below for the ruby character size/arrangement setting processing in a case where the sizes of ruby characters are not unified.

Figure 9:
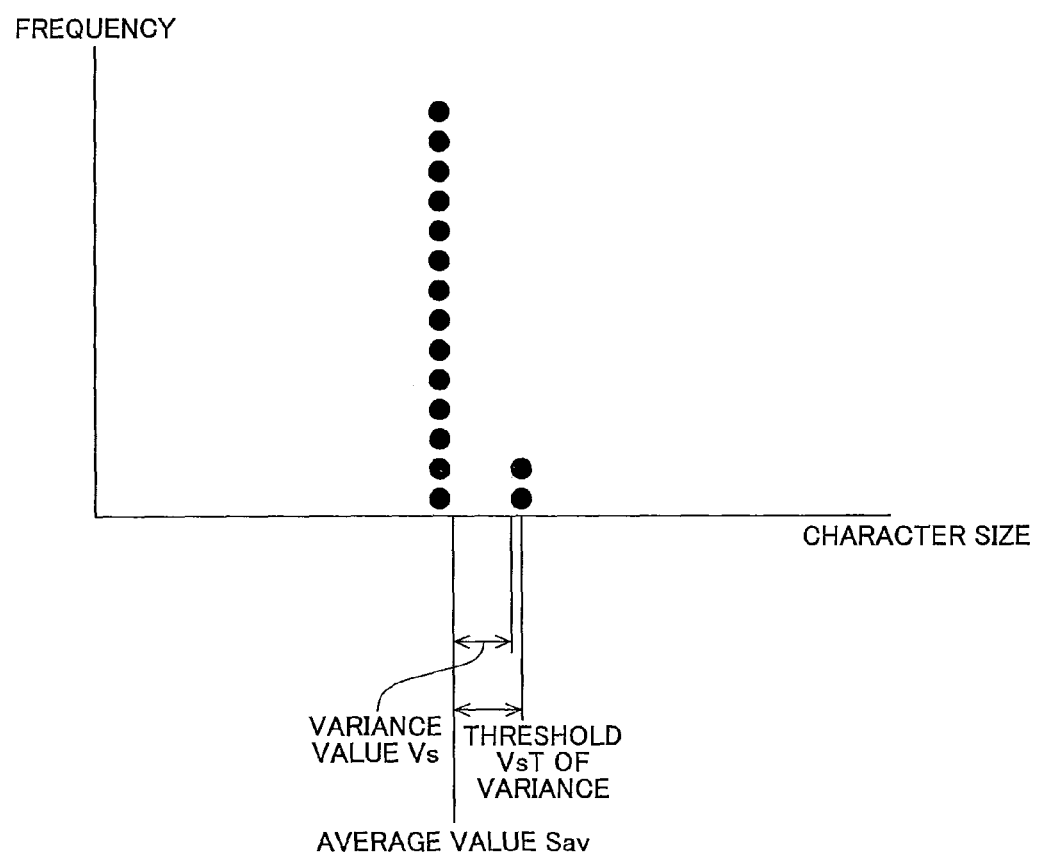
FIG. 9 is a diagram showing an example of character size distribution in a case where the variance value Vs is less than the predetermined threshold VsT.

As shown in FIG. 9, in a case where the variance value $Vs$ is not the predetermined threshold $VsT$ or more (in the case of NO at step S203), the ruby character setting portion 7f executes the ruby character size/arrangement setting processing in a case where the sizes of ruby characters are unified (step S205), and the ruby character setting processing is finished. Description will be given in detail below also for the ruby character size/arrangement setting processing in a case where the sizes of ruby characters are unified. When the variance value is used in this manner, it is possible to easily perform judgment of unification of a layout of a document. Moreover, the average character size Si in each line i ($1 \le i \le n$) is used for calculating the variance value Vs so that it is possible to perform judgment of unification of a layout with emphasis on characteristics of each line.

Note that, it is assumed here that the unification judging portion 7e calculates the average character size Si once to calculate the variance value Si with use of the calculated average character size Si, however, the variance value of the character size may be calculated without calculating the average character size Si. This makes it possible to easily perform calculation of the variance value.

Specifically, the unification judging portion 7e calculates by $$Vs1 = \text{sum}((Sav1-Sq)^2)/p$$

a variance value Vs1 of a character size. Here, p is the total number of characters included in a document, Sq ($1 \le q \le p$) is each character size, Sav is an average value of the character size Sq ($1 \le q \le p$), $(Sav1-Sq)^2$ is the square of Sav1−Sq, and sum $((Sav1-Sq)^2)$ is the total sum of a value $(Sav1-Sq)^2$ ($1 \le q \le p$).

Further, in a case where there are a plurality of character areas in a document, the average character size may be calculated per character area to calculate a variance value of the calculated average character size. This makes it possible to perform judgment of unification of a layout with the emphasis on characteristics of each character area.

Specifically, the unification judging portion 7e calculates by $$Vs2 = \text{sum}((Sav2-St)^2/s$$

a variance value Vs2 of a character size. Here, s is the number of character areas included in a document, St ($1 \le t \le s$) is an average value of character sizes in each character area s, Sav2 is an average value of the value St ($1 \le t \le s$), $(Sav2-St)^2$ is the square of Sav2−St, and sum $((Sav2-St)^2)$ is the total sum of the value $(Sav2-St)^2$ ($1 \le t \le s$).

Then, the ruby character setting portion 7f executes, in a case where the variance value Vs1 or Vs2 is a predetermined threshold or more, the ruby character size/arrangement setting processing in a case where the sizes of ruby characters are not unified, and in a case where the variance value Vs1 or Vs2 is not a predetermined threshold or more, executes the ruby character size/arrangement setting processing in a case where the sizes of ruby characters are unified.

Additionally, it is assumed here that the unification judging portion 7e judges whether or not the sizes of ruby characters are unified by calculating the variance value of the character size, however, the unification judging portion 7e may calculate variance values of a line space and the number of characters included in each line of a document so as to judge whether or not the sizes of ruby characters are unified.

In this case, a variance value VI of a line space in a document is calculated using $$VI = \text{sum}((Iav-Ii)^2)/(n-1).$$

Here, Ii is an interval between a line i ($1 \le i \le n-1$) and a line i+1, Iav is an average value of the line space Ii $$Iav = \text{sum}(Ii)/(n-1)$$

(here, sum (Ii) is the total sum of the line space Ii ($1 \le i \le n-1$)), $(Iav-Ii)^2$ is the square of Iav−Ii, and sum $((Iav-Ii)^2)$ is the total sum of the value $(Iav-Ii)^2$ ($1 \le i \le n-1$).

Further, a variance value VN of the number of characters included in each line is calculated using $$VN = \text{sum}((Nav-Ni)^2)/n.$$

Here, n is the number of lines included in a document, Ni is the number of characters included in each line i ($1 \le i \le n$), Nav is an average value of the number of characters Ni $$Nav = \text{sum}(Ni)/n$$

(here, sum (Ni) is the total sum of the number of characters Ni ($1 \le i \le n$)), $(Nav-Ni)^2$ is the square of Nav−Ni, and sum $((Nav-Ni)^2)$ is the total sum of the value $(Nav-Ni)^2$ ($1 \le i \le n$).

Then, the ruby character setting portion 7f executes, in a case where the variance value VI or VN is a predetermined threshold or more, the ruby character size/arrangement setting processing in a case where the sizes of ruby characters are not unified, and in a case where the variance value VI or VN is not a predetermined threshold or more, executes the ruby character size/arrangement setting processing in a case where the sizes of ruby characters are unified. In this manner, variance of a line space, the number of the characters included in each line of a document and the like is used so that it is possible to flexibly perform judgment of unification of a layout of a document.

Moreover, in FIG. 7, the unification judging portion 7e judges whether or not the sizes of characters included in a document are approximately equal by calculating the variance value of a character size, however, the above-described judgment may be performed by accepting from a user input of information on whether or not the sizes of the characters included in the document are approximately equal. This makes it possible to reflect the user's intention on display of ruby characters more accurately.

Further, although description has been given here for the case of the document having one page, even though the document is comprised of a plurality of pages, average values of character sizes, each line space and the number of characters in each line are calculated over the whole of the plurality pages to calculate variance values of the character sizes, each line space and the number of the characters in each line over the whole of the plurality pages, thereby judging unification of a layout of the document comprised of the plurality of pages, and judgment may be made whether or not to unify the sizes of ruby characters.

Next, description will be given for a processing procedure of ruby character size/arrangement setting processing in a case where ruby character sizes are not unified as shown in FIG. 7. FIGS. 10 to 17 are flowcharts showing an example of a processing procedure of ruby character size/arrangement setting processing in a case where ruby character sizes are not unified. Moreover, FIG. 18 is a diagram describing various types of variables that are used for description below.

Figure 18:
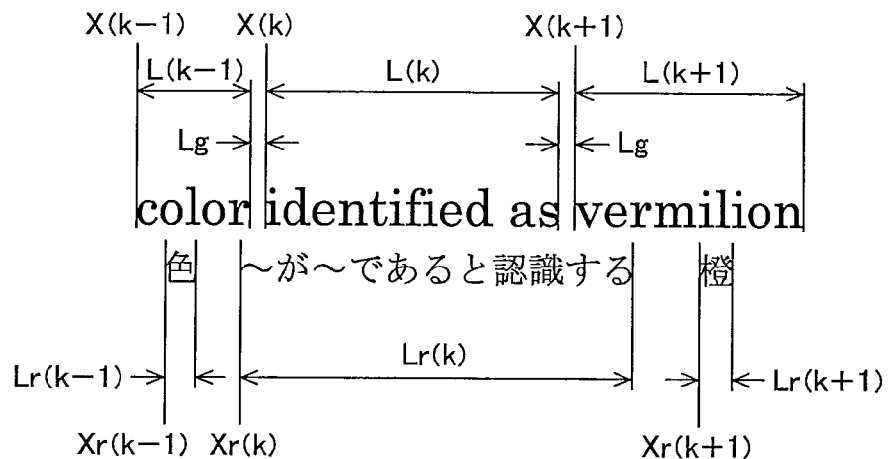
FIG. 18 is a diagram describing various types of variables.

In FIG. 18, the situation is shown where a ruby character "iro" is given as a translation of a word "color", ruby characters "-ga-dearutoninshikisuru" are given as a translation of a collocation "identified as", and a ruby character "daidai" is given as a translation of a word "vermilion". The number is allocated to the word or the collocation. Hereinafter, the k-th word or collocation is referred to as a word k or a collocation k ($1 \le k \le N$, N is the number of a word or a collocation having a ruby character whose size and arrangement are set), and the ruby character given alongside the word k or the collocation k is referred to as a ruby character r (k).

Here, each of X (k−1), X (k) and X (k+1) is a leftmost X coordinate in a rectangle area in external contact with a first character of each of a word k−1 or a collocation k−1, a word k or a collocation k, and a word k+1 or a collocation k+1 (hereinafter, referred to as a leftmost X coordinate of a word or a collocation). Each of L (k−1), L (k) and L (k+1) is a difference between a leftmost X coordinate in a rectangle area in external contact with a first character and a rightmost X coordinate in a rectangle area in external contact with a last character of a word k−1 or a collocation k−1, a word k or a collocation k and a word k+1 or a collocation k+1 (hereinafter, referred to as a length of a word or a collocation). Lg is a width of a blank provided between words, between collocations, or between a word and a collocation.

Further, each of Xr (k−1), Xr (k) and Xr (k+1) is a leftmost X coordinate in a rectangle area in external contact with a first character of each of the word k−1 or the collocation k−1, the word k or the collocation k, and the word k+1 or the collocation k+1 (hereinafter, referred to as a leftmost X coordinate of a ruby character). Each of Lr (k−1), Lr (k) and Lr (k+1) is a difference between a leftmost X coordinate in a rectangle area in external contact with a first character and a rightmost X coordinate in a rectangle area in external contact with a last character of a ruby character corresponding to each of the word k−1 or the collocation k−1, the word k or the collocation k and the word k+1 or the collocation k+1 (hereinafter, referred to as a length of a ruby character).

Figure 10:
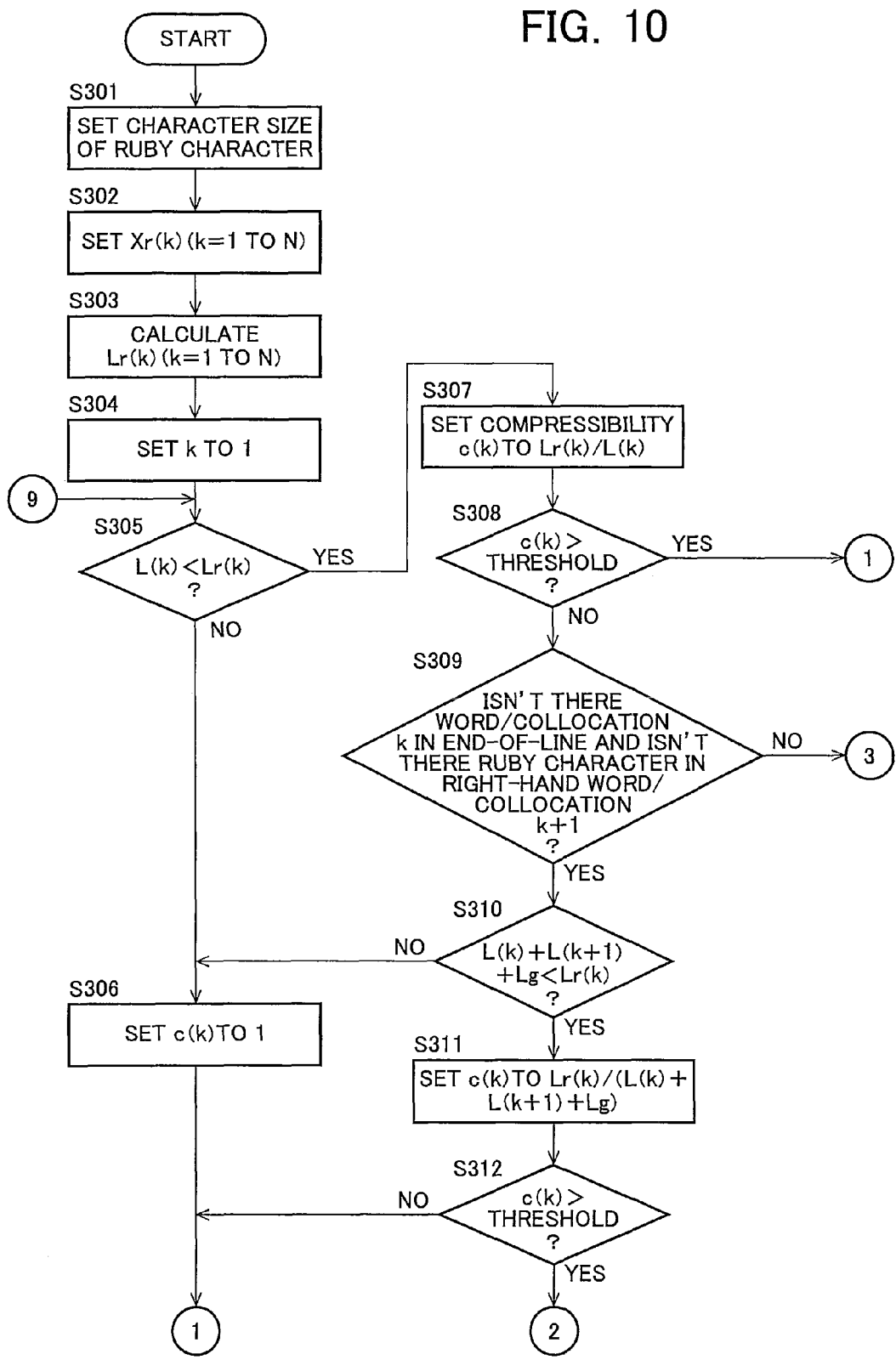
FIG. 10 is a flowchart showing an example of a processing procedure of ruby character size/arrangement setting processing in a case where ruby character sizes are not unified.

As shown in FIG. 10, first, the ruby character setting portion 7f of the document generating apparatus 1 sets a character size of a ruby character (step S301). Specifically, the ruby character setting portion 7f compares a line space of a word or a collocation, and a vertical length of a font of a character included in a word or a collocation.

Then, when a line space is less than 40% of a vertical length of a font of a character, the ruby character setting portion 7f sets the size of a character that is given as a ruby character so that a vertical length of a font of the character that is given as the ruby character becomes 40% of a vertical length of a font of a character included in a word or a collocation. When a line space exceeds 80% of a vertical length of a font of a character, the ruby character setting portion 7f sets the size of a character that is given as a ruby character so that a vertical length of a font of the character that is given as the ruby character becomes 80% of a vertical length of a font of a character included in a word or a collocation. Additionally, when a line space is 40 to 80% of a vertical length of a font of a character, the ruby character setting portion 7f sets the size of a character that is given as a ruby character so that a vertical length of a font of the character that is given as the ruby character becomes the same length as the line space. Note that, in this setting method, a threshold different from 40% or 80% may be used.

Subsequently, the ruby character setting portion 7f sets the leftmost X coordinate Xr (k) of a ruby character (1≤k≤N) (step S302). Specifically, the ruby character setting portion 7f sets the leftmost X coordinate Xr (k) of a ruby character to the leftmost X coordinate X (k) of a word or a collocation.

Then, the ruby character setting portion 7f calculates the length of a ruby character Lr (k) (1≤k≤N) (step S303). Specifically, the ruby character setting portion 7f calculates the length Lr (k) of the ruby character r (k) from information on a width of a character included in the ruby character r (k), a width of a blank provided between characters and the number of characters. Thereafter, the ruby character setting portion 7f sets an identification number k of a word or a collocation to 1 (step S304).

Subsequently, the ruby character setting portion 7f judges whether or not the length L (k) of the word k or the collocation k is shorter than the length Lr (k) of the ruby character r (k) (step S305). When the length L (k) is not shorter than the length Lr (k) (in the case of NO at step S305), it is possible to arrange the ruby character r (k) in a lower part of the word k or the collocation k without shortening in a horizontal direction, and the ruby character setting portion 7f thus sets compressibility c (k) of the ruby character r (k) to 1 (step S306). Here, the compressibility c (k) is a value that is used for shortening the ruby character in a horizontal direction in a case where there is no enough space to arrange the ruby character r (k). When there is no enough space to arrange the ruby character r (k), the ruby character r (k) has a length that is modified to Lr (k)/c (k) to be arranged in the modified length.

Figure 17:
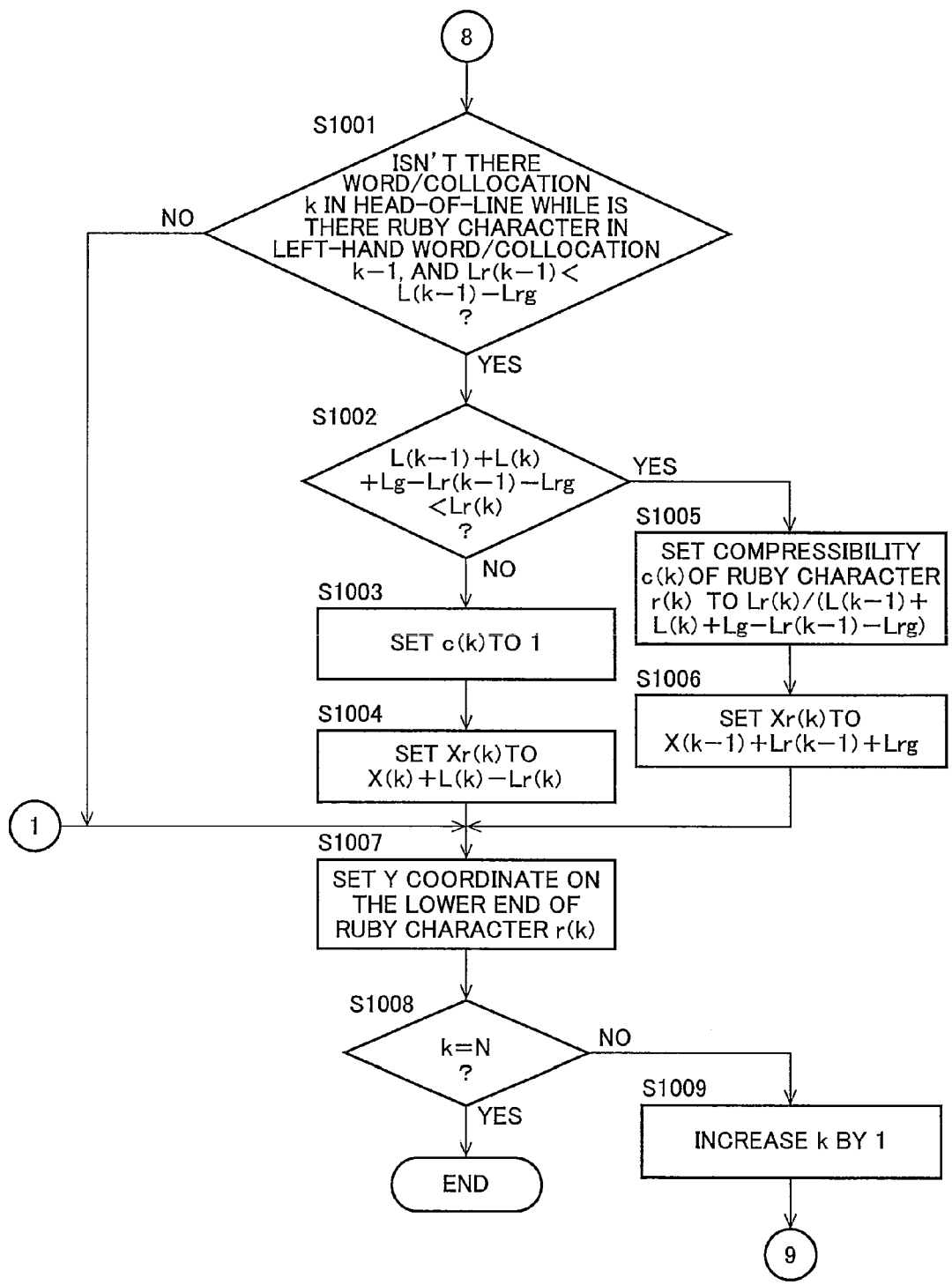
FIG. 17 is a flowchart showing an example of a processing procedure of ruby character size/arrangement setting processing in a case where ruby character sizes are not unified.

Thereafter, as shown in FIG. 17, the ruby character setting portion 7f sets a Y coordinate at a lower end of the ruby character r (k) (step S1007). Specifically, the ruby character setting portion 7f sets the Y coordinate at the lower end of the ruby character r (k) so that the ruby character r (k) is arranged at a central part between lines. In a case where the word k or the collocation k is in a lowest line, the ruby character setting portion 7f sets the Y coordinate at the lower end of the ruby character r (k) so that an interval between the word k or the collocation k and the ruby character r (k) becomes the same as an interval in a line directly above. In the case of having only one line, the ruby character setting portion 7f sets the Y coordinate at the lower end of the ruby character r (k) so as to have a predetermined interval between the word k or the collocation k and the ruby character r (k).

Alternatively, the ruby character setting portion 7f may set a position displaced in a lower direction only in size in a height direction of a font displaying the ruby character r (k) from the Y coordinate at the lower end of the word k or the collocation k as the Y coordinate at the lower end of the ruby character r (k).

The ruby character setting portion 7f then checks whether or not k is N (step S1008). When k is N (in the case of YES at step S1008), the ruby character size/arrangement setting processing in a case where ruby character sizes are not unified is finished. When k is not N (in the case of NO at step S1008), the ruby character setting portion 7f increases k by 1 (step S1009), and moves to step S305 of FIG. 10 to continue subsequent processing.

When the length L (k) is shorter than the length Lr (k) at step S305 of FIG. 10 (in the case of YES at step S305), the ruby character r (k) is needed to be shorten in a horizontal direction in order to arrange the ruby character r (k) in a lower part of the word k or the collocation k, and the ruby character setting portion 7f thus sets the compressibility c (k) of a ruby character to a ratio Lr (k)/L (k) of the length of the ruby character r (k) relative to the length of the word k or the collocation k (step S307).

The ruby character setting portion 7f then judges whether or not the compressibility c (k) is larger than a predetermined threshold (step S308). This threshold is a value that is set in order to suppress a character size of the ruby character r (k) to become smaller more than needs so as to become less readability of the ruby character r (k). When the compressibility c (k) is not larger than the predetermined threshold (in the case of NO at step S308), the ruby character setting portion 7f moves to step S1007 of FIG. 17 to continue subsequent processing.

When the compressibility c (k) is larger than the predetermined threshold at step S308 of FIG. 10 (in the case of YES at step S308), the ruby character setting portion 7f judges whether or not the word k or the collocation k is not in end-of-line, and there is no ruby character r (k+1) in the right-hand word k+1 or collocation k+1 (step S309).

When the word k or the collocation k is not in end-of-line, and there is no ruby character r (k+1) in the right-hand word k+1 or collocation k+1 (in the case of YES at step S309), the ruby character setting portion 7f judges whether or not the sum L (k)+L (k+1)+Lg of the length L (k) of the word k or the collocation k, the length L (k+1) of the word k+1 or the collocation k+1, and the width of a blank Lg is smaller than the length Lr (k) of the ruby character r (k) (step S310).

When the sum L (k)+L (k+1)+Lg is not smaller than the length Lr (k) of the ruby character r (k) (in the case of NO at step S310), a blank part in a lower part of the word k+1 or the collocation k+1 is used in addition to a part in a lower part of the word k or the collocation k, thereby making it possible to arrange the ruby character r (k) in a horizontal direction without shortening, so that the ruby character setting portion 7f sets the compressibility c (k) of the ruby character r (k) to 1 (step S306), and moves to step S1007 of FIG. 17 to continue subsequent processing.

When the sum L (k)+L (k+1)+Lg is smaller than the length Lr (k) of the ruby character r (k) (in the case of YES at step S310), even though the blank part in a lower part of the word k+1 or the collocation k+1 is used, it is impossible to arrange the ruby character r (k) in a horizontal direction without shortening, and the ruby character setting portion 7f thus resets the compressibility c (k) of the ruby character r (k) to a ratio Lr (k)/(L (k)+L (k+1)+Lg) (step S311).

The ruby character setting portion 7f then judges whether or not the compressibility c (k) is large than the predetermined threshold (step S312). When the compressibility c (k) is not larger than the predetermined threshold (in the case of NO at step S312), the ruby character setting portion 7f moves to step S1007 of FIG. 17 to continue subsequent processing.

Figure 11:
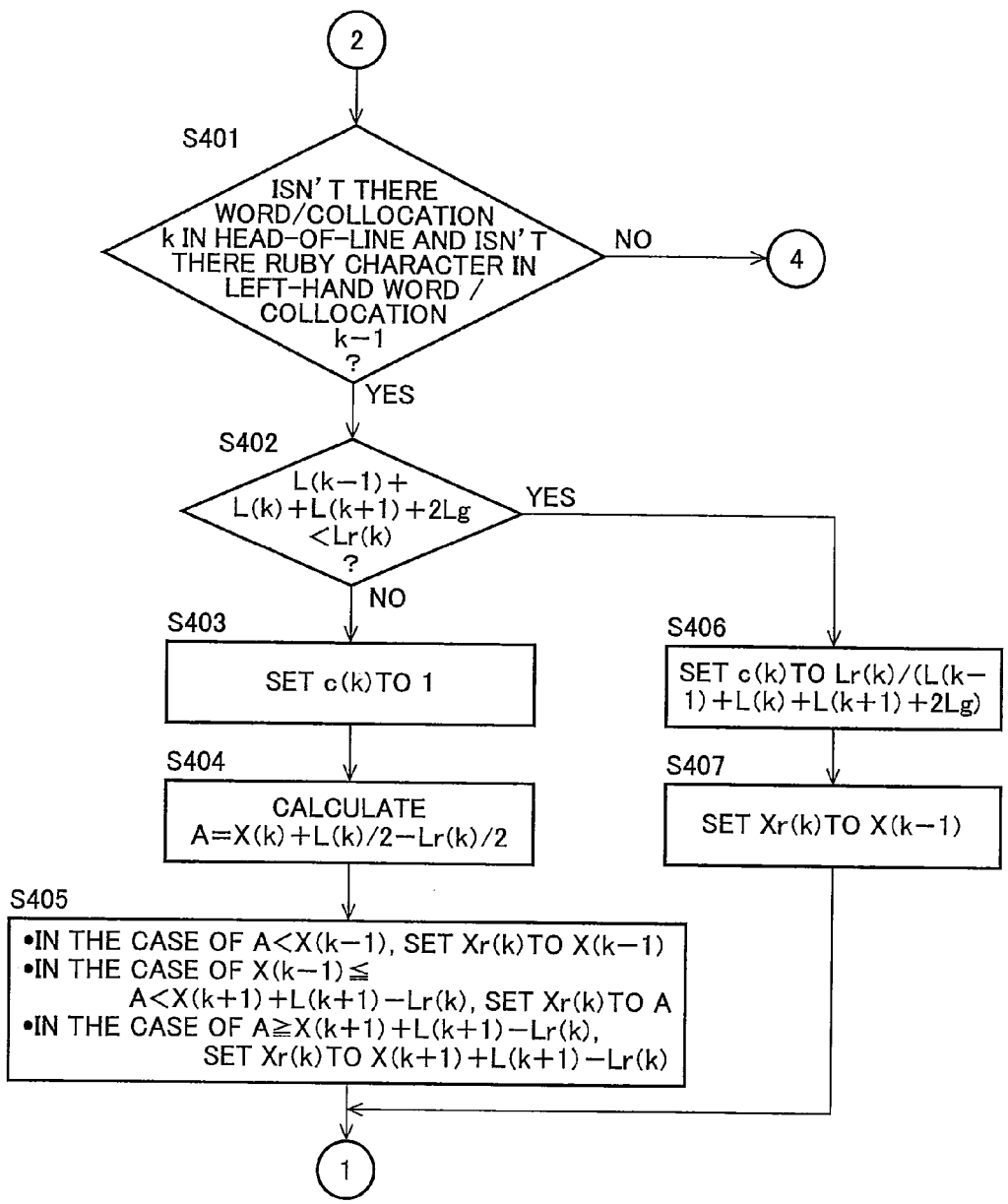
FIG. 11 is a flowchart showing an example of a processing procedure of ruby character size/arrangement setting processing in a case where ruby character sizes are not unified.

When the compressibility c (k) is larger than the predetermined threshold at step S312 of FIG. 10 (in the case of YES at step S312), as shown in FIG. 11, the ruby character setting portion 7f judges whether or not the word k or the collocation k is not in head-of-line, and there is no ruby character r (k−1) in the left-hand word k−1 or collocation k−1 (step S401).

When the word k or the collocation k is not in head-of-line, and there is no ruby character r (k−1) in the left-hand word k−1 or collocation k−1 (in the case of YES at step S401), the ruby character setting portion 7f judges whether or not the sum L (k−1)+L (k)+(k+1)+2Lg of the length L (k−1) of the word k−1 or the collocation k−1, the length L (k) of the word k or the collocation k, the length L (k+1) of the word k+1 or the collocation k+1, and a width of two blanks 2Lg is smaller than the length Lr (k) of the ruby character r (k) (step S402).

When the sum L (k−1)+L (k)+L (k+1)+2Lg is not smaller than the length Lr (k) of the ruby character r (k) (in the case of NO at step S402), a blank part in a lower part of the word k−1 or the collocation k−1 and a blank part in a lower part of the word k+1 or the collocation k+1 are used in addition to a part in a lower part of the word k or the collocation k, thereby making it possible to arrange the ruby character r (k) in a horizontal direction without shortening, so that the ruby character setting portion 7f sets the compressibility c (k) of the ruby character r (k) to 1 (step S403).

The ruby character setting portion 7f then calculates A=X (k)+L (k)/2−Lr (k)/2 so that the ruby character r (k) is arranged in a lower part in the center of the word k or the collocation k (step S404). The leftmost X coordinate Xr (k) of the ruby character r (k) is set to A so that it is possible to conform an X coordinate in the center of the word k or the collocation k to an X coordinate in the center of the ruby character r (k).

Thereafter, the ruby character setting portion 7f sets the leftmost X coordinate Xr (k) of the ruby character r (k) corresponding to the value of A (step S405). Specifically, the ruby character setting portion 7f sets, when A is smaller than the leftmost X coordinate X (k−1) of the word k−1 or the collocation k−1, Xr (k) to X (k−1). Furthermore, the ruby character setting portion 7f sets, when A is X (k−1) or more and less than X (k+1)+L (k+1)−Lr (k), Xr (k) to A. Additionally, the ruby character setting portion 7f sets, when A is X (k+1)+L (k+1)−Lr (k) or more, Xr (k) to X (k+1)+L (k+1)−Lr (k).

Thereafter, the ruby character setting portion 7f moves to step S1007 of FIG. 17 to continue subsequent processing.

At step S402 of FIG. 11, when the sum L (k−1)+L (k)+L (k+1)+2Lg is smaller than the length Lr (k) of the ruby character r (k) (in the case of YES at step S402), even when the blank part in a lower part of the word k−1 or the collocation k−1 and the blank part in a lower part of the word k+1 or the collocation k+1 are used, it is impossible to arrange the ruby character r (k) in a horizontal direction without shortening, and the ruby character setting portion 7f thus sets the compressibility c (k) of the ruby character r (k) to a ratio Lr (k)/(L (k−1)+L (k)+L (k+1)+2Lg) (step S406).

The ruby character setting portion 7f then sets the leftmost X coordinate Xr (k) of the ruby character r (k) to X (k−1) (step S407). Thereafter, the ruby character setting portion 7f moves to step S1007 of FIG. 17 to continue subsequent processing.

Figure 12:
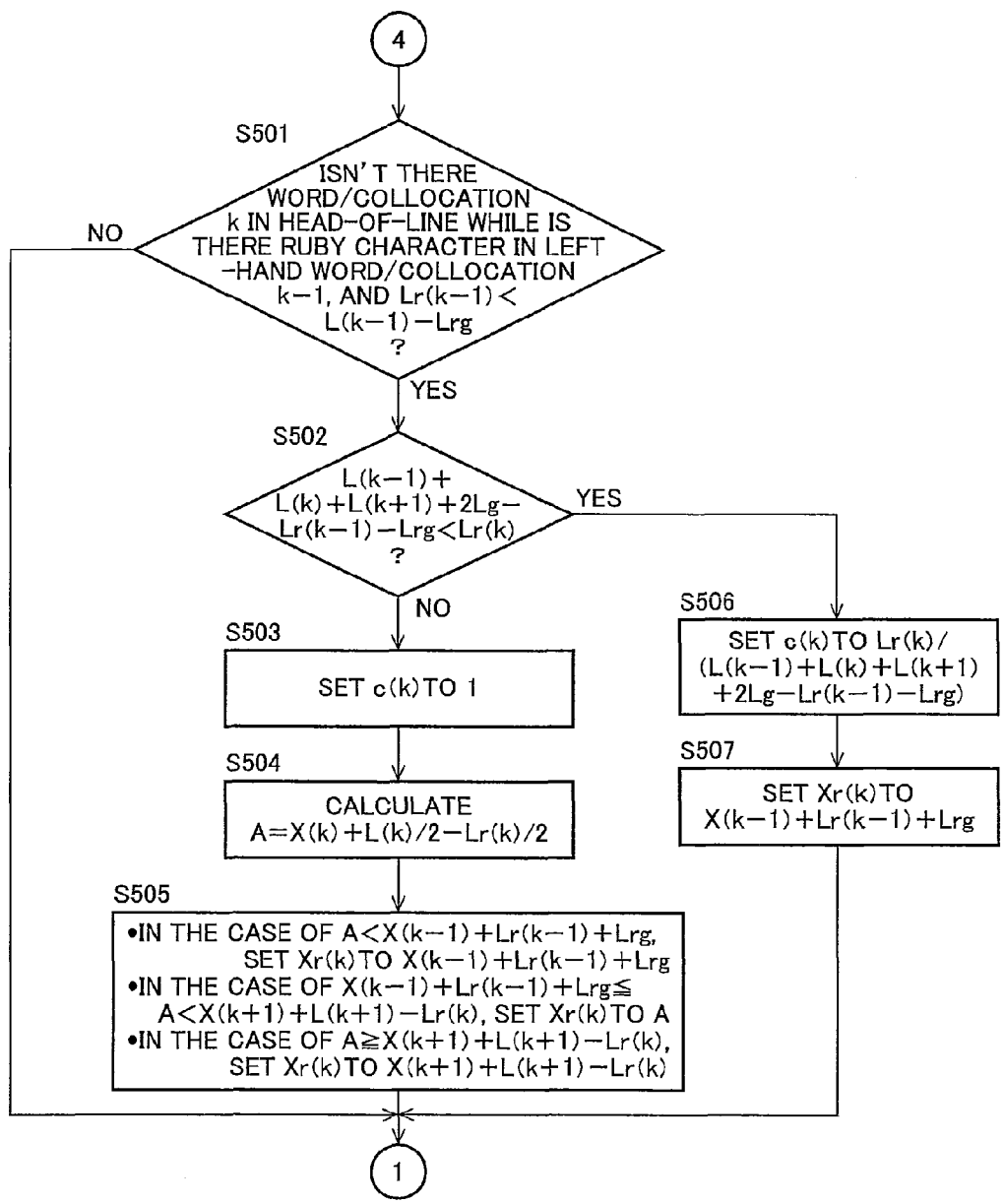
FIG. 12 is a flowchart showing an example of a processing procedure of ruby character size/arrangement setting processing in a case where ruby character sizes are not unified.

When a condition is not satisfied where the word k or the collocation k is not in head-of-line, and there is no ruby character r (k−1) in the left-hand word k−1 or collocation k−1 at step S401 of FIG. 11 (in the case of NO at step S401), as shown in FIG. 12, the ruby character setting portion 7f judges whether or not the word k or the collocation k is not in head-of-line while there is the ruby character r (k−1) in the left-hand word k−1 or collocation k−1, and a condition of Lr (k−1)<L (k−1)−Lrg is satisfied (step S501).

Here, Lrg is a minimum value of a width of a blank to be provided between ruby characters in the case of setting an arrangement position of the ruby character. Namely, the formula Lr (k−1)<L (k−1)−Lrg indicates that even though a blank to be provided in the ruby character r (k−1) and between ruby characters is arranged in a lower part of the word k−1or the collocation k−1, an area available for arranging the ruby character r (k) still remains.

When the word k or the collocation k is not in head-of-line while there is the ruby character r (k−1) in the left-hand word k−1 or collocation k−1, and the condition of Lr (k−1)<L (k−1)−Lrg is satisfied (in the case of YES at step 5501), the ruby character setting portion 7f judges whether or not a value L (k−1)+L (k)+L (k+1)+2Lg−Lr (k−1)−Lrg obtained by deducting the length Lr (k−1) of the ruby character r (k−1) and the minimum value Lrg of a width of a blank to be provided between ruby characters from the sum L (k−1)+L (k)+L (k+1)+2Lg is smaller than the length Lr (k) of the ruby character r (k) (step S502).

When the value L (k−1)+L (k)+L (k+1)+2Lg−Lr (k−1)−Lrg is not smaller than the length Lr (k) of the ruby character r (k) (in the case of NO at step S502), a blank part in a part of a lower part of the word k−1 or the collocation k−1 and a blank part in a lower part of the word k+1 or the collocation k+1 are used in addition to apart in a lower part of the word k or the collocation k, thereby making it possible to arrange the ruby character r (k) in a horizontal direction without shortening, so that the ruby character setting portion 7f sets the compressibility c (k) of the ruby character r (k) to 1 (step S503).

The ruby character setting portion 7f then calculates A=X (k)+L (k)/2−Lr (k)/2 (step S504). Subsequently, the ruby character setting portion 7f sets the leftmost X coordinate Xr (k) of the ruby character r (k) corresponding to the value of A (step S505). Specifically, the ruby character setting portion 7f sets, when the value A is smaller than X (k−1)+Lr (k−1)+Lrg, Xr (k) to X (k−1)+Lr (k−1)+Lrg. Additionally, the ruby character setting portion 7f sets, when the value A is X (k−1)+Lr (k−1)+Lrg or more and less than X (k+1)+L (k+1)−Lr (k), Xr (k) to A. Further, the ruby character setting portion 7f sets, when the value A is X (k+1)+L (k+1)−Lr (k) or more, Xr (k) to X (k+1)+L (k+1)−Lr (k).

Thereafter, the ruby character setting portion 7f moves to step S1007 of FIG. 17 to continue subsequent processing.

When the value L (k−1)+L (k)+L (k+1)+2Lg−Lr (k−1)−Lrg is smaller than the length Lr (k) of the ruby character r (k) at step S502 of FIG. 12 (in the case of YES at step S502), even though a blank part in a part of a lower part of the word k−1 or the collocation k−1 and a blank part in a lower part of the word k+1 or the collocation k+1 are used, it is impossible to arrange the ruby character r (k) in a horizontal direction without shortening, and the ruby character setting portion 7f thus sets the compressibility c (k) of the ruby character r (k) to a ratio Lr (k)/(L (k−1)+L (k)+L (k+1)+2Lg−Lr (k−1)−Lrg) (step S506).

The ruby character setting portion 7f then sets the leftmost X coordinate Xr (k) of the ruby character r (k) to X (k−1)+Lr (k−1)+Lrg (step S507). Thereafter, the ruby character setting portion 7f moves to step S1007 of FIG. 17 to continue subsequent processing.

When the word k or the collocation k is not in head-of-line while there is the ruby character r (k−1) in the left-hand word k−1 or collocation k−1, and a condition of Lr (k−1)<L (k−1)−Lrg is not satisfied at step S501 of FIG. 12 (in the case of NO at step S501), the ruby character setting portion 7f moves to step S1007 of FIG. 17 to continue subsequent processing.

Figure 13:
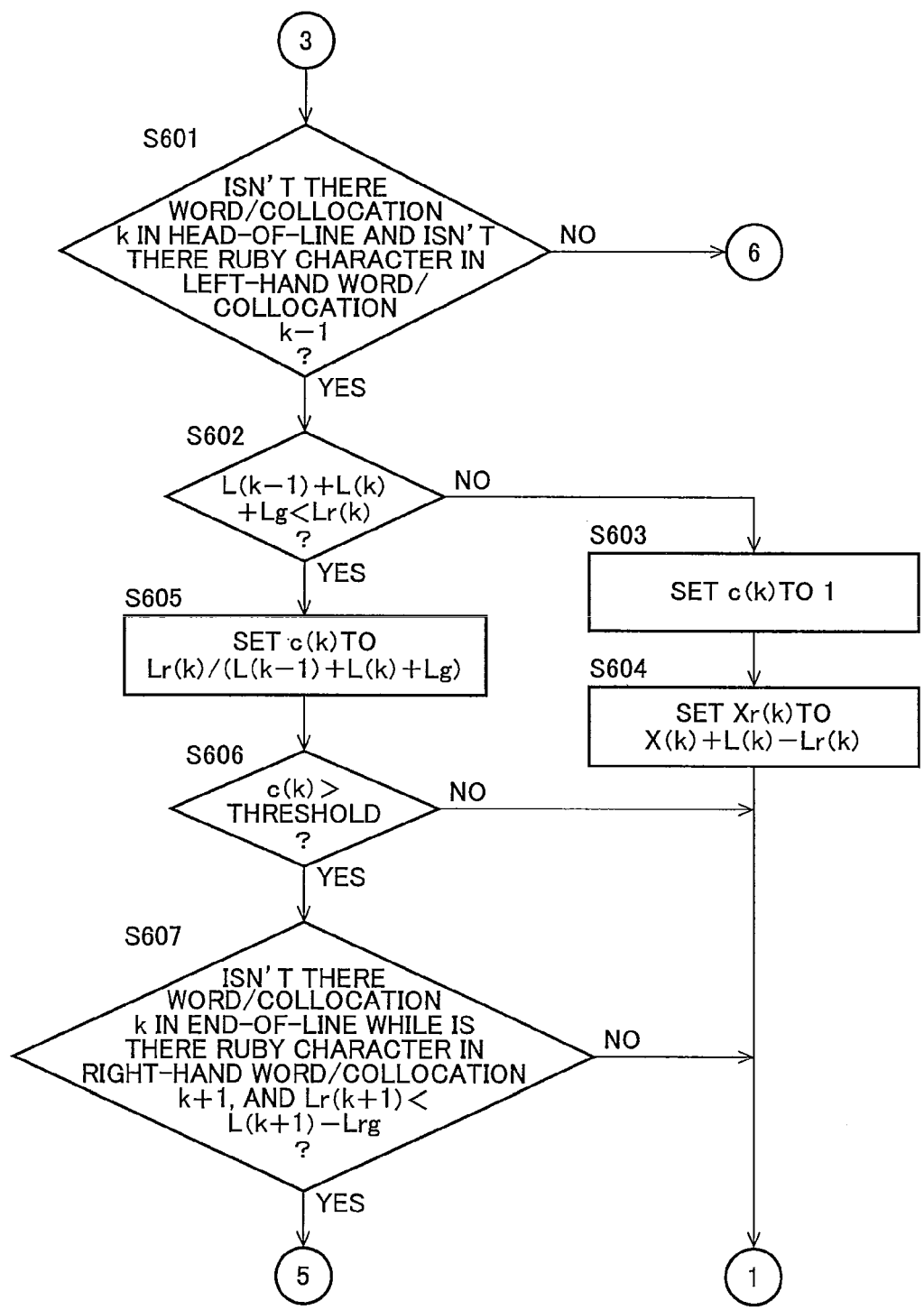
FIG. 13 is a flowchart showing an example of a processing procedure of ruby character size/arrangement setting processing in a case where ruby character sizes are not unified.

When a condition is not satisfied where the word k or the collocation k is not in end-of-line while there is no ruby character r (k+1) in the right-hand word k+1 or collocation k+1 at step S309 of FIG. 10 (in the case of NO at step S309), as shown in FIG. 13, the ruby character setting portion 7f judges whether or not the word k or the collocation k is not in head-of-line and there is no ruby character r (k−1) in the left-hand word k−1 or collocation k−1 (step S601).

When the word k or the collocation k is not in head-of-line and there is no ruby character r (k−1) in the left-hand word k−1 or collocation k−1 (in the case of YES at step S601), the ruby character setting portion 7f judges whether or not the sum L (k−1)+L (k)+Lg of the length L (k−1) of the word k−1 or the collocation k−1, the length L (k) of the word k or the collocation k and the width of a blank Lg is smaller than the length Lr (k) of the ruby character r (k) (step S602).

When the sum L (k−1)+L (k)+Lg is not smaller than the length Lr (k) of the ruby character r (k) (in the case of NO at step S602), a blank part in a lower part of the word k−1 or the collocation k−1 is used in addition to a part in a lower part of the word k or the collocation k, thereby making it possible to arrange the ruby character r (k) in a horizontal direction without shortening, so that the ruby character setting portion 7f sets the compressibility c (k) of the ruby character r (k) to 1 (step S603).

The ruby character setting portion 7f then sets the leftmost X coordinate Xr (k) of the ruby character r (k) to X (k)+L (k)−Lr(k) (step S604). Thereafter, the ruby character setting portion 7f moves to step S1007 of FIG. 17 to continue subsequent processing.

When the sum L (k−1)+L (k)+Lg is smaller than the length Lr (k) of the ruby character r (k) at step S602 of FIG. 13 (in the case of YES at step S602), even though the blank part in a lower part of the word k−1 or the collocation k−1 is used, it is impossible to arrange the ruby character r (k) in a horizontal direction without shortening, and the ruby character setting portion 7f thus resets the compressibility c (k) of the ruby character r (k) to a ratio Lr (k)/(L (k−1)+L (k)+Lg) (step S605).

The ruby character setting portion 7f then judges whether or not the compressibility c (k) is larger than the predetermined threshold (step S606). When the compressibility c (k) is not larger than the predetermined threshold (in the case of NO at step S606), the ruby character setting portion 7f moves to step S1007 of FIG. 17 to continue subsequent processing.

When the compressibility c (k) is larger than the predetermined threshold at step S606 of FIG. 13 (in the case of YES at step S606), the ruby character setting portion 7f judges whether or not the word k or the collocation k is not in end-of-line while there is the ruby character r (k+1) in the right-hand word k+1 or collocation k+1, and a condition of Lr (k+1)<L (k+1)−Lrg is satisfied (step S607). The formula Lr (k+1)<L (k+1)−Lrg shows that even though a blank to be provided in the ruby character r (k+1) and between ruby characters is arranged in a lower part of the word k+1 or the collocation k+1, an area available for arranging the ruby character r (k) still remains.

Figure 14:
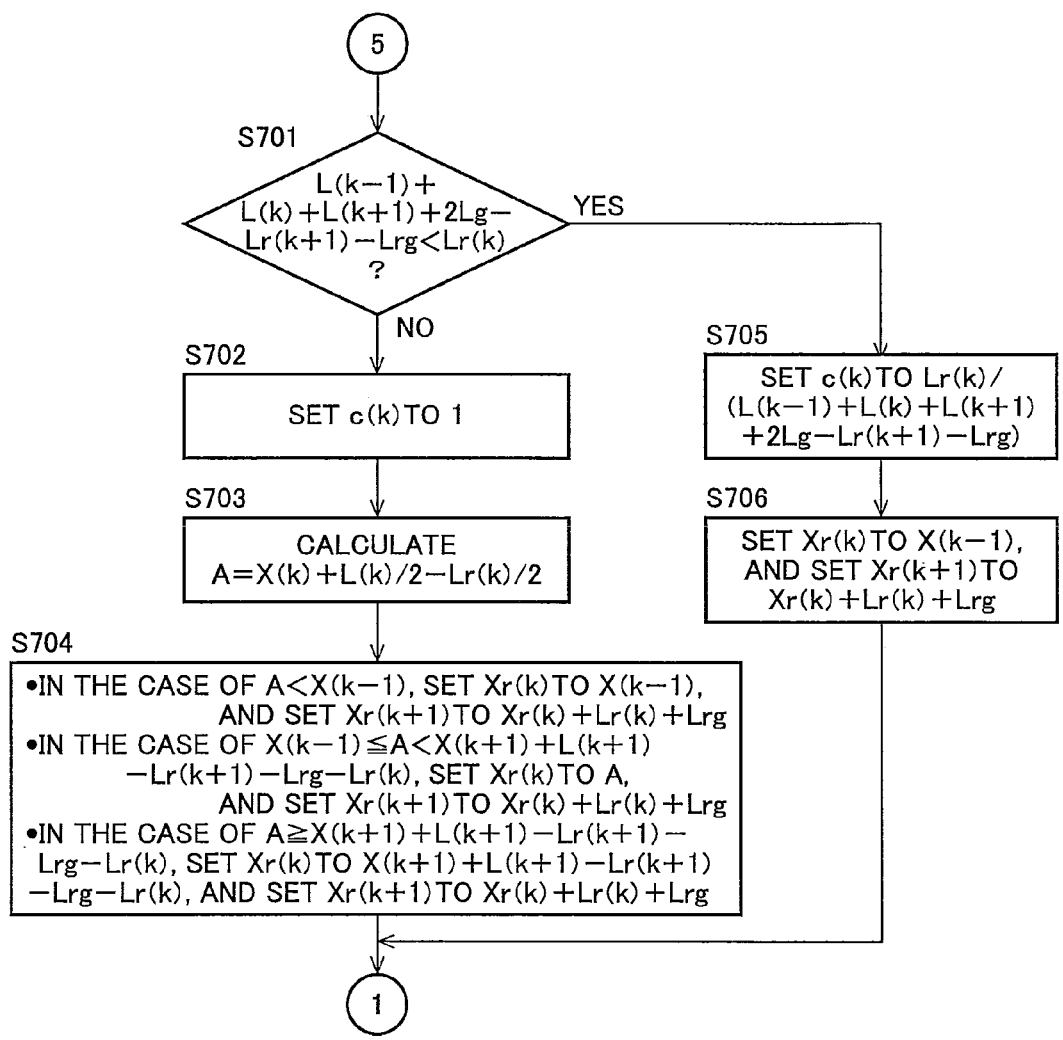
FIG. 14 is a flowchart showing an example of a processing procedure of ruby character size/arrangement setting processing in a case where ruby character sizes are not unified.

When the word k or the collocation k is not in end-of-line while there is the ruby character r (k+1) in the right-hand word k+1 or collocation k+1, and a condition of Lr (k+1)<L (k+1)−Lrg is satisfied (in the case of YES at step S607), as shown in FIG. 14, the ruby character setting portion 7f judges whether or not a value L (k−1)+L (k)+L (k+1)+2Lg−Lr (k+1)−Lrg obtained by deducting the length Lr (k+1) of the ruby character r (k+1) and the minimum value Lrg of a width of a blank to be provided between ruby characters from the sum L (k−1)+L (k)+L (k+1)+2Lg is smaller than the length Lr (k) of the ruby character r (k) (step S701).

When the value L (k−1)+L (k)+L (k+1)+2Lg−Lr (k+1)−Lrg is not smaller than the length Lr (k) of the ruby character r (k) (in the case of NO at step S701), a blank part in a lower part of the word k−1 or the collocation k−1, and a blank part in a part of a lower part of the word k+1 or the collocation k+1 are used in addition to a part in a lower part of the word k or the collocation k, thereby making it possible to arrange the ruby character r (k) in a horizontal direction without shortening, so that the ruby character setting portion 7f sets the compressibility c (k) of the ruby character r (k) to 1 (step S702).

The ruby character setting portion 7f then calculates A=X (k)+L (k)/2−Lr (k)/2 (step S703). Subsequently, the ruby character setting portion 7f sets the leftmost X coordinate Xr (k) of the ruby character r (k) and the leftmost X coordinate Xr (k+1) of the ruby character r (k+1) corresponding to the value of A (step S704).

Specifically, the ruby character setting portion 7f sets, when the value A is smaller than X (k−1), Xr (k) to X (k−1), and Xr (k+1) to Xr (k)+Lr (k)+Lrg. Additionally, the ruby character setting portion 7f sets, when the value A is X (k−1) or more and less than X (k+1)+L (k+1)−Lr (k+1)−Lrg−Lr (k), Xr (k) to A, and Xr (k+1) to Xr (k)+Lr (k)+Lrg. Further, the ruby character setting portion 7f sets, when the value A is X (k+1)+L (k+1)−Lr (k+1)−Lrg−Lr (k) or more, Xr (k) to X (k+1)+L (k+1)−Lr (k+1)−Lrg−Lr (k), and Xr (k+1) to Xr (k)+Lr (k)+Lrg.

Thereafter, the ruby character setting portion 7f moves to step S1007 of FIG. 17 to continue subsequent processing.

When the value L (k−1)+L (k)+L (k+1)+2Lg−Lr (k+1)−Lrg is smaller than the length Lr (k) of the ruby character r (k) at step S701 of FIG. 14 (in the case of YES at step S701), even though the blank part in a lower part of the word k−1 or the collocation k−1, and the blank part in a part of a lower part of the word k+1 or the collocation k+1 are used, it is impossible to arrange the ruby character r (k) in a horizontal direction without shortening, and the ruby character setting portion 7f thus sets the compressibility c (k) to a ratio Lr (k)/(L (k−1)+L (k)+L (k+1)+2Lg−Lr (k+1)−Lrg) (step S705).

The ruby character setting portion 7f then sets the leftmost X coordinate Xr (k) of the ruby character r (k) to X (k−1), and the leftmost X coordinate Xr (k+1) of the ruby character r (k+1) to Xr (k)+Lr (k)+Lrg (step S706). Thereafter, the ruby character setting portion 7f moves to step S1007 of FIG. 17 to continue subsequent processing.

Figure 15:
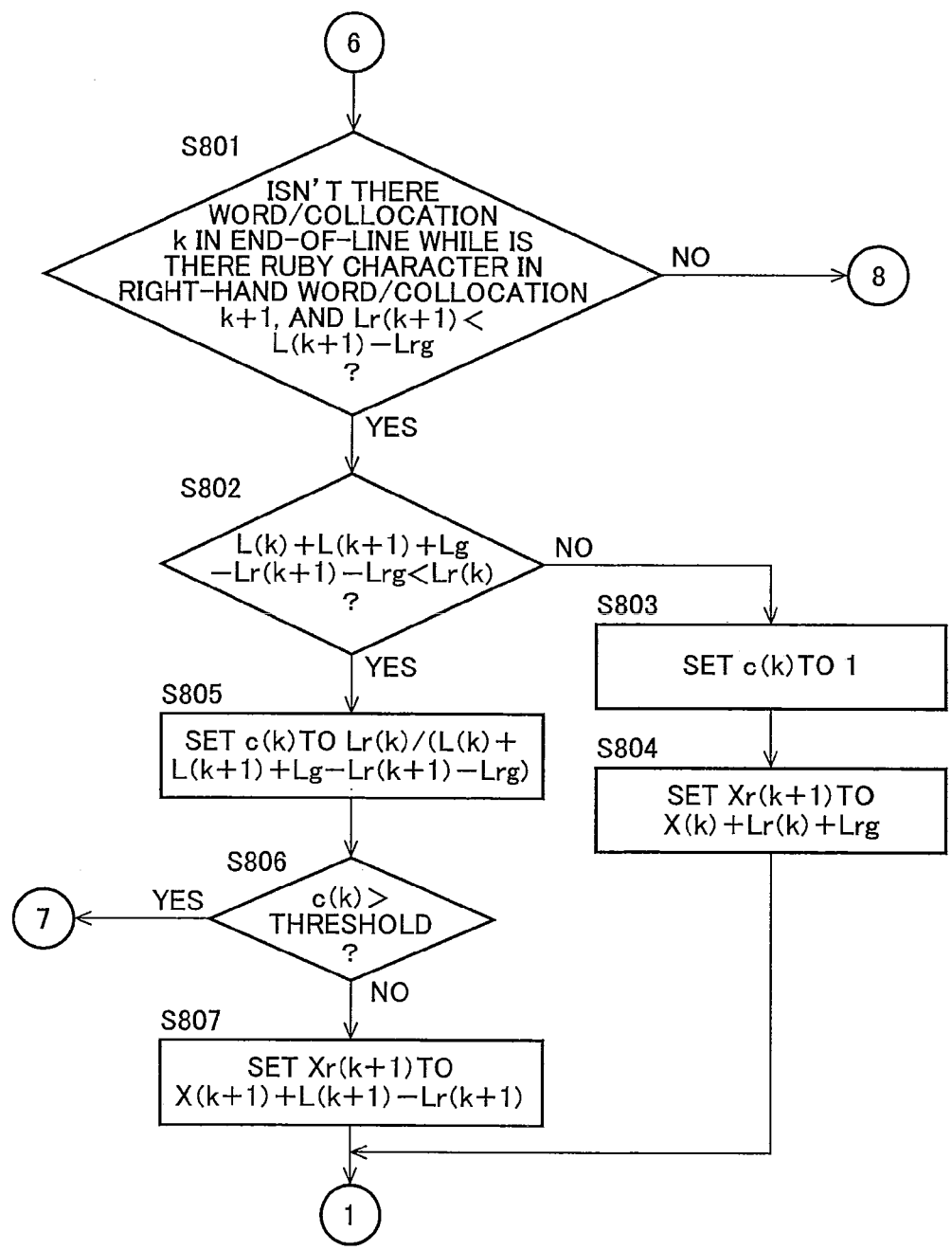
FIG. 15 is a flowchart showing an example of a processing procedure of ruby character size/arrangement setting processing in a case where ruby character sizes are not unified.

When a condition where the word k or the collocation k is not in head-of-line and there is no ruby character r (k−1) in the left-hand word k−1 or collocation k−1 is not satisfied at step S601 of FIG. 13 (in the case of NO at step S601), as shown in FIG. 15, the ruby character setting portion 7f judges whether or not the word k or the collocation k is not in end-of-line while there is the ruby character r (k+1) in the right-hand word k+1 or collocation k+1, and a condition of Lr (k+1)<L (k+1)−Lrg is satisfied (step S801).

When the word k or the collocation k is not in end-of-line while there is the ruby character r (k+1) in the right-hand word k+1 or collocation k+1, and the condition of Lr (k+1)<L (k+1)−Lrg is satisfied (in the case of YES at step S801), the ruby character setting portion 7f judges whether or not a value L (k)+L (k+1)+Lg−Lr (k+1)−Lrg obtained by deducting the length Lr (k+1) of the ruby character r (k+1) and the minimum value Lrg of a width of a blank to be provided between ruby characters from the sum L (k)+L (k+1)+Lg is smaller than the length Lr (k) of the ruby character r (k) (step S802).

When the value L (k)+L (k+1)+Lg−Lr (k+1)−Lrg is not smaller than the length Lr (k) of the ruby character r (k) (in the case of NO at step S802), a blank part in a part of a lower part of the word k+1 or the collocation k+1 is used in addition to a part in a lower part of the word k or the collocation k, thereby making it possible to arrange the ruby character r (k) in a horizontal direction without shortening, so that the ruby character setting portion 7f sets the compressibility c (k) of the ruby character r (k) to 1 (step S803).

The ruby character setting portion 7f then sets the leftmost X coordinate Xr (k+1) of the ruby character r (k+1) to X (k)+Lr (k)+Lrg (step 804). Thereafter, the ruby character setting portion 7f moves to step S1007 of FIG. 17 to continue subsequent processing.

Figure 19:
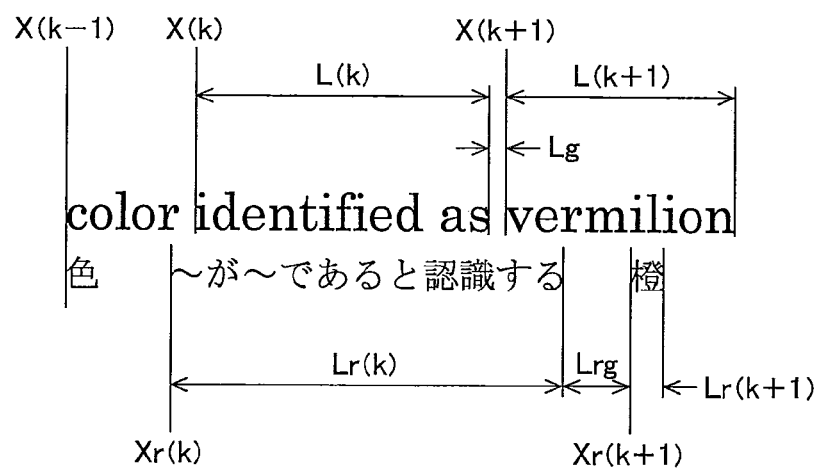
FIG. 19 is a diagram describing an example of arrangement of ruby characters using a blank part in a part of a lower part of a word k+1 or a collocation k+1.

FIG. 19 is a diagram describing an example of arrangement of ruby characters using a blank part in a part of a lower part of the word k+1 or the collocation k+1. FIG. 19 is an arrangement example of the ruby character r (k) in the case of judgment as NO at step S802 of FIG. 15, in which the ruby character r (k) is arranged in horizontal direction without shortening and the ruby character r (k+1) is arranged having an interval of Lrg from the ruby character r (k).

When the value L (k)+L (k+1)+Lg−Lr (k+1)−Lrg is smaller than the length Lr (k) of the ruby character r (k) at step S802 of FIG. 15 (in the case of YES at step S802), even though a blank part in a part of a lower part of the word k+1 or the collocation k+1 is used, it is impossible to arrange the ruby character r (k) in a horizontal direction without shortening, and the ruby character setting portion 7f thus sets the compressibility c (k) of the ruby character r (k) to a ratio Lr (k)/(L (k)+L (k+1)+Lg−Lr (k+1)−Lrg) (step S805).

The ruby character setting portion 7f then judges whether or not the compressibility c (k) is larger than the predetermined threshold (step S806). When the compressibility c (k) is not larger than the predetermined threshold (in the case of NO at step S806), the ruby character setting portion 7f sets the leftmost X coordinate Xr (k+1) of the ruby character r (k+1) to X (k+1)+L (k+1)−Lr (k+1) (step S807). Thereafter, the ruby character setting portion 7f moves to step S1007 of FIG. 17 to continue subsequent processing.

Figure 20:
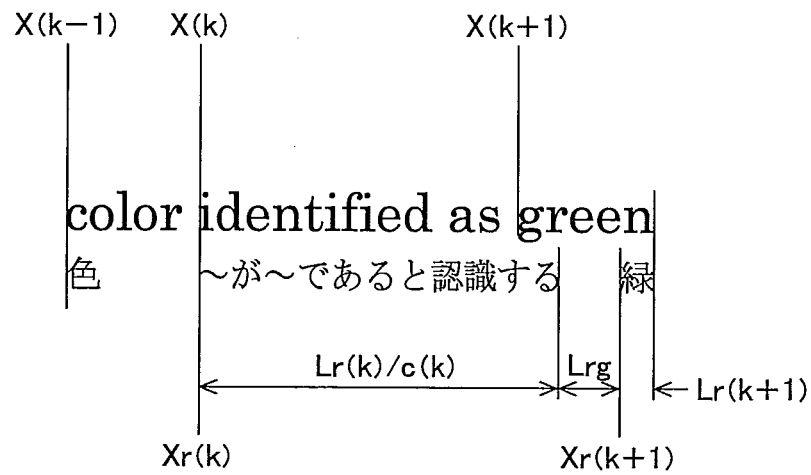
FIG. 20 is a diagram describing an example of arrangement of ruby characters using a blank part in a part of a lower part of the word k+1 or the collocation k+1.

FIG. 20 is a diagram describing an example of arrangement of ruby characters using a blank part in a part of a lower part of the word k+1 or the collocation k+1. FIG. 20 is an arrangement example of the ruby character r (k) in the case of judgment as YES at step S802 and judgment as NO at step S806 in FIG. 15, in which the ruby character r (k) is shortened in a horizontal direction by the compressibility c (k) to be arranged and the ruby character r (k+1) is arranged so that a leftmost X coordinate conforms to the leftmost X coordinate of the word k+1 or the collocation k+1.

Figure 16:
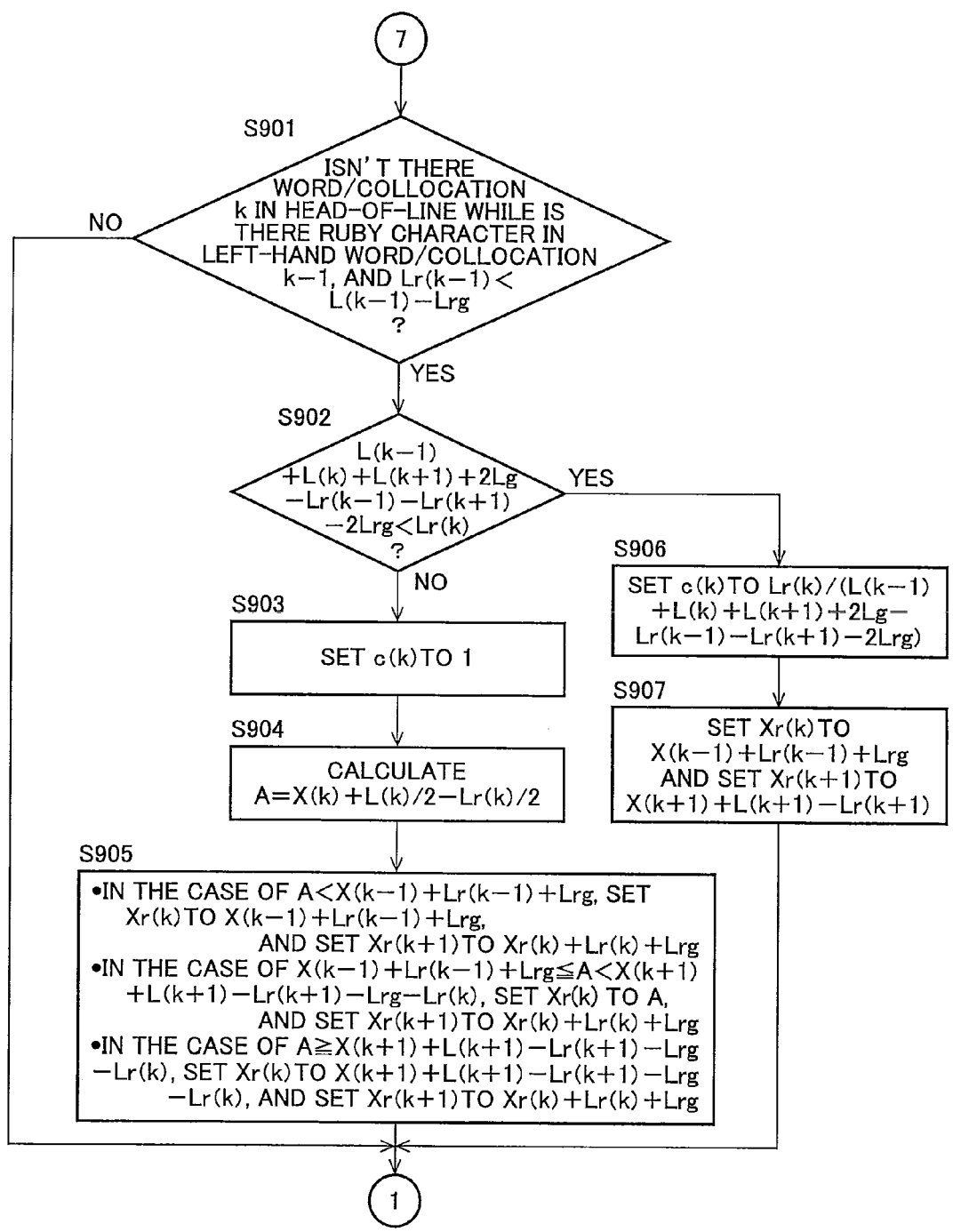
FIG. 16 is a flowchart showing an example of a processing procedure of ruby character size/arrangement setting processing in a case where ruby character sizes are not unified.

When the compressibility c (k) is larger than the predetermined threshold at step S806 of FIG. 15 (in the case of YES at step S806), as shown in FIG. 16, the ruby character setting portion 7f judges whether or not the word k or the collocation k is not in head-of-line while there is the ruby character r (k−1) in the left-hand word k−1 or collocation k−1, and a condition of Lr (k−1)<L (k−1)−Lrg is satisfied (step S901).

When the word k or the collocation k is not in head-of-line while there is the ruby character r (k−1) in the left-hand word k−1 or collocation k−1, and the condition of Lr (k−1)<L (k−1)−Lrg is satisfied (in the case of YES at step S901), the ruby character setting portion 7f judges whether or not a value L (k−1)+L (k)+L (k+1)+2Lg−Lr (k−1)−Lr (k+1)−2Lrg obtained by deducting the length Lr (k−1) of the ruby character r (k−1), the length Lr (k+1) of the ruby character r (k+1) and the minimum value 2Lrg of a width of two blanks to be provided between ruby characters from the sum L (k−1)+L (k)+L (k+1)+2Lg is smaller than the length Lr (k) of the ruby character r (k) (step S902).

When the value L (k−1)+L (k)+L (k+1)+2Lg−Lr (k−1)−Lr (k+1)−2Lrg is not smaller than the length Lr (k) of the ruby character r (k) (in the case of NO at step S902), a blank part in a part of a lower part of the word k−1 or the collocation k−1 and a blank part in a part of a lower part of the word k+1 or the collocation k+1 are used in addition to a part in a lower part of the word k or the collocation k, thereby making it possible to arrange the ruby character r (k) in a horizontal direction without shortening, so that the ruby character setting portion 7f sets the compressibility c (k) of the ruby character r (k) to 1 (step S903).

The ruby character setting portion 7f then calculates A=X (k)+L (k)/2−Lr (k)/2 (step S904). Subsequently, the ruby character setting portion 7f sets the leftmost X coordinate Xr (k) of the ruby character r (k) and the leftmost X coordinate Xr (k+1) of the ruby character r (k+1) corresponding to the value of A (step S905).

Specifically, when the value A is smaller than X (k−1)+Lr (k−1)+Lrg, the ruby character setting portion 7f sets Xr (k) to X (k−1)+Lr (k−1)+Lrg, and sets Xr (k+1) to Xr (k)+Lr (k)+Lrg. Further, when the value A is X (k−1)+Lr (k−1)+Lrg or more and less than X (k+1)+L (k+1)−Lr (k+1)−Lrg−Lr (k), the ruby character setting portion 7f sets Xr (k) to A, and sets Xr (k+1) to Xr (k)+Lr (k)+Lrg. Additionally, when the value A is X (k+1)+L (k+1)−Lr (k+1)−Lrg−Lr (k) or more, the ruby character setting portion 7f sets Xr (k) to X (k+1)+L (k+1)−Lr (k+1)−Lrg−Lr (k), and sets Xr (k+1) to Xr (k)+Lr (k)+Lrg.

Thereafter, the ruby character setting portion 7f moves to step S1007 of FIG. 17 to continue subsequent processing.

Figure 21:
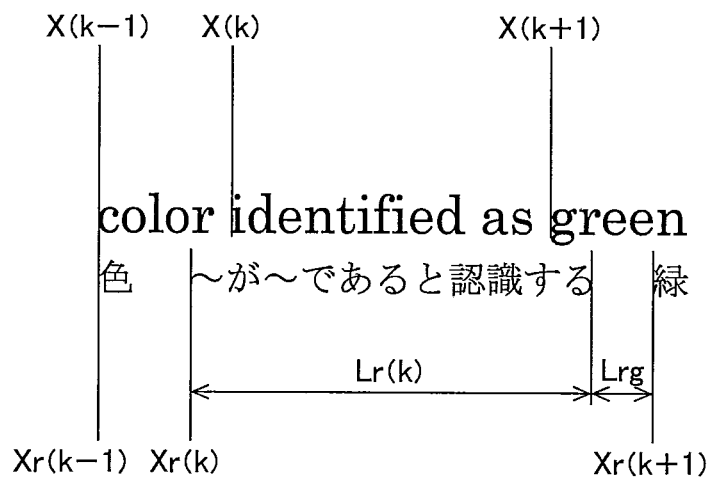
FIG. 21 is a diagram describing an example of arrangement of ruby characters using a blank part in a part of a lower part of a word k−1 or a collocation k−1 and a blank part in a part of a lower part of the word k+1 and the collocation k+1.

FIG. 21 is a diagram describing an example of arrangement of ruby characters using a blank part in a part of a lower part of the word k−1 or the collocation k−1 and a blank part in a part of a lower part of the word k+1 and the collocation k+1. FIG. 21 is an arrangement example of the ruby character r (k) in the case of judgment as NO at step S902 of FIG. 16, in which the ruby character r (k) is arranged in a horizontal direction without shortening and the ruby character r (k+1) is arranged having an interval of Lrg from the ruby character r (k).

When the value L (k−1)+L (k)+L (k+1)+2Lg−Lr (k−1)−Lr (k+1)−2Lrg is smaller than the length Lr (k) of the ruby character r (k) at step S902 of FIG. 16 (in the case of YES at step S902), even though the blank part in a part of a lower part of the word k−1 or the collocation k−1 and the blank part in a part of a lower part of the word k+1 or the collocation k+1 are used, it is impossible to arrange the ruby character r (k) in a horizontal direction without shortening, and the ruby character setting portion 7f thus sets the compressibility c (k) of the ruby character r (k) to a ratio Lr (k)/(L(k−1)+L (k)+L (k+1)+2Lg−Lr (k−1)−Lr (k+1)−2Lrg) (step S906).

The ruby character setting portion 7f then sets the leftmost X coordinate Xr (k) of the ruby character r (k) to X (k−1)+Lr (k−1)+Lrg, and sets the leftmost X coordinate Xr (k+1) of the ruby character r (k+1) to X (k+1)+L (k+1)−Lr (k+1) (step S907). Thereafter, the ruby character setting portion 7f moves to step S1007 of FIG. 17 to continue subsequent processing.

When the word k or the collocation k is not in head-of-line while there is the ruby character r (k−1) in the left-hand word k−1 or collocation k−1, and a condition of Lr (k−1)<L (k−1)−Lrg is not satisfied at step S901 of FIG. 16 (in the case of NO at step S901), the ruby character setting portion 7f moves to step S1007 of FIG. 17 to continue subsequent processing.

When the word k or the collocation k is not in end-of-line while there is the ruby character r (k+1) in the right-hand word k+1 or collocation k+1, and a condition of Lr (k+1)<L (k+1)−Lrg is not satisfied at step S801 of FIG. 15 (in the case of NO at step S801), as shown in FIG. 17, the ruby character setting portion 7f judges whether or not the word k or the collocation k is not in head-of-line while there is the ruby character r (k−1) in the left-hand word k−1 or collocation k−1, and the condition of Lr (k−1)<L (k−1)−Lrg is satisfied (step S1001).

When the word k or the collocation k is not in head-of-line while there is the ruby character r (k−1) in the left-hand word k−1 or collocation k−1, and the condition of Lr (k−1)<L (k−1)−Lrg is satisfied (in the case of YES at step S1001), the ruby character setting portion 7f judges whether or not a value L (k−1)+L (k)+Lg−Lr (k−1)−Lrg obtained by deducting the length Lr (k−1) of the ruby character r (k−1) and the minimum value Lrg of a width of a blank to be provided between ruby characters from the sum L (k−1)+L (k)+Lg is smaller than the length Lr (k) of the ruby character r (k) (step S1002).

When the value L (k−1)+L (k)+Lg−Lr (k−1)−Lrg is not smaller than the length Lr (k) of the ruby character r (k) (in the case of NO at step S1002), a blank part in a part of a lower part of the word k−1 or the collocation k−1 is used in addition to a part in a lower part of the word k or the collocation k, thereby making it possible to arrange the ruby character r (k) in a horizontal direction without shortening, so that the ruby character setting portion 7f sets the compressibility c (k) of the ruby character r (k) to 1 (step S1003).

The ruby character setting portion 7f then sets the leftmost X coordinate Xr (k) of the ruby character r (k) to X (k)+L (k)−Lr (k) (step S1004). Subsequently, the ruby character setting portion 7f moves to step S1007 to continue subsequent processing.

Figure 22:
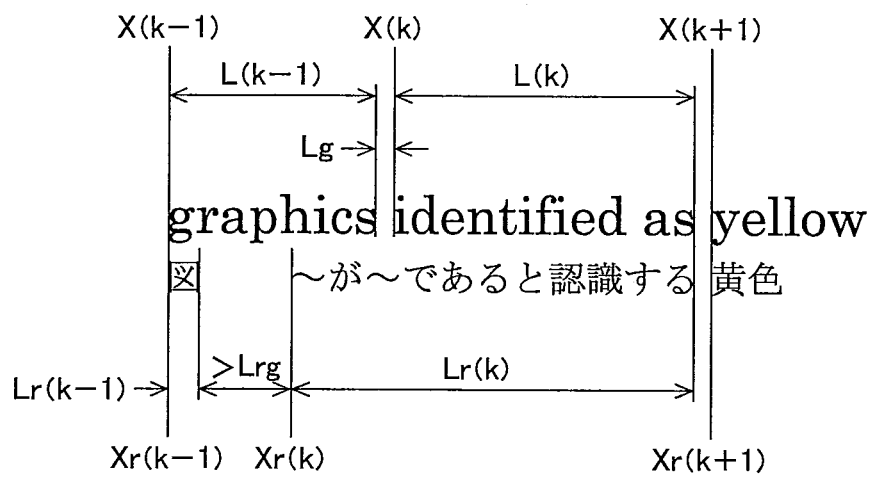
FIG. 22 is a diagram describing an example of arrangement of ruby characters using a blank part in a part of a lower part of the word k−1 or the collocation k−1.

FIG. 22 is a diagram describing an example of arrangement of ruby characters using a blank part in a part of a lower part of a word k−1 or a collocation k−1. FIG. 22 is an arrangement example of the ruby character r (k) in the case of judgment as NO at step S1002 of FIG. 17, in which the ruby character r (k) is arranged in a horizontal direction without shortening and the ruby character r (k) is arranged having an interval of Lrg or more from the ruby character r (k−1).

When the value L (k−1)+L (k)+Lg−Lr (k−1)−Lrg is smaller than the length Lr (k) of the ruby character r (k) at step S1002 of FIG. 17 (in the case of YES at step S1002), even though the blank part in a part of a lower part of the word k−1 or the collocation k−1 is used, it is impossible to arrange the ruby character r (k) in a horizontal direction without shortening, the ruby character setting portion 7f thus sets the compressibility c (k) of the ruby character r (k) to a ratio Lr (k)/(L (k−1)+L (k)+Lg−Lr (k−1)−Lrg) (step S1005).

The ruby character setting portion 7f then sets the leftmost X coordinate Xr (k) of the ruby character r (k) to X (k−1)+Lr (k−1)+Lrg (step S1006). Subsequently, the ruby character setting portion 7f moves to step S1007 to continue subsequent processing.

Figure 23:
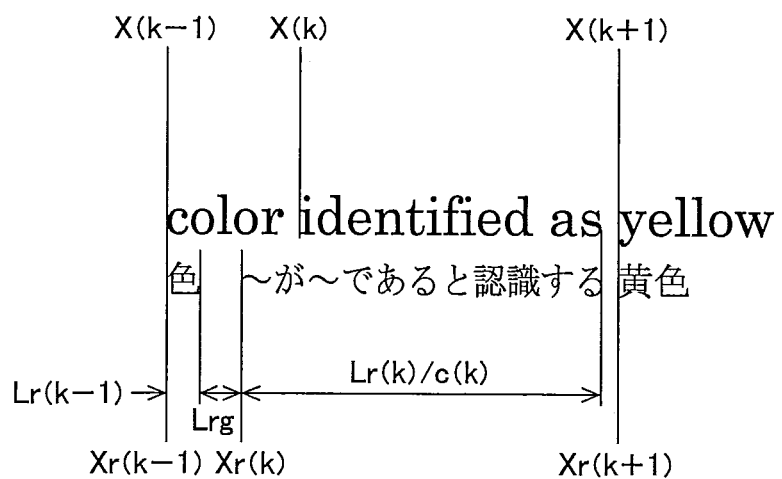
FIG. 23 is a diagram describing an example of arrangement of ruby characters using a blank part in a part of a lower part of the word k−1 or the collocation k−1.

FIG. 23 is a diagram describing an example of arrangement of ruby characters using a blank part in a part of a lower part of a word k−1 or a collocation k−1. FIG. 23 is an arrangement example of the ruby character r (k) in the case of judgment as YES at step S1002 of FIG. 17, in which the ruby character r (k) is shortened in a horizontal direction by the compressibility c (k) to be arranged and the ruby character r (k) is arranged having an interval of Lrg from the ruby character r (k−1).

When the word k or the collocation k is not in head-of-line while there is the ruby character r (k−1) in the left-hand word k−1 or collocation k−1, and a condition of Lr (k−1)<L (k−1)−Lrg is not satisfied at step S1001 of FIG. 17 (in the case of NO at step S1001), the ruby character setting portion 7f moves to step S1007 to continue subsequent processing.

As described above, when the compressibility c (k) (1≤k≤N) is larger than the predetermined threshold, and when there is no need to give ruby characters r (k−1) and r (k+1) to the words k−1 and k+1 or the collocations k−1 and k+1 on the left or the right of the word k or the collocation k, or a value in which the width of a blank Lrg that is provided between ruby characters is added to the lengths Lr (k−1) and Lr (k+1) of the ruby characters r (k−1) and r (k+1) that are given to the words k−1 and k+1 or the collocations k−1 and k+1 on the left or the right of the word k or the collocation k is smaller than the lengths L (k−1) and L (k+1) of the words k−1 and k+1 or the collocations k−1 and k+1 on the left or the right of the word k or the collocation k, the ruby character setting portion 7f sets an area near the words k−1 and k+1 or the collocations k−1 and k+1 on the left or the right of the word k or the collocation k as an area for arranging the ruby character r (k). This makes it possible to arrange a ruby character in a readable way without enormously compressing a character of the ruby character r (k).

Figure 24:
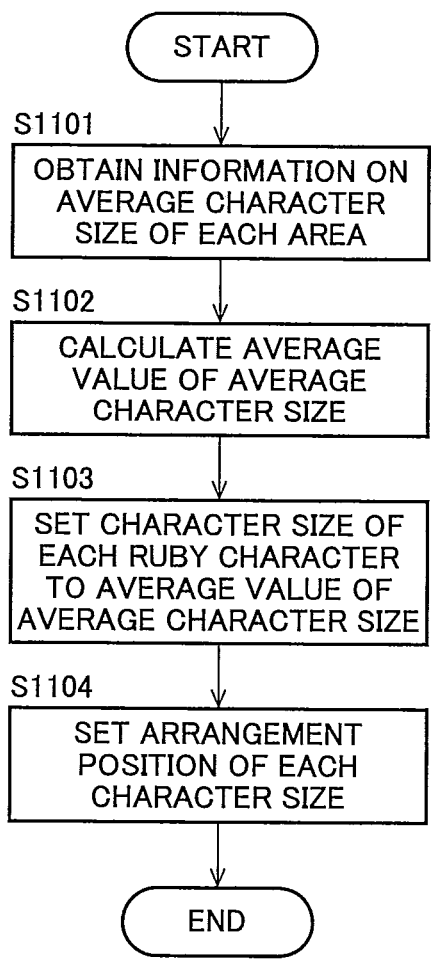
FIG. 24 is a flowchart showing an example of a processing procedure of ruby character size/arrangement setting processing in a case where ruby character sizes are unified.

Next, description will be given for a processing procedure of ruby character size/arrangement setting processing in a case where the sizes of ruby characters are unified, which is shown in FIG. 7. FIG. 24 is a flowchart showing an example of a processing procedure of ruby character size/arrangement setting processing in a case where the sizes of ruby characters are unified. As shown in FIG. 24, first, the ruby character setting portion 7f of the document generating apparatus 1 obtains information on an average character size of each character area from the document layout data 6e stored in the storage portion 6 (step S1101).

The ruby character setting portion 7f then calculates an average value of the obtained average character size of each character area (step S1102). Subsequently, the ruby character setting portion 7f sets character sizes of ruby characters given to each word or each collocation included in a document to the average value of the average character size (step S1103). Thereby, character sizes of all the ruby characters in the document are unified. Thereafter, the ruby character setting portion 7f sets an arrangement position of each ruby character (step S1104).

Specifically, the ruby character setting portion 7f sets a Y coordinate at a lower end of a ruby character so that the ruby character is arranged at a central part of a line space. In a case where a word or a collocation is in a lowest line, the ruby character setting portion 7f sets the Y coordinate at the lower end of the ruby character so that an interval between a word or a collocation and the ruby character becomes the same as an interval in a line directly above. In the case of having only one line, the ruby character setting portion 7f sets the Y coordinate at the lower end of the ruby character so as to have a predetermined interval between a word or a collocation and the ruby character. Alternatively, the ruby character setting portion 7f may set a position displaced in a lower direction only in size in a height direction of a font displaying the ruby character from the Y coordinate at the lower end of the word or the collocation as the Y coordinate at the lower end of the ruby character.

Moreover, the ruby character setting portion 7f sets a leftmost X coordinate of a ruby character so as to be the same as a leftmost X coordinate of a word or a collocation to which the ruby character is given. Then, for example, as shown FIG. 18, in a case where a length of ruby characters "-ga-dearutoninshikisuru" is longer than a length of a word or a collocation "identified as" to which the ruby characters are given, and there is still enough space for arranging the ruby characters even though the ruby characters "iro" and "daidai" are given to a preceding or subsequent word or collocation "color" and "vermilion", processing is performed for displacing the leftmost X coordinate of the ruby characters "-ga-dearutoninshikisuru" to the left or the right. After processing of step S1104, the ruby character setting portion 7f finishes the ruby character size/arrangement setting processing.

Note that, here, a character size of a ruby character is set to an average value of an average character size of each character area, however, a setting method of the size of the ruby character is not limited thereto, and a representative value of the size of the ruby character may be calculated by means of another method to set the size of the ruby character to the representative value. For example, the number of characters included in each character area may be regarded as a weight to calculate weighted average efficiency of an average character size of each character area, and the character size of the ruby character may be set to the calculated weighted average efficiency. Further, a value that is statistically out of average character sizes of respective character areas having a difference of a predetermined value or more may be excluded to calculate an average value or weighted average efficiency.

Additionally, the average value of the character size of characters included in the whole sentence is calculated again without using the average character size calculated per character area and the like so that the representative value of the size of a ruby character may be calculated to set the size of the ruby character to the representative value.

Note that, a document intended to unify the character sizes of ruby characters is not limited to a document having one page and may be a document comprised of a plurality of pages. Namely, when a variance value of the character size is calculated over the whole of the plurality of pages and the variance value is judged to be less than a predetermined threshold, an average value and weighted average efficiency of the character size are calculated, and character sizes of ruby characters that are given to characters included in a plurality of pages may be set to the calculated average value or weighted average efficiency.

Further, when all character sizes of ruby characters in a document are unified, the character sizes of the ruby characters may be set so as to conform to a length of a word or a collocation once, and a minimum character size may be selected from among the set character sizes to set all the character sizes of the ruby characters to the minimum character size. Hereinafter, description will be given for this variant example.

FIG. 25 to FIG. 33 are flowcharts showing a variant example of a processing procedure of ruby character size/arrangement setting processing in a case where the sizes of ruby characters are unified. In the ruby character size/arrangement setting processing, a compressibility c (k) relative to all the ruby character r (k) (1≤k≤N) is calculated to detect a minimum one among character sizes after compression at the compressibility. Then, the character sizes of the ruby characters are unified to that size. Thereby, ruby characters added to a document become easy to be read.

Figure 25:
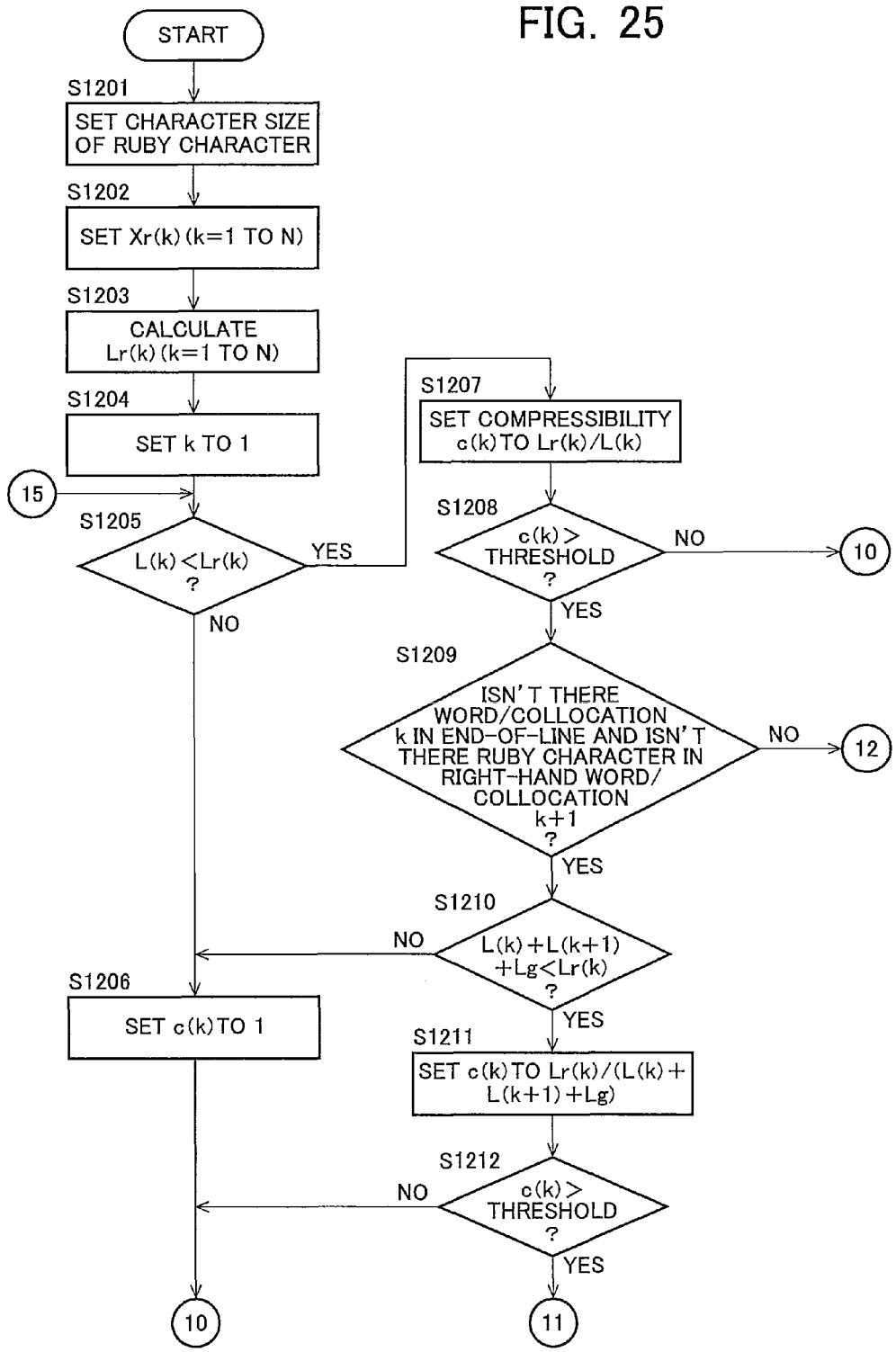
FIG. 25 is a flowchart showing a variant example of a processing procedure of ruby character size/arrangement setting processing in a case where ruby character sizes are unified.

As shown in FIG. 25, first, the ruby character setting portion 7f of the document generating apparatus 1 sets a character size of a ruby character (step S1201). Specifically, the ruby character setting portion 7f compares a line space of a word or a collocation to a vertical length of a font of a character included in a word or a collocation.

Then, when a line space is less than 40% of a vertical length of a font of a character, the ruby character setting portion 7f sets the size of a character that is given as a ruby character so that a vertical length of a font of the character that is given as the ruby character becomes 40% of a vertical length of a font of a character included in a word or a collocation. When a line space exceeds 80% of a vertical length of a font of a character, the ruby character setting portion 7f sets the size of a character that is given as a ruby character so that the vertical length of the character that is given as the ruby character becomes 80% of a vertical length of a font of a character included in a word or a collocation. Additionally, when a line space is 40 to 80% of a vertical length of a font of a character, the ruby character setting portion 7f sets the size of a character that is given as a ruby character so that a vertical length of a font of the character that is given as the ruby character becomes the same length as the line space. Note that, in this setting method, a threshold different from 40% or 80% may be used.

Subsequently, the ruby character setting portion 7f sets the leftmost X coordinate Xr (k) of a ruby character (1≤k≤N) (step S1202). Specifically, the ruby character setting portion 7f sets the leftmost X coordinate Xr (n) of a ruby character to the leftmost X coordinate X (k) of a word or a collocation.

Then, the ruby character setting portion 7f calculates a length of a ruby character Lr (k) (1≤k≤N) (step S1203). Specifically, the ruby character setting portion 7f calculates the length Lr (k) of the ruby character r (k) from information on a width of a character included in the ruby character r (k), a width of a blank provided between characters and the number of characters. Thereafter, the ruby character setting portion 7f sets the identification number k of a word or a collocation to 1 (step S1204).

Subsequently, the ruby character setting portion 7f judges whether or not the length L (k) of a word or a collocation is shorter than the length Lr (k) of the ruby character r (k) (step S1205). When the length L (k) is not shorter than the length Lr (k) (in the case of NO at step S1205), the ruby character setting portion 7*f* sets compressibility c (k) of the ruby character r (k) to 1 (step S1206).

Figure 29:
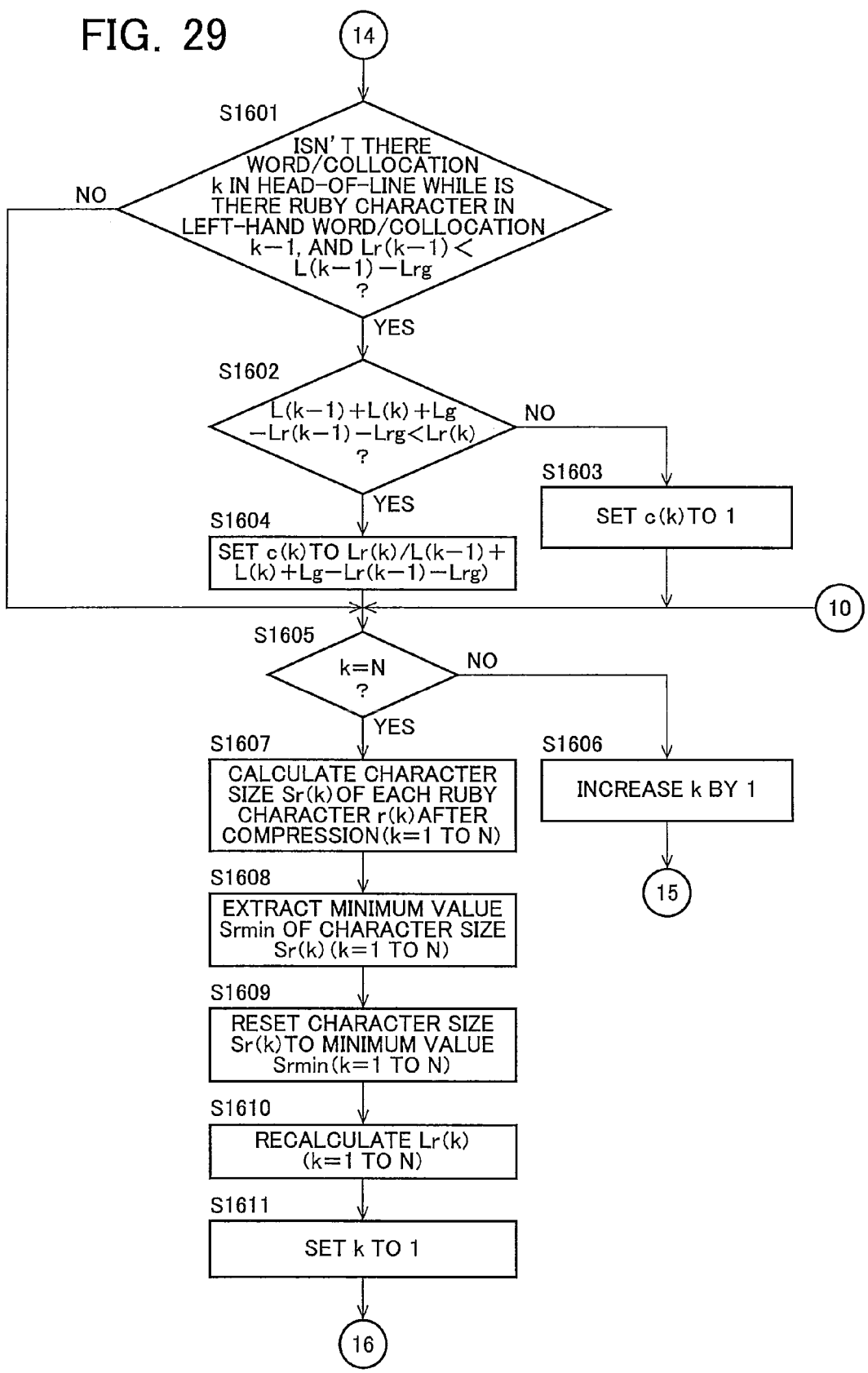
FIG. 29 is a flowchart showing a variant example of a processing procedure of ruby character size/arrangement setting processing in a case where ruby character sizes are unified.

Then, as shown in FIG. 29, the ruby character setting portion 7*f* checks whether or not k is N (step S1605). When k is not N (in the case of NO at step S1605), the ruby character setting portion 7*f* increases k by 1 (step S1606), and moves to step S1205 of FIG. 25 to continue subsequent processing.

When the length L (k) is shorter than the length Lr (k) at step S1205 of FIG. 25 (in the case of YES at step S1205), the ruby character setting portion 7*f* sets the compressibility c (k) of a ruby character to a ratio Lr (k)/L (k) (step S1207). The ruby character setting portion 7*f* then judges whether or not the compressibility c (k) is larger than the predetermined threshold (step S1208).

When the compressibility c (k) is not larger than the predetermined threshold (in the case of NO at step S1208), the ruby character setting portion 7*f* moves to step S1605 of FIG. 29 to continue subsequent processing.

When the compressibility c (k) is larger than the predetermined threshold at step S1208 of FIG. 25 (in the case of YES at step S1208), the ruby character setting portion 7*f* judges whether or not the word k or the collocation k is not in end-of-line, and there is no ruby character r (k+1) in the right-hand word k+1 or collocation k+1 (step S1209).

When the word k or the collocation k is not in end-of-line, and there is no ruby character r (k+1) in the right-hand word k+1 or collocation k+1 (in the case of YES at step S1209), the ruby character setting portion 7*f* judges whether or not the sum L (k)+L (k+1)+Lg of the length L (k) of the word k or the collocation k, the length L (k+1) of the word k+1 or the collocation k+1, and the width of a blank Lg is smaller than the length Lr (k) of the ruby character r (k) (step S1210).

When the sum L (k)+L (k+1)+Lg is not smaller than the length Lr (k) of the ruby character r (k) (in the case of NO at step S1210), the ruby character setting portion 7*f* sets the compressibility c (k) of the ruby character r (k) to 1 (step S1206), and the ruby character setting portion 7*f* moves to step S1605 of FIG. 29 to continue subsequent processing.

When the sum L (k)+L (k+1)+Lg is smaller than the length Lr (k) of the ruby character r (k) at step S1210 of FIG. 25 (in the case of YES at step S1210), the ruby character setting portion 7*f* resets the compressibility c (k) of the ruby character r (k) to a ratio Lr (k)/(L (k)+L (k+1)+Lg) (step S1211).

The ruby character setting portion 7*f* then judges whether or not the compressibility c (k) is larger than the predetermined threshold (step S1212). When the compressibility c (k) is not larger than the predetermined threshold (in the case of NO at step S1212), the ruby character setting portion 7*f* moves to step S1605 of FIG. 29 to continue subsequent processing.

Figure 26:
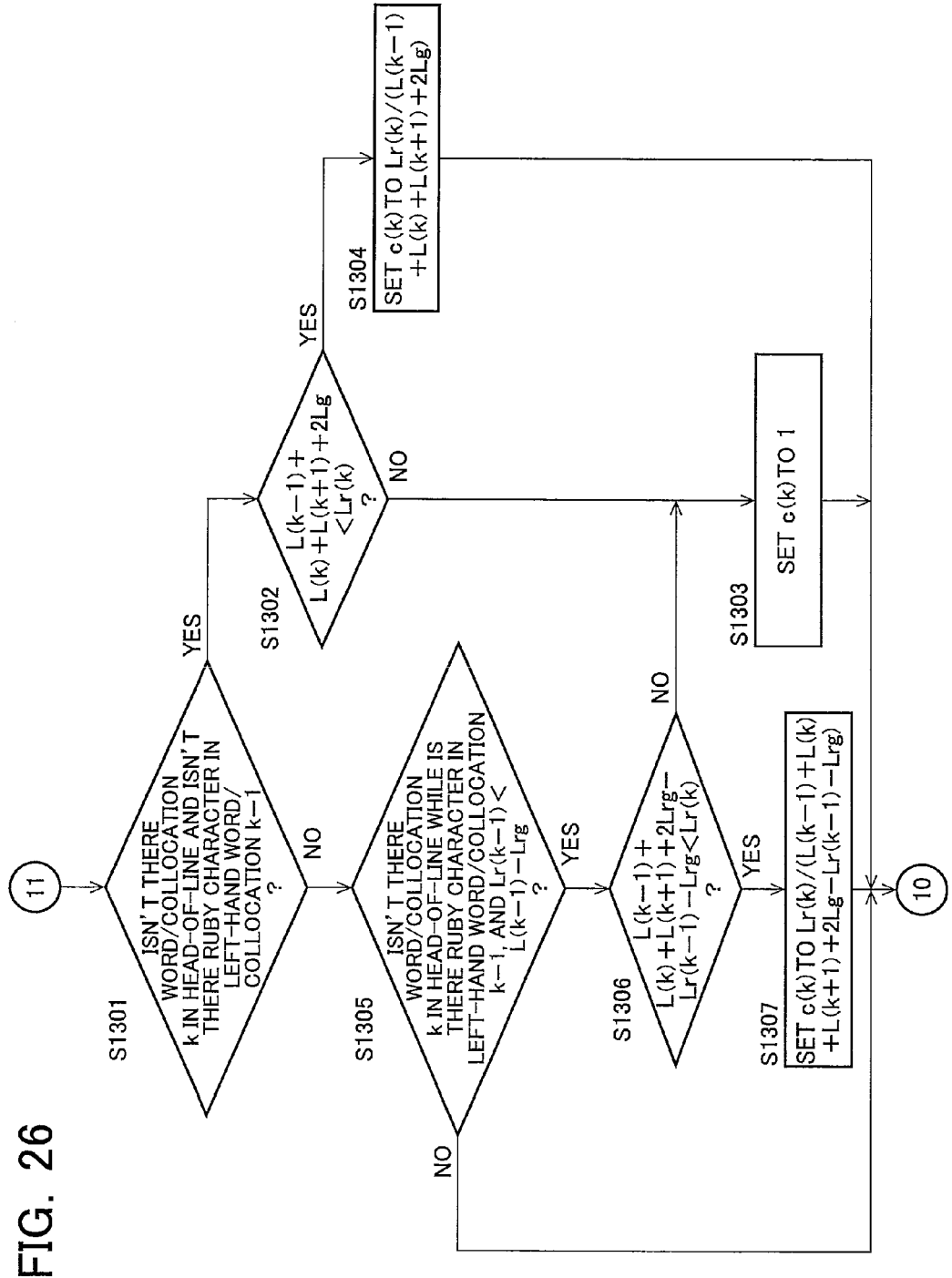
FIG. 26 is a flowchart showing a variant example of a processing procedure of ruby character size/arrangement setting processing in a case where ruby character sizes are unified.

When the compressibility c (k) is larger than the predetermined threshold at step S1212 of FIG. 25 (in the case of YES at step S1212), as shown in FIG. 26, the ruby character setting portion 7*f* judges whether or not the word k or the collocation k is not in head-of-line, and there is no ruby character r (k−1) in the left-hand word k−1 or collocation k−1 (step S1301).

When the word k or the collocation k is not in head-of-line, and there is no ruby character r (k−1) in the left-hand word k−1 or collocation k−1 (in the case of YES at step S1301), the ruby character setting portion 7*f* judges whether or not the sum L (k−1)+L (k)+L (k+1)+2Lg of the length L (k−1) of the word k−1 or the collocation k−1, the length L (k) of the word k or the collocation k, the length L (k+1) of the word k+1 or the collocation k+1, and the width of two blanks 2Lg is smaller than the length Lr (k) of the ruby character r (k) (step S1302).

When the sum L (k−1)+L (k)+L (k+1)+2Lg is not smaller than the length Lr (k) of the ruby character r (k) (in the case of NO at step S1302), the ruby character setting portion 7*f* sets the compressibility c (k) of the ruby character r (k) to 1 (step S1303). Then, the ruby character setting portion 7*f* moves to step S1605 of FIG. 29 to continue subsequent processing.

When the sum L (k−1)+L (k)+L (k+1)+2Lg is smaller than the length Lr (k) of the ruby character r (k) at step S1302 of FIG. 26 (in the case of YES at step S1302), the ruby character setting portion 7*f* sets the compressibility c (k) of the ruby character r (k) to a ratio Lr (k)/(L (k−1)+L (k)+L (k+1)+2Lg) (step S1304). Then, the ruby character setting portion 7*f* moves to step S1605 of FIG. 29 to continue subsequent processing.

When a condition is not satisfied where the word k or the collocation k is not in head-of-line, and there is no ruby character r (k−1) in the left-hand word k−1 or collocation k−1 at step S1301 of FIG. 26 (in the case of NO at step S1301), the ruby character setting portion 7*f* judges whether or not the word k or the collocation k is not in head-of-line while there is the ruby character r (k−1) in the left-hand word k−1 or collocation k−1, and a condition of Lr (k−1)<L (k−1)−Lrg is satisfied (step S1305).

When the word k or the collocation k is not in head-of-line while there is the ruby character r (k−1) in the left-hand word k−1 or collocation k−1, and the condition of Lr (k−1)<L (k−1)−Lrg is satisfied (in the case of YES at step S1305), the ruby character setting portion 7*f* judges whether or not a value L (k−1)+L (k)+L (k+1)+2Lg−Lr (k−1)−Lrg obtained by deducting the length Lr (k−1) of the ruby character r (k−1) and the minimum value Lrg of a width of a blank to be provided between ruby characters from the sum L (k−1)+L (k)+L (k+1)+2Lg is smaller than the length Lr (k) of the ruby character r (k) (step S1306).

When the L (k−1)+L (k)+L (k+1)+2Lg−Lr (k−1)−Lrg is not smaller than the length Lr (k) of the ruby character r (k) (in the case of NO at step S1306), the ruby character setting portion 7*f* sets the compressibility c (k) of the ruby character r (k) to 1 (step S1303). Then, the ruby character setting portion 7*f* moves to step S1605 of FIG. 29 to continue subsequent processing.

When the value L (k−1)+L (k)+L (k+1)+2Lg−Lr (k−1)−Lrg is smaller than the length Lr (k) of the ruby character r (k) at step S1306 of FIG. 26 (in the case of YES at step S1306), the ruby character setting portion 7*f* sets the compressibility c (k) of the ruby character r (k) to a ratio Lr (k)/(L (k−1)+L (k)+L (k+1)+2Lg−Lr (k−1)−Lrg) (step S1307). Then, the ruby character setting portion 7*f* moves to step S1605 of FIG. 29 to continue subsequent processing.

When the word k or the collocation k is not in head-of-line while there is the ruby character r (k−1) in the left-hand word k−1 or collocation k−1, and a condition of Lr (k−1)<L (k−1)−Lrg is not satisfied at step S1305 of FIG. 26 (in the case of NO at step S1305), the ruby character setting portion 7*f* moves to step S1605 of FIG. 29 to continue subsequent processing.

Figure 27:
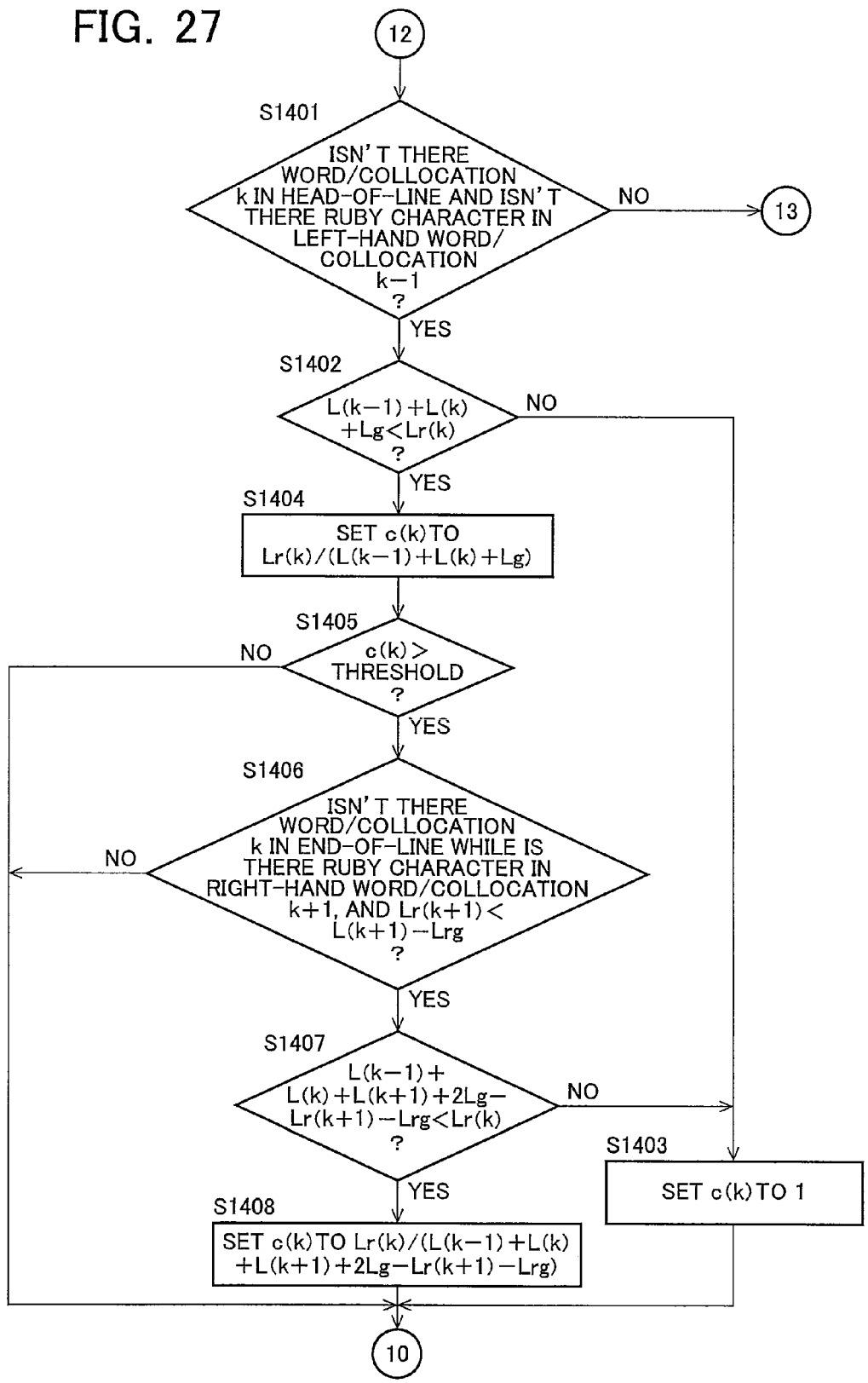
FIG. 27 is a flowchart showing a variant example of a processing procedure of ruby character size/arrangement setting processing in a case where ruby character sizes are unified.

When a condition is not satisfied where the word k or the collocation k is not in end-of-line while there is no ruby character r (k+1) in the right-hand word k+1 or collocation k+1 at step S1209 of FIG. 25 (in the case of NO at step S1209), as shown in FIG. 27, the ruby character setting portion 7*f* judges whether or not the word k or the collocation k is not in head-of-line and there is no ruby character r (k−1) in the left-hand word k−1 or collocation k−1 (step S1401).

When the word k or the collocation k is not in head-of-line and there is no ruby character r (k−1) in the left-hand word k−1 or collocation k−1 (in the case of YES at step S1401), the ruby character setting portion 7f judges whether or not the sum L (k−1)+L (k)+Lg of the length L (k−1) of the word k−1 or the collocation k−1, the length L (k) of the word k or the collocation k and the width of a blank Lg is smaller than the length Lr (k) of the ruby character r (k) (step S1402).

When the sum L (k−1)+L (k)+Lg is not smaller than the length Lr (k) of the ruby character r (k) (in the case of NO at step S1402), the ruby character setting portion 7f sets the compressibility c (k) of the ruby character r (k) to 1 (step S1403). Then, the ruby character setting portion 7f moves to step S1605 of FIG. 29 to continue subsequent processing.

When the sum L (k−1)+L (k)+Lg is smaller than the length Lr (k) of the ruby character r (k) at step S1402 of FIG. 27 (in the case of YES at step S1402), the ruby character setting portion 7f resets the compressibility c (k) of the ruby character r (k) to a ratio Lr (k)/(L (k−1)+L (k)+Lg) (step S1404).

The ruby character setting portion 7f then judges whether or not the compressibility c (k) is larger than the predetermined threshold (step S1405). When the compressibility c (k) is not larger than the predetermined threshold (in the case of NO at step S1405), the ruby character setting portion 7f moves to step S1605 of FIG. 29 to continue subsequent processing.

When the compressibility c (k) is larger than the predetermined threshold at step S1405 of FIG. 27 (in the case of YES at step S1405), the ruby character setting portion 7f judges whether or not the word k or the collocation k is not in end-of-line while there is the ruby character r (k+1) in the right-hand word k+1 or collocation k+1, and a condition of Lr (k+1)<L (k+1)−Lrg is satisfied (step S1406).

When the word k or the collocation k is not in end-of-line while there is the ruby character r (k+1) in the right-hand word k+1 or collocation k+1, and the condition of Lr (k+1)<L (k+1)−Lrg is satisfied (in the case of YES at step S1406), the ruby character setting portion 7f judges whether or not a value L (k−1)+L (k)+L (k+1)+2Lg−Lr (k+1)−Lrg obtained by deducting the length Lr (k+1) of the ruby character r (k+1) and the minimum value Lrg of a width of a blank to be provided between ruby characters from the sum L (k−1)+L (k)+L (k+1)+2Lg is smaller than the length Lr (k) of the ruby character r (k) (step S1407).

When the value L (k−1)+L (k)+L (k+1)+2Lg−Lr (k+1)−Lrg is not smaller than the length Lr (k) of the ruby character r (k) (in the case of NO at step S1407), the ruby character setting portion 7f sets the compressibility c (k) of the ruby character r (k) to 1 (step S1403). Then, the ruby character setting portion 7f moves to step S1605 of FIG. 29 to continue subsequent processing.

When the word k or the collocation k is not in end-of-line while there is the ruby character r (k+1) in the right-hand word k+1 or collocation k+1, and the condition of Lr (k+1)<L (k+1)−Lrg is not satisfied at step S1406 of FIG. 27 (in the case of NO at step S1406), the ruby character setting portion 7f moves to step S1605 of FIG. 29 to continue subsequent processing.

When the value L (k−1)+L (k)+L (k+1)+2Lg−Lr (k+1)−Lrg is smaller than the length Lr (k) of the ruby character r (k) at step S1407 of FIG. 27 (in the case of YES at step S1407), the ruby character setting portion 7f sets the compressibility c (k) of the ruby character r (k) to a ratio Lr (k)/(L (k−1)+L (k)+L (k+1)+2Lg−Lr (k+1)−Lrg) (step S1408). Then, the ruby character setting portion 7f moves to step S1605 of FIG. 29 to continue subsequent processing.

Figure 28:
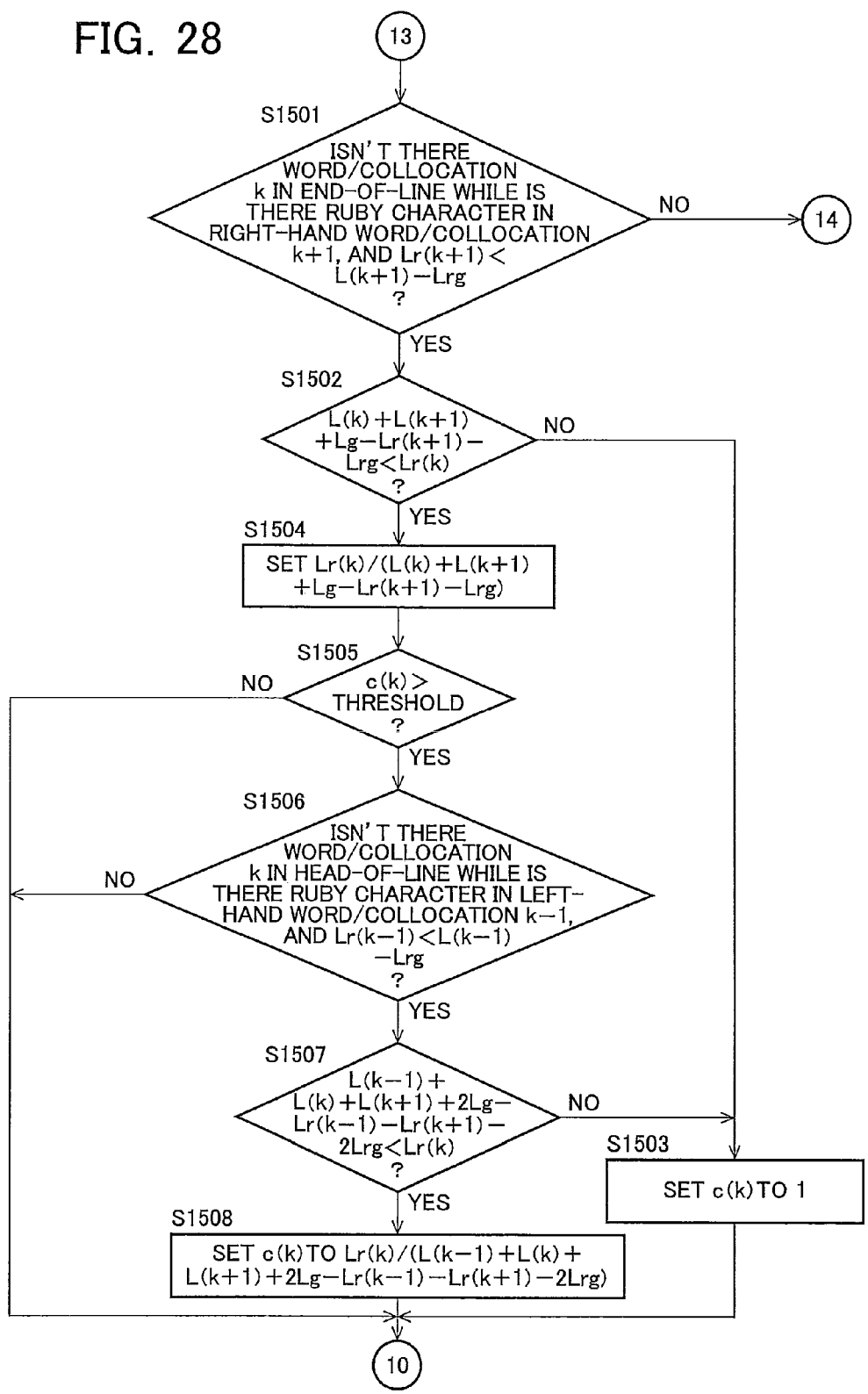
FIG. 28 is a flowchart showing a variant example of a processing procedure of ruby character size/arrangement setting processing in a case where ruby character sizes are unified.

When a condition is not satisfied where the word k or the collocation k is not in head-of-line and there is no ruby character r (k−1) in the left-hand word k−1 or collocation k−1 at step S1401 of FIG. 27 (in the case of NO at S1401), as shown in FIG. 28, the ruby character setting portion 7f judges whether or not the word k or the collocation k is not in end-of-line while there is the ruby character r (k+1) in the right-hand word k+1 or collocation k+1, and a condition of Lr (k+1)<L (k+1)−Lrg is satisfied (step S1501).

When the word k or the collocation k is not in end-of-line while there is the ruby character r (k+1) in the right-hand word k+1 or collocation k+1, and the condition of Lr (k+1)<L (k+1)−Lrg is satisfied (in the case of YES at step S1501), the ruby character setting portion 7f judges whether or not a value L (k)+L (k+1)+Lg−Lr (k+1)−Lrg obtained by deducting the length Lr (k+1) of the ruby character r (k+1) and the minimum value Lrg of a width of a blank to be provided between ruby characters from the sum L (k)+L (k+1)+Lg is smaller than the length Lr (k) of the ruby character r (k) (step S1502).

When the value L (k)+L (k+1)+Lg−Lr (k+1)−Lrg is not smaller than the length Lr (k) of the ruby character r (k) (in the case of NO at step S1502), the ruby character setting portion 7f sets the compressibility c (k) of the ruby character r (k) to 1 (step S1503). Then, the ruby character setting portion 7f moves to step S1605 of FIG. 29 to continue subsequent processing.

When the value L (k)+L (k+1)+Lg−Lr (k+1)−Lrg is smaller than the length Lr (k) of the ruby character r (k) at step S1502 of FIG. 28 (in the case of YES at step S1502), the ruby character setting portion 7f sets the compressibility c (k) of the ruby character r (k) to a ratio Lr (k)/(L (k)+L (k+1)+Lg−Lr (k+1)−Lrg) (step S1504).

The ruby character setting portion 7f then judges whether or not the compressibility c (k) is larger than the predetermined threshold (step S1505). When the compressibility c (k) is not larger than the predetermined threshold (in the case of NO at step S1505), the ruby character setting portion 7f moves to step S1605 of FIG. 29 to continue subsequent processing.

When the compressibility c (k) is larger than the predetermined threshold at step S1505 of FIG. 28 (in the case of YES at step S1505), the ruby character setting portion 7f judges whether or not the word k or the collocation k is not in head-of-line while there is the ruby character r (k−1) in the left-hand word k−1 or collocation k−1, and a condition of Lr (k−1)<L (k−1)−Lrg is satisfied (step S1506).

When the word k or the collocation k is not in head-of-line while there is the ruby character r (k−1) in the left-hand word k−1 or collocation k−1, and the condition of Lr (k−1)<L (k−1)−Lrg is satisfied (in the case of YES at step S1506), the ruby character setting portion 7f judges whether or not a value L (k−1)+L (k)+L (k+1)+2Lg−Lr (k−1)−Lr (k+1)−2Lrg obtained by deducting the length Lr (k−1) of the ruby character r (k−1), the length Lr (k+1) of the ruby character r (k+1), and the minimum value 2Lrg of a width of two blanks to be provided between ruby characters from the sum L (k−1)+L (k)+L (k+1)+2Lg is smaller than the length Lr (k) of the ruby character r (k) (step S1507).

When the value L (k−1)+L (k)+L (k+1)+2Lg−Lr (k−1)−Lr (k+1)−2Lrg is not smaller than the length Lr (k) of the ruby character r (k) (in the case of NO at step S1507), the ruby character setting portion 7f sets the compressibility c (k) of the ruby character r (k) to 1 (step S1503). Then, the ruby character setting portion 7f moves to step S1605 of FIG. 29 to continue subsequent processing.

When the value L (k−1)+L (k)+L (k+1)+2Lg−Lr (k−1)−Lr (k+1)−2Lrg is smaller than the length Lr (k) of the ruby character r (k) at step S1507 of FIG. 28 (in the case of YES at step S1507), the ruby character setting portion 7f sets the compressibility c (k) of the ruby character r (k) to a ratio Lr (k)/(L (k−1)+L (k)+L (k+1)+2Lg−Lr (k−1)−Lr (k+1)−2Lrg) (step S1508). Then, the ruby character setting portion 7f moves to step S1605 of FIG. 29 to continue subsequent processing.

When the word k or the collocation k is not in head-of-line while there is the ruby character r (k−1) in the left-hand word k−1 or collocation k−1, and a condition of Lr (k−1)<L (k−1)−Lrg is not satisfied at step S1506 of FIG. 28 (in the case of NO at step S1506), the ruby character setting portion 7f moves to step S1605 of FIG. 29 to continue subsequent processing.

When the word k or the collocation k is not in end-of-line while there is the ruby character r (k+1) in the right-hand word k+1 or collocation k+1, and a condition of Lr (k+1)<L (k+1)−Lrg is not satisfied at step S1501 of FIG. 28 (in the case of NO at step S1501), as shown in FIG. 29, the ruby character setting portion 7f judges whether or not the word k or the collocation k is not in head-of-line while there is the ruby character r (k−1) in the left-hand word k−1 or collocation k−1, and the condition of Lr (k−1)<L (k−1)−Lrg is satisfied (step S1601).

When the word k or the collocation k is not in head-of-line while there is the ruby character r (k−1) in the left-hand word k−1 or collocation k−1, and a condition of Lr (k−1)<L (k−1)−Lrg is satisfied (in the case of YES at step S1601), the ruby character setting portion 7f judges whether or not a value L (k−1)+L (k)+Lg−Lr (k−1)−Lrg obtained by deducting the length Lr (k−1) of the ruby character r (k−1) and the minimum value Lrg of a width of a blank to be provided between ruby characters from the sum L (k−1)+L (k)+Lg is smaller than the length Lr (k) of the ruby character r (k) (step S1602).

When the value L (k−1)+L (k)+Lg−Lr (k−1)−Lrg is not smaller than the length Lr (k) of the ruby character r (k) (in the case of NO at step S1602), the ruby character setting portion 7f sets the compressibility c (k) of the ruby character r (k) to 1 (step S1603). Then, the ruby character setting portion 7f moves to step S1605 to continue subsequent processing.

When the value L (k−1)+L (k)+Lg−Lr (k−1)−Lrg is smaller than the length Lr (k) of the ruby character r (k) at step S1602 (in the case of YES at step S1602), the ruby character setting portion 7f sets the compressibility c (k) of the ruby character r (k) to a ratio Lr (k)/(L (k−1)+L (k)+Lg−Lr (k−1)−Lrg) (step S1604). Then, the ruby character setting portion 7f moves to step S1605 to continue subsequent processing.

When the word k or the collocation k is not in head-of-line while there is the ruby character r (k−1) in the left-hand word k−1 or collocation k−1, and the condition of Lr (k−1)<L (k−1)−Lrg is not satisfied at step S1601 of FIG. 29 (in the case of NO at step S1601), the ruby character setting portion 7f moves to step S1605 to continue subsequent processing.

When k is N at step S1605 (in the case of YES at step S1605), the ruby character setting portion 7f calculates a character size Sr (k) of each ruby character r (k) after compression (1≤k≤N) (step S1607). Specifically, the ruby character setting portion 7f calculates the character size Sr (k) by dividing an original character size by the compressibility c (k).

The ruby character setting portion 7f then extracts a minimum value Srmin of the character size Sr (k) (1≤k≤N) (step S1608), and resets all the character sizes Sr (k) (1≤k≤N) to Srmin (step S1609). By the above-described processing, the character sizes of the ruby character r (k) (1≤k≤N) included in a document are unified to Srmin. When the character size is changed, the need is arisen to readjust leftmost X coordinates of the ruby characters r (k) and r (k+1). Therefore, the ruby character setting portion 7f performs readjustment of the leftmost X coordinates of the ruby characters r (k) and r (k+1) below.

Here, rather than a character area unit that is obtained by layout analysis of a document, a variance value of a character size is calculated by document, then when the variance value is a predetermined threshold or more, character sizes of ruby characters are not unified, and when the variance value is smaller than the predetermined threshold, all the character sizes of ruby characters are unified to the minimum value Srmin.

In the aforementioned Japanese Laid-Open Patent Publication No. 2009-193283 and Japanese Laid-Open Patent Publication No. 2010-128599, a document is divided into a plurality of areas to classify areas having character sizes and line spaces that are similar to each other as the same group, and character sizes in a translated sentence that are placed in a character string are unified among areas that are included in the same group. However, since these are to unify the character sizes among areas having character sizes and line spaces that are similar to each other, even in the case of large variance of a character size and a line space in viewing the whole document, when there is an area having character sizes and line spaces that are similar to each other in the document, the character sizes in such an area are unified. Therefore, in the case of large variance of a character size and a line space in calculation by document, for processing in which character sizes of ruby characters are not unified, it is difficult to use the technique in Japanese Laid-Open Patent Publication No. 2009-193283 and Japanese Laid-Open Patent Publication No. 2010-128599.

However, according to the present embodiment, since the variance values of a character size and a line space are calculated by document and judgment is made based on the amount of the variance value whether or not character sizes of ruby characters are unified to the minimum value Srmin, even though there are areas having character sizes and line spaces that are similar to each other in the document, the character sizes of the ruby characters in those areas are not unified and the ruby characters are able to be arranged in the document.

After processing of step S1609 of FIG. 29, the ruby character setting portion 7f calculates again the length Lr (k) of a ruby character (1≤k≤N) (step S1610). Specifically, the ruby character setting portion 7f calculates again the length Lr (k) of the ruby character r (k) from information on a width of a character set according to the character size Sr (k) calculated at step S1609, a width of a blank to be provided between characters and the number of characters. Thereafter, the ruby character setting portion 7f sets the identification number k of a word or a collocation to 1 (step S1611).

Figure 30:
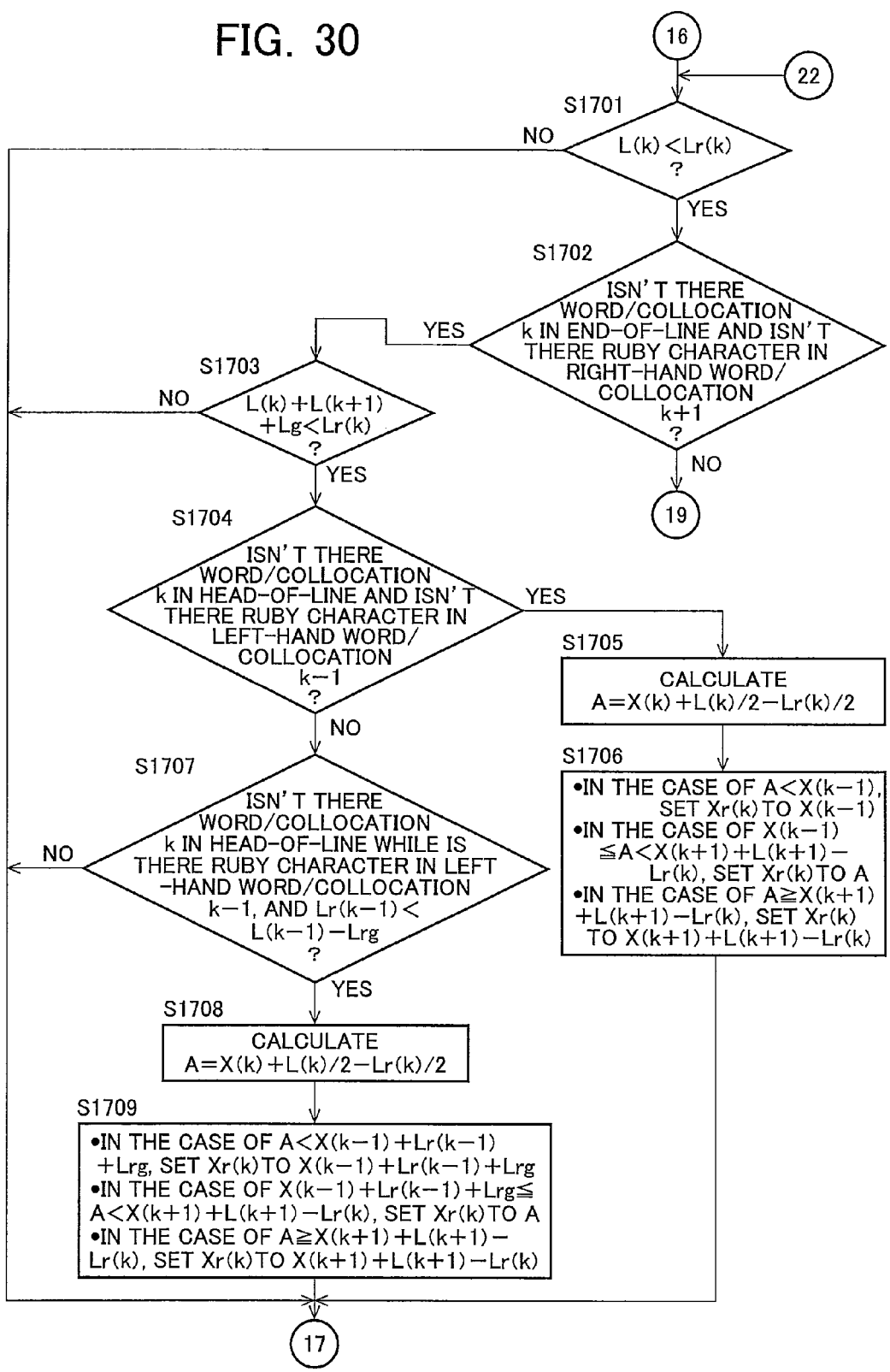
FIG. 30 is a flowchart showing a variant example of a processing procedure of ruby character size/arrangement setting processing in a case where ruby character sizes are unified.

Subsequently, as shown in FIG. 30, the ruby character setting portion 7f judges whether or not the length L (k) of the word or the collocation is shorter than the length Lr (k) of the ruby character r (k) (step S1701). When the length L (k) is not shorter than the length Lr (k) (in the case of NO at step S1701), the ruby character setting portion 7f moves to step S2005 of FIG. 33 to set a Y coordinate at a lower end of the ruby character r (k) (step S2005).

Specifically, the ruby character setting portion 7f sets the Y coordinate at the lower end of the ruby character r (k) so that the ruby character r (k) is arranged at a central part between lines. In a case where the word k or the collocation k is in a lowest line, the ruby character setting portion 7f sets the Y coordinate at the lower end of the ruby character r (k) so that an interval between the word k or the collocation k and the ruby character r (k) becomes the same as an interval in a line directly above. In the case of having only one line, the ruby character setting portion 7f sets the Y coordinate at the lower end of the ruby character r (k) so as to have a predetermined interval between the word k or the collocation k and the ruby character r (k).

Alternatively, the ruby character setting portion 7f may set a position displaced in a lower direction only in size in a height direction of a font displaying the ruby character r (k) from the Y coordinate at the lower end of the word k or the collocation k as the Y coordinate at the lower end of the ruby character r (k).

Thereafter, the ruby character setting portion 7f checks whether or not k is N (step S2006). When k is N (in the case of YES at step S2006), the ruby character size/arrangement setting processing in a case where ruby character sizes are unified is finished. When k is not N (in the case of NO at step S2006), the ruby character setting portion 7f increases k by 1 (step S2007), and moves to step S1701 of FIG. 30 to continue subsequent processing.

When the length L (k) is shorter than the length Lr (k) at step S1701 of FIG. 30 (in the case of YES at step S1701), the ruby character setting portion 7f judges whether or not the word k or the collocation k is not in end-of-line, and there is no ruby character r (k+1) in the right-hand word k+1 or collocation k+1 (step S1702).

When the word k or the collocation k is not in end-of-line, and there is no ruby character r (k+1) in the right-hand word k+1 or collocation k+1 (in the case of YES at step S1702), the ruby character setting portion 7f judges whether or not the sum L (k)+L (k+1)+Lg of the length L (k) of the word k or the collocation k, the length L (k+1) of the word k+1 or the collocation k+1, and the width of a blank Lg is smaller than the length Lr (k) of the ruby character r (k) (step S1703).

Figure 33:
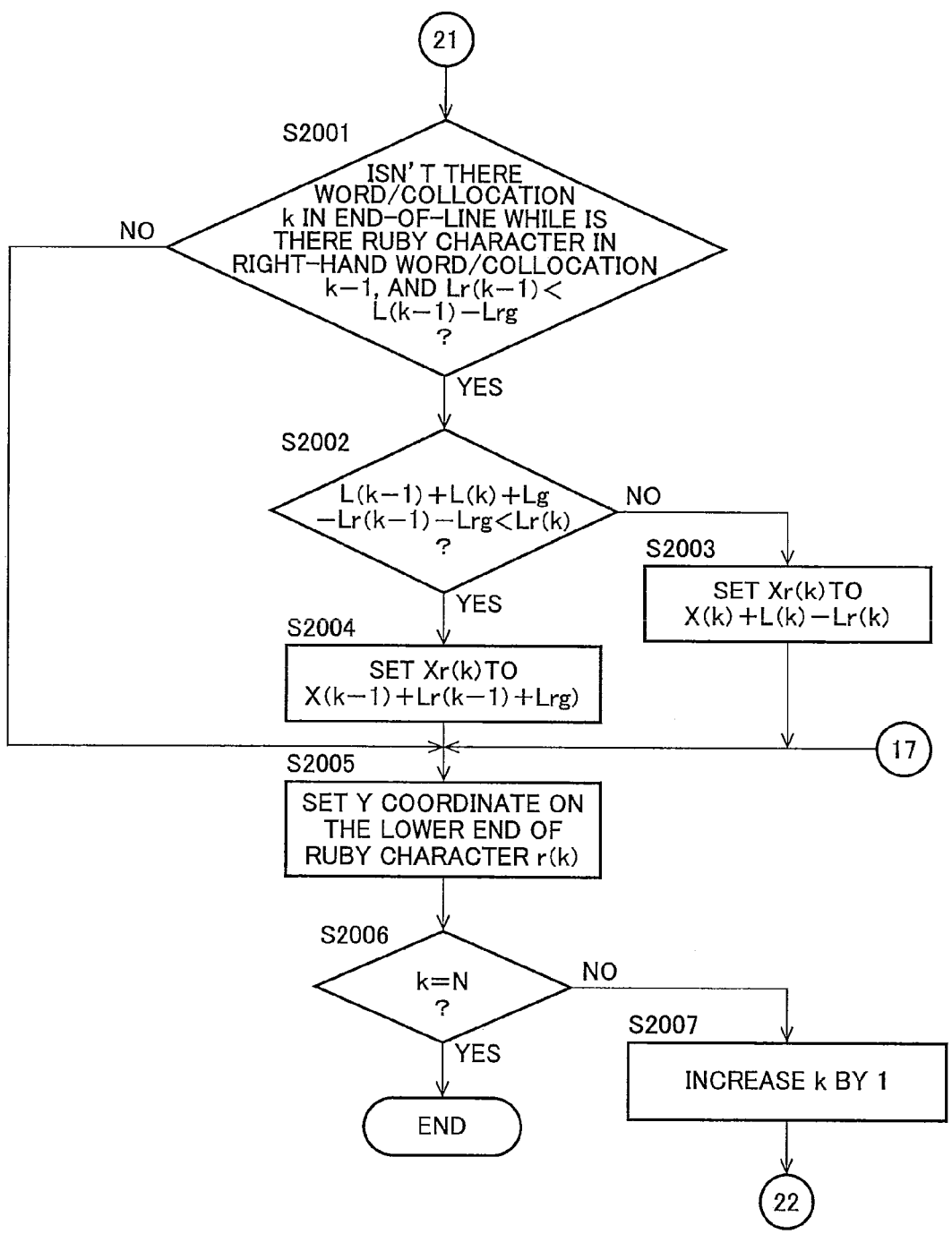
FIG. 33 is a flowchart showing a variant example of a processing procedure of ruby character size/arrangement setting processing in a case where ruby character sizes are unified.

When the sum L (k)+L (k+1)+Lg is not smaller than the length Lr (k) of the ruby character r (k) (in the case of NO at step S1703), the ruby character setting portion 7f moves to step S2005 of FIG. 33 to continue subsequent processing.

When the sum L (k)+L (k+1)+Lg is smaller than the length Lr (k) of the ruby character r (k) at step S1703 of FIG. 30 (in the case of YES at step S1703), the ruby character setting portion 7f judges whether or not the word k or the collocation k is not in head-of-line, and there is no ruby character r (k−1) in the left-hand word k−1 or collocation k−1 (step S1704).

When the word k or the collocation k is not in head-of-line, and there is no ruby character r (k−1) in the left-hand word k−1 or collocation k−1 (in the case of YES at step S1704), the ruby character setting portion 7f calculates A=X (k)+L (k)/2−Lr (k)/2 (step S1705).

Subsequently, the ruby character setting portion 7f sets the leftmost X coordinate Xr (k) of the ruby character r (k) corresponding to the value of A (step S1706). Specifically, the ruby character setting portion 7f sets, when A is smaller than the leftmost X coordinate X (k−1) of the word k−1 or the collocation k−1, Xr (k) to X (k−1). Furthermore, the ruby character setting portion 7f sets, when A is X (k−1) or more and less than X (k+1)+L (k+1)−Lr (k), Xr (k) to A. Additionally, the ruby character setting portion 7f sets, when A is X (k+1)+L (k+1)−Lr (k) or more, Xr (k) to X (k+1)+L (k+1)−Lr (k).

Thereafter, the ruby character setting portion 7f moves to step S2005 of FIG. 33 to continue subsequent processing.

When a condition is not satisfied where the word k or the collocation k is not in head-of-line, and there is no ruby character r (k−1) in the left-hand word k−1 or collocation k−1 at step S1704 of FIG. 30 (in the case of NO at step S1704), the ruby character setting portion 7f judges whether or not the word k or the collocation k is not in head-of-line while there is the ruby character r (k−1) in the left-hand word k−1 or collocation k−1, and a condition of Lr (k−1)<L (k−1)−Lrg is satisfied (step S1707).

When the word k or the collocation k is not in head-of-line while there is the ruby character r (k−1) in the left-hand word k−1 or collocation k−1, and the condition of Lr (k−1)<L (k−1)−Lrg is satisfied (in the case of YES at step S1707), the ruby character setting portion 7f calculates A=X (k)+L (k)/2−Lr (k)/2 (step S1708).

Subsequently, the ruby character setting portion 7f sets the leftmost X coordinate Xr (k) of the ruby character r (k) corresponding to the value of A (step S1709). Specifically, the ruby character setting portion 7f sets, when the value A is smaller than X (k−1)+Lr (k−1)+Lrg, Xr (k) to X (k−1)+Lr (k−1)+Lrg. Additionally, the ruby character setting portion 7f sets, when the value A is X (k−1)+Lr (k−1)+Lrg or more and less than X (k+1)+L (k+1)−Lr (k), Xr (k) to A. Further, the ruby character setting portion 7f sets, when the value A is X (k+1)+L (k+1)−Lr (k) or more, Xr (k) to X (k+1)+L (k+1)−Lr (k).

Thereafter, the ruby character setting portion 7f moves to step S2005 of FIG. 33 to continue subsequent processing.

When the word k or the collocation k is not in head-of-line while there is the ruby character r (k−1) in the left-hand word k−1 or collocation k−1, and the condition of Lr (k−1)<L (k−1)−Lrg is not satisfied at step S1707 of FIG. 30 (in the case of NO at step S1707), the ruby character setting portion 7f moves to step S2005 of FIG. 33 to continue subsequent processing.

Figure 31:
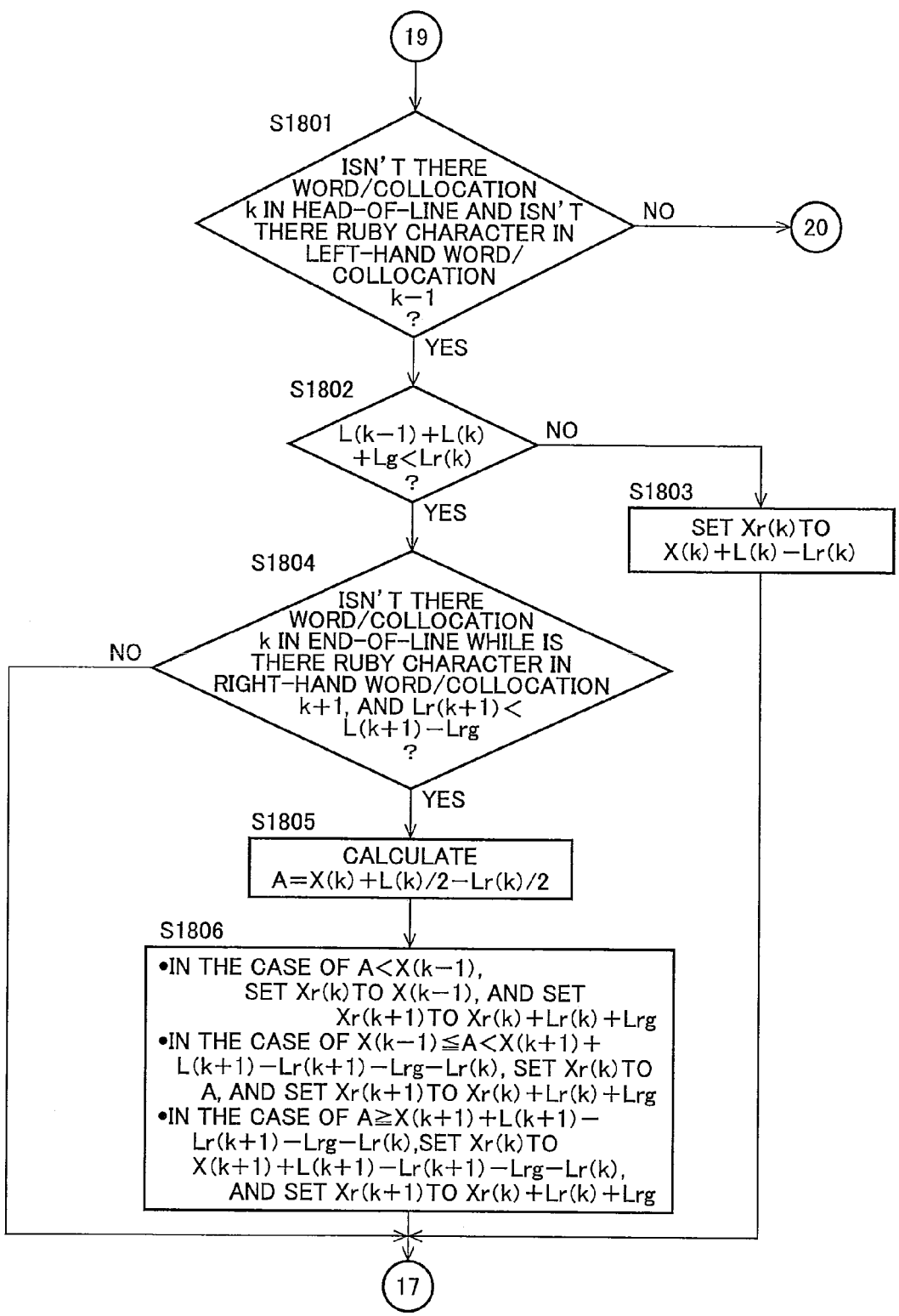
FIG. 31 is a flowchart showing a variant example of a processing procedure of ruby character size/arrangement setting processing in a case where ruby character sizes are unified.

When a condition is not satisfied where the word k or the collocation k is not in end-of-line while there is no ruby character r (k+1) in the right-hand word k+1 or collocation k+1 at step S1704 of FIG. 30 (in the case of NO at step S1702), as shown in FIG. 31, the ruby character setting portion 7f judges whether or not the word k or the collocation k is not in head-of-line and there is no ruby character r (k−1) in the left-hand word k−1 or collocation k−1 (step S1801).

When the word k or the collocation k is not in head-of-line and there is no ruby character r (k−1) in the left-hand word k−1 or collocation k−1 (in the case of YES at step S1801), the ruby character setting portion 7f judges whether or not the sum L (k−1)+L (k)+Lg of the length L (k−1) of the word k−1 or the collocation k−1, the length L (k) of the word k or the collocation k and the width of a blank Lg is smaller than the length Lr (k) of the ruby character r (k) (step S1802).

When the sum L (k−1)+L (k)+Lg is not smaller than the length Lr (k) of the ruby character r (k) (in the case of NO at step S1802), the ruby character setting portion 7f sets the leftmost X coordinate Xr (k) of the ruby character r (k) to X (k)+L (k)−Lr (k) (step S1803). Thereafter, the ruby character setting portion 7f moves to step S2005 of FIG. 33 to continue subsequent processing.

When the sum L (k−1)+L (k)+Lg is smaller than the length Lr (k) of the ruby character r (k) at step S1802 of FIG. 31 (in the case of YES at step S1802), the ruby character setting portion 7f judges whether or not the word k or the collocation k is not in end-of-line while there is the ruby character r (k+1) in the right-hand word k+1 or collocation k+1, and a condition of Lr (k+1)<L (k+1)−Lrg is satisfied (step S1804).

When the word k or the collocation k is not in end-of-line while there is the ruby character r (k+1) in the right-hand word k+1 or collocation k+1, and the condition of Lr (k+1)<L (k+1)−Lrg is satisfied (in the case of YES at step S1804), the ruby character setting portion 7f calculates A=X (k)+L (k)/2−Lr (k)/2 (step S1805). Subsequently, the ruby character setting portion 7f sets the leftmost X coordinate Xr (k) of the ruby character r (k) and the leftmost X coordinate Xr (k+1) of the ruby character r (k+1) corresponding to the value of A (step S1806).

Specifically, when A is smaller than X (k−1), the ruby character setting portion 7$f$ sets Xr (k) to X (k−1), and sets Xr (k+1) to Xr (k)+Lr (k)+Lrg. Additionally, when A is X (k−1) or more and less than X (k+1)+L (k+1)−Lr (k+1)−Lrg−Lr (k), the ruby character setting portion 7$f$ sets Xr (k) to A, and sets Xr (k+1) to Xr (k)+Lr (k)+Lrg. Further, when A is X (k+1)+L (k+1)−Lr (k+1)−Lrg−Lr (k) or more, the ruby character setting portion 7$f$ sets Xr (k) to X (k+1)+L (k+1)−Lr (k+1)−Lrg−Lr (k), and Xr (k+1) to Xr (k)+Lr (k)+Lrg.

Thereafter, the ruby character setting portion 7$f$ moves to step S2005 of FIG. 33 to continue subsequent processing.

When the word k or the collocation k is not in end-of-line while there is the ruby character r (k+1) in the right-hand word k+1 or collocation k+1, and the condition of Lr (k+1)<L (k+1)−Lrg is not satisfied (in the case of NO at step S1804), the ruby character setting portion 7$f$ moves to step S2005 of FIG. 33 to continue subsequent processing.

Figure 32:
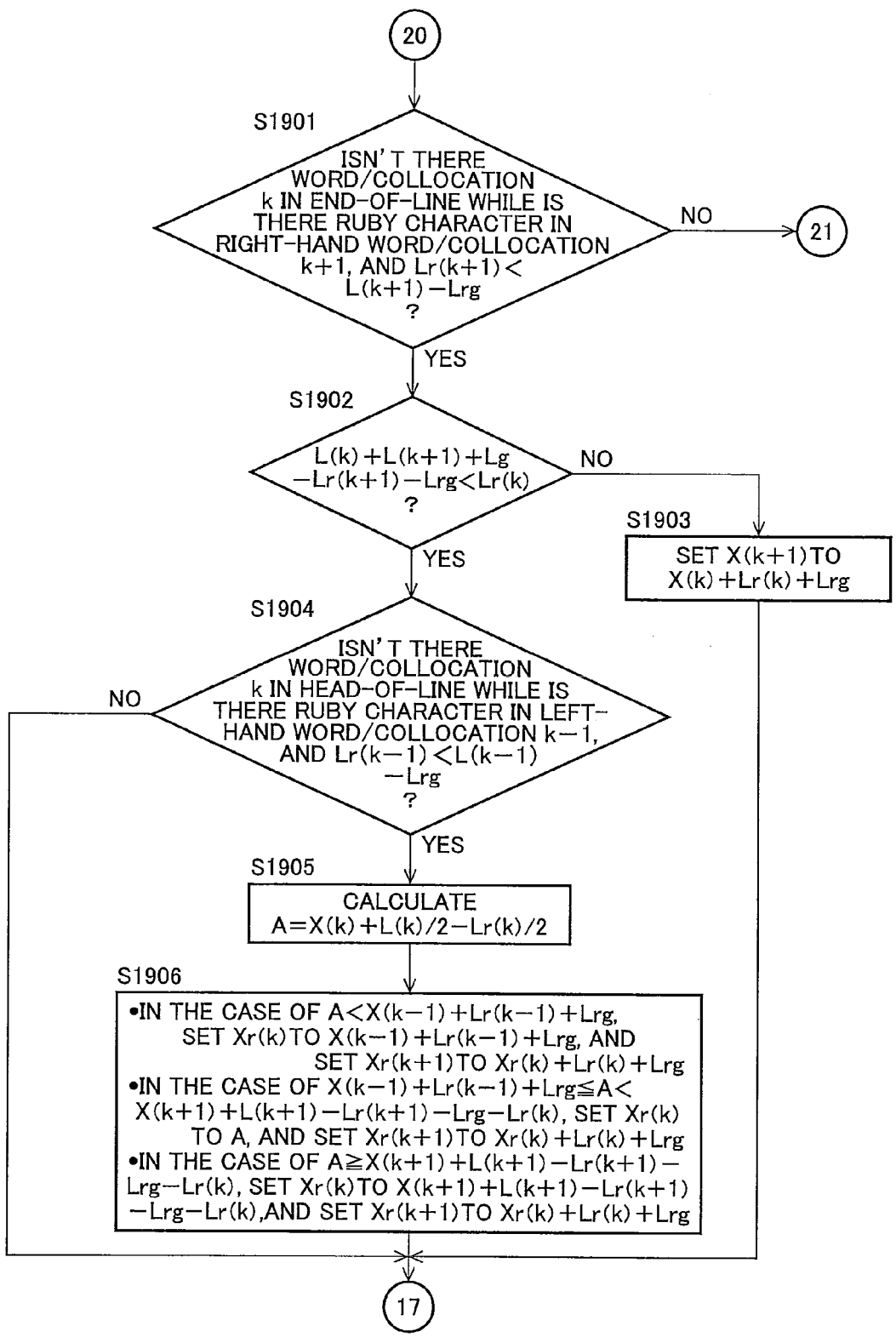
FIG. 32 is a flowchart showing a variant example of a processing procedure of ruby character size/arrangement setting processing in a case where ruby character sizes are unified.

When a condition is not satisfied where the word k or the collocation k is not in head-of-line and there is no ruby character r (k−1) in the left-hand word k−1 or collocation k−1 at step S1801 of FIG. 31 (in the case of NO at step S1801), as shown in FIG. 32, the ruby character setting portion 7$f$ judges whether or not the word k or the collocation k is not in end-of-line while there is the ruby character r (k+1) in the right-hand word k+1 or collocation k+1, and the condition of Lr (k+1)<L (k+1)−Lrg is satisfied (step S1901).

When the word k or the collocation k is not in end-of-line while there is the ruby character r (k+1) in the right-hand word k+1 or collocation k+1, and the condition of Lr (k+1)<L (k+1)−Lrg is satisfied (in the case of YES at step S1901), the ruby character setting portion 7$f$ judges whether or not a value L (k)+L (k+1)+Lg−Lr (k+1)−Lrg obtained by deducting the length Lr (k+1) of the ruby character r (k+1) and the minimum value Lrg of a width of a blank to be provided between ruby characters from the sum L (k)+L (k+1)+Lg is smaller than the length Lr (k) of the ruby character r (k) (step S1902).

When the value L (k)+L (k+1)+Lg−Lr (k+1)−Lrg is not smaller than the length Lr (k) of the ruby character r (k) (in the case of NO at step S1902), the ruby character setting portion 7$f$ sets the leftmost X coordinate Xr (k+1) of the ruby character r (k+1) to X (k)+Lr (k)+Lrg (step 1903). Then, the ruby character setting portion 7$f$ moves to step S2005 of FIG. 33 to continue subsequent processing.

When the value L (k)+L (k+1)+Lg−Lr (k+1)−Lrg is smaller than the length Lr (k) of the ruby character r (k) at step S1902 of FIG. 32 (in the case of YES at step S1902), the ruby character setting portion 7$f$ judges whether or not the word k or the collocation k is not in head-of-line while there is the ruby character r (k−1) in the left-hand word k−1 or collocation k−1, and a condition of Lr (k−1)<L (k−1)−Lrg is satisfied (step S1904).

When the word k or the collocation k is not in head-of-line while there is the ruby character r (k−1) in the left-hand word k−1 or collocation k−1, and the condition of Lr (k−1)<L (k−1)−Lrg is satisfied (in the case of YES at step S1904), the ruby character setting portion 7$f$ calculates A=X (k)+L (k)/2−Lr (k)/2 (step S1905). Subsequently, the ruby character setting portion 7$f$ sets the leftmost X coordinate Xr (k) of the ruby character r (k) and the leftmost X coordinate Xr (k+1) of the ruby character r (k+1) corresponding to the value of A (step S1906).

Specifically, when the value A is smaller than X (k−1)+Lr (k−1)+Lrg, the ruby character setting portion 7$f$ sets Xr (k) to X (k−1)+Lr (k−1)+Lrg, and sets Xr (k+1) to Xr (k)+Lr (k)+Lrg. Further, when the value A is X (k−1)+Lr (k−1)+Lrg or more and less than X (k+1)+L (k+1)−Lr (k+1)−Lrg−Lr (k), the ruby character setting portion 7$f$ sets Xr (k) to A, and sets Xr (k+1) to Xr (k)+Lr (k)+Lrg. Additionally, when the value A is X (k+1)+L (k+1)−Lr (k+1)−Lrg−Lr (k) or more, the ruby character setting portion 7$f$ sets Xr (k) to X (k+1)+L (k+1)−Lr (k+1)−Lrg−Lr (k), and sets Xr (k+1) to Xr (k)+Lr (k)+Lrg.

Thereafter, the ruby character setting portion 7$f$ moves to step S2005 of FIG. 33 to continue subsequent processing.

When the word k or the collocation k is not in head-of-line while there is the ruby character r (k−1) in the left-hand word k−1 or collocation k−1, and the condition of Lr (k−1)<L (k−1)−Lrg is not satisfied at step S1904 of FIG. 32 (in the case of NO at step S1904), the ruby character setting portion 7$f$ moves to step S2005 of FIG. 33 to continue subsequent processing.

When the word k or the collocation k is not in end-of-line while there is the ruby character r (k+1) in the right-hand word k+1 or collocation k+1, and a condition of Lr (k+1)<L (k+1)−Lrg is not satisfied at step S1901 of FIG. 32 (in the case of NO at step S1901), as shown in FIG. 33, the ruby character setting portion 7$f$ judges whether or not the word k or the collocation k is not in head-of-line while there is the ruby character r (k−1) in the left-hand word k−1 or collocation k−1, and the condition of Lr (k−1)<L (k−1)−Lrg is satisfied (step S2001).

When the word k or the collocation k is not in head-of-line while there is the ruby character r (k−1) in the left-hand word k−1 or collocation k−1, and the condition of Lr (k−1)<L (k−1)−Lrg is satisfied (in the case of YES at step S2001), the ruby character setting portion 7$f$ judges whether or not a value L (k−1)+L (k)+Lg−Lr (k−1)−Lrg obtained by deducting the length Lr (k−1) of the ruby character r (k−1) and the minimum value Lrg of a width of a blank to be provided between ruby characters from the sum L (k−1)+L (k)+Lg is smaller than the length Lr (k) of the ruby character r (k) (step S2002).

When the value L (k−1)+L (k)+Lg−Lr (k−1)−Lrg is not smaller than the length Lr (k) of the ruby character r (k) (in the case of NO at step S2002), the ruby character setting portion 7$f$ sets the leftmost X coordinate Xr (k) of the ruby character r (k) to X (k)+L (k)−Lr (k) (step S2003). Subsequently, the ruby character setting portion 7$f$ moves to step S2005 to continue subsequent processing.

When the value L (k−1)+L (k)+Lg−Lr (k−1)−Lrg is smaller than the length Lr (k) of the ruby character r (k) at step S2002 of FIG. 33 (in the case of YES at step S2002), the ruby character setting portion 7$f$ sets the leftmost X coordinate Xr (k) of the ruby character r (k) to X (k−1)+Lr (k−1)+Lrg (step S2004). Subsequently, the ruby character setting portion 7$f$ moves to step S2005 to continue subsequent processing.

When the word k or the collocation k is not in head-of-line while there is the ruby character r (k−1) in the left-hand word k−1 or collocation k−1, and the condition of Lr (k−1)<L (k−1)−Lrg is not satisfied at step S2001 of FIG. 33 (in the case of NO at step S2001), the ruby character setting portion 7$f$ moves to step S2005 to continue subsequent processing.

Description has been given with a focus on embodiments of the document generating apparatus 1 and the document generating method so far, however, the present invention is not limited to these embodiments, and the present invention may be performed as a form of a computer program for realizing functions of the document generating apparatus 1, or a form of a computer-readable recording medium in which the computer program is recorded.

Here, as the recording medium, ones in various forms are able to be employed including disc types (for example, a magnetic disc, an optical disc and the like), card types (for example, a memory card, an optical card and the like), semiconductive memory types (for example, a ROM, a nonvolatile memory and the like), tape types (for example, a magnetic tape, a cassette tape and the like), and the like.

The above-described computer programs that realize the functions of the document generating apparatus 1 of the present embodiment or computer programs that cause a computer to execute the document generating method are recorded on these recording media to be distributed, thereby improving cost reduction, portability and general versatility.

Subsequently, the above-described recording medium is equipped with a computer, then the computer program that is recorded in the recording medium is read by the computer to be stored in a memory, and a processor (CPU: Central Processing Unit, MPU: Micro Processing Unit) provided in the computer reads and executes the computer program from the memory, so that it is possible to realize the functions of the document generating apparatus 1 according to the present embodiment and execute the document generating method.

Additionally, the present invention is not limited to the above-described embodiments, and various changes and modifications are able to be made without departing from the spirit of the present invention.

As described above, according to the present invention, in a document including characters intended for giving of ruby characters, unification of a layout of the document is judged to set a display form of the ruby characters based on the judgment result, and it is thus possible to display the ruby characters in an appropriate display form as a user desires according to unification of the layout of the document intended for giving of ruby characters.

The invention claimed is:

1. A document generating apparatus for generating a document with ruby characters by giving ruby characters alongside characters included in a document, comprising:
a storage portion for storing information on a layout of the document;
a unification judging portion for reading the information on the layout that is stored in the storage portion to judge unification of the layout of the whole document based on the read information; and
a ruby character setting portion for setting a display form of the ruby character based on a judgment result by the unification judging portion, wherein
the ruby character setting portion unifies the display form of the ruby character when the unification of the layout is higher than a predetermined value, and sets the display form of the ruby characters individually corresponding to characteristics of each part of the document when the unification of the layout is not higher than the predetermined value.

2. The document generating apparatus as defined in claim 1, wherein
the display form of the ruby character is a character size of the ruby character.

3. A document generating apparatus for generating a document with ruby characters by giving ruby characters alongside characters included in a document, comprising:
a storage portion for storing information on a layout of the document;
a unification judging portion for reading the information on the layout that is stored in the storage portion to judge unification of the layout of the whole document based on the read information; and
a ruby character setting portion for setting a display form of the ruby character based on a judgment result by the unification judging portion, wherein
the unification judging portion reads a characteristic amount showing characteristics of the layout from the storage portion as the information of the layout, calculates a variance value of the read characteristic amount, and judges the unification based on the calculated variance value.

4. The document generating apparatus as defined in claim 3, wherein
the unification judging portion calculates an average value of the characteristic amount per line, and calculates a variance value of the calculated average value as a variance value of the characteristic amount.

5. The document generating apparatus as defined in claim 3, wherein
the unification judging portion calculates, when the document is divided into a plurality of areas, the average value of the characteristic amount per area, and calculates a variance value of the calculated average value as a variance value of the characteristic amount.

6. The document generating apparatus as defined in claim 3, wherein
the unification judging portion calculates an average value of the characteristic amount corresponding to each character included in the whole document, and calculates a variance value of the calculated average value as a variance value of the characteristic amount.

7. The document generating apparatus as defined in claim 3, wherein
the characteristic amount is a character size of each character included in the document.

8. The document generating apparatus as defined in claim 3, wherein
the characteristic amount is an interval of each line in the document.

9. The document generating apparatus as defined in claim 3, wherein
the characteristic amount is the number of characters in each line in the document.

10. A document generating apparatus for generating a document with ruby characters by giving ruby characters alongside characters included in a document, comprising:
a storage portion for storing information on a layout of the document;
a unification judging portion for reading the information on the layout that is stored in the storage portion to judge unification of the layout of the whole document based on the read information;
a ruby character setting portion for setting a display form of the ruby character based on a judgment result by the unification judging portion;
an input portion for accepting input of the information on the layout from a user, wherein
the unification judging portion judges the unification based on the information of which the input portion accepts input.

11. A document generating apparatus for generating a document with ruby characters by giving ruby characters alongside characters included in a document, comprising:
a storage portion for storing information on a layout of the document;
a unification judging portion for reading the information on the layout that is stored in the storage portion to judge unification of the layout of the whole document based on the read information; and
a ruby character setting portion for setting a display form of the ruby character based on a judgment result by the unification judging portion, wherein when a rate of the size of the ruby character relative to the size of an area in which the ruby character near a word or a collocation comprised of the characters should be arranged is larger than a predetermined threshold, and when there is no need to give the ruby character alongside a word or a collocation before or after the word or the collocation, and the size in which the size of a blank to be provided between ruby characters is added to the size of the ruby character which is given alongside a word or a collocation before or after the word or the collocation is smaller than the size of the word or the collocation before or after the word or the collocation, the ruby character setting portion sets an area near the word or the collocation before or after the word or the collocation as an area for arranging the ruby character.

12. A document generating apparatus for generating a document with ruby characters by giving ruby characters alongside characters included in a document, comprising:

a storage portion for storing information on a layout of the document;

a unification judging portion for reading the information on the layout that is stored in the storage portion to judge unification of the layout of the whole document based on the read information; and a ruby character setting portion for setting a display form of the ruby character based on a judgment result by the unification judging portion;

an image reading portion for reading an image of the document; and a document with ruby characters generation portion for generating a document with ruby characters in which an image of the ruby character that is displayed in the display form which is set by the ruby character setting portion is combined with the image read by the image reading portion.

* * * * *